United States Patent
Warren

(10) Patent No.: US 10,027,149 B2
(45) Date of Patent: *Jul. 17, 2018

(54) ELECTRICAL CHARGING DEVICE CHASSIS AND CASES

(71) Applicant: William J. Warren, Frisco, TX (US)

(72) Inventor: William J. Warren, Frisco, TX (US)

(*) Notice: Subject to any disclaimer, the term of this patent is extended or adjusted under 35 U.S.C. 154(b) by 15 days.

This patent is subject to a terminal disclaimer.

(21) Appl. No.: 15/139,215

(22) Filed: Apr. 26, 2016

(65) Prior Publication Data

US 2016/0261129 A1 Sep. 8, 2016

Related U.S. Application Data

(63) Continuation-in-part of application No. 15/008,402, filed on Jan. 27, 2016, now Pat. No. 9,627,802, which
(Continued)

(51) Int. Cl.
*H01R 13/60* (2006.01)
*H02J 7/00* (2006.01)
(Continued)

(52) U.S. Cl.
CPC ............ *H02J 7/0042* (2013.01); *G06F 1/166* (2013.01); *G06F 1/1626* (2013.01); *H01R 31/065* (2013.01); *H01R 33/94* (2013.01); *H01R 33/945* (2013.01); *H02J 7/0052* (2013.01); *H01R 13/6675* (2013.01); *H01R 24/68* (2013.01);
(Continued)

(58) Field of Classification Search
CPC .... H01R 12/7058; H01R 13/60; H01R 13/62; H01R 13/6453; H01R 13/6675; H01R 24/68; H01R 29/00; H01R 31/065; H01R 25/006; H01R 13/44; H01R 31/06; H01R 33/94; H01R 33/945; H04M 1/04;
(Continued)

(56) References Cited

U.S. PATENT DOCUMENTS 2,392,445 A 1/1946 Anderson
4,536,694 A 8/1985 McCarty et al.
(Continued)

FOREIGN PATENT DOCUMENTS

EP 2228263 A1 9/2010
WO WO2016003585 A1 1/2016

OTHER PUBLICATIONS

Office Action, dated Aug. 25, 2016, U.S. Appl. No. 14/634,568, filed Feb. 27, 2015.
(Continued)

*Primary Examiner* — Tulsidas C Patel
*Assistant Examiner* — Travis Chambers
(74) *Attorney, Agent, or Firm* — Carr & Ferrell LLP

(57) ABSTRACT

Electrical charging device chassis and cases are provided herein. An example device includes a chassis for a computer, the chassis having a sidewall extending perpendicularly from the chassis, the chassis being configured to enclose computer components of the computer, the computer components having an energy storage device, the chassis comprising an electrical connector that extends from the sidewall. The device also includes a circuit mounted on the chassis that charges the energy storage device when the electrical connector is coupled with a power source.

16 Claims, 51 Drawing Sheets

Related U.S. Application Data is a continuation-in-part of application No. 14/634,568, filed on Feb. 27, 2015, now Pat. No. 9,620,911.

(60) Provisional application No. 62/231,762, filed on Jul. 14, 2015, provisional application No. 62/179,669, filed on May 14, 2015, provisional application No. 62/124,684, filed on Dec. 29, 2014, provisional application No. 61/998,770, filed on Jul. 6, 2014, provisional application No. 61/998,649, filed on Jul. 3, 2014, provisional application No. 61/998,646, filed on Jul. 2, 2014, provisional application No. 61/998,497, filed on Jun. 29, 2014.

(51) Int. Cl.
*H01R 33/94* (2006.01)
*H01R 33/945* (2006.01)
*G06F 1/16* (2006.01)
*H01R 31/06* (2006.01)
H01R 13/66 (2006.01)
H01R 24/68 (2011.01)
H04M 1/04 (2006.01)

(52) U.S. Cl.
CPC ........ *H02J 2007/0062* (2013.01); *H04M 1/04* (2013.01)

(58) Field of Classification Search
CPC ................. H02J 7/0042; H02J 7/0052; H02J 2007/0062; G06F 1/1626; G06F 1/166
USPC ....... 439/529, 172, 174, 528, 533, 534, 571, 439/579, 131, 536, 652, 929; 320/111, 320/115; 174/66
See application file for complete search history.

(56) References Cited

U.S. PATENT DOCUMENTS

| | | | |
|---|---|---|---|
| 5,305,381 A | 4/1994 | Wang et al. | |
| 5,587,645 A | 12/1996 | Sciammarella et al. | |
| 5,648,712 A | 7/1997 | Hahn | |
| 5,679,017 A | 10/1997 | Smith | |
| 5,762,512 A | 6/1998 | Trant et al. | |
| 6,091,611 A | 7/2000 | Lanni | |
| 6,510,067 B1 | 1/2003 | Toebes | |
| 6,518,724 B2 | 2/2003 | Janik | |
| 6,831,848 B2 | 12/2004 | Lanni | |
| 6,848,802 B2 | 2/2005 | Chen | |
| 6,861,822 B2 | 3/2005 | Wei | |
| 6,938,867 B2 | 9/2005 | Dirks | |
| 7,066,767 B2 | 6/2006 | Liao | |
| 7,075,779 B2 | 7/2006 | Bothe et al. | |
| 7,166,987 B2 | 1/2007 | Lee et al. | |
| 7,254,424 B1 | 8/2007 | Reichert | |
| 7,524,197 B2 | 4/2009 | Mills et al. | |
| 7,528,323 B2 | 5/2009 | Wu et al. | |
| 7,540,748 B2 | 6/2009 | Tracy et al. | |
| 7,623,182 B2 | 11/2009 | Byrne et al. | |
| 7,654,855 B2 | 2/2010 | Liao | |
| 7,682,185 B2 | 3/2010 | Liao | |
| 7,699,664 B2 | 4/2010 | Kim et al. | |
| 7,850,484 B2 | 12/2010 | Hayashi et al. | |
| 7,857,659 B2 | 12/2010 | Wang et al. | |
| 7,887,341 B2 | 2/2011 | Liao | |
| 8,113,873 B1 | 2/2012 | Sarraf | |
| D676,380 S | 2/2013 | Sun | |
| 8,415,920 B2 | 4/2013 | Liao | |
| D687,375 S | 8/2013 | Franco | |
| 8,686,683 B2 | 4/2014 | Caskey et al. | |
| 8,712,482 B2 | 4/2014 | Sorias et al. | |
| 8,794,997 B2 | 8/2014 | Tin | |
| 8,864,517 B2 | 10/2014 | Cohen | |
| D723,457 S | 3/2015 | Sorias | |
| 9,130,332 B2 * | 9/2015 | Yosef | H01R 31/06 |
| 9,161,464 B2 | 10/2015 | Liao | |
| 9,356,454 B2 * | 5/2016 | Caren | H02J 7/0045 |
| D760,647 S | 7/2016 | Chen | |
| D762,169 S | 7/2016 | Lei | |
| D783,526 S | 4/2017 | Warren | |
| 9,620,911 B2 * | 4/2017 | Warren | H01R 13/6675 |
| 9,627,802 B2 * | 4/2017 | Warren | H01R 13/60 |
| D791,070 S | 7/2017 | Son | |
| D791,076 S | 7/2017 | Kim | |
| D791,697 S | 7/2017 | Precheur | |
| D795,190 S | 8/2017 | Tzeng | |
| 9,742,107 B2 * | 8/2017 | Choi | H01R 13/5829 |
| 2003/0218445 A1 | 11/2003 | Behar | |
| 2005/0178633 A1 | 8/2005 | Liao | |
| 2006/0194467 A1 | 8/2006 | Beasley et al. | |
| 2007/0258204 A1 | 11/2007 | Chang et al. | |
| 2008/0157715 A1 | 7/2008 | Rosenboom et al. | |
| 2008/0227380 A1 | 9/2008 | Hsu et al. | |
| 2009/0047827 A1 | 2/2009 | Liao | |
| 2012/0049800 A1 | 3/2012 | Johnson et al. | |
| 2012/0077361 A1 | 3/2012 | Youssefi-Shams et al. | |
| 2012/0178506 A1 | 7/2012 | Sorias et al. | |
| 2012/0214348 A1 | 8/2012 | Youssefi-Shams et al. | |
| 2013/0057215 A1 * | 3/2013 | Rajeswaran | G06F 1/1626 320/111 |
| 2013/0150134 A1 | 6/2013 | Pliner et al. | |
| 2013/0178252 A1 | 7/2013 | Sorias et al. | |
| 2014/0030912 A1 | 1/2014 | Cohen | |
| 2015/0011265 A1 * | 1/2015 | Walsh, Jr. | G06Q 20/381 455/569.1 |
| 2015/0015204 A1 * | 1/2015 | Sorias | H02J 7/0044 320/111 |
| 2015/0207286 A1 | 7/2015 | Chen et al. | |
| 2015/0207350 A1 | 7/2015 | Chen et al. | |
| 2015/0263447 A1 | 9/2015 | Liao | |
| 2015/0380872 A1 | 12/2015 | Warren | |
| 2016/0087381 A1 * | 3/2016 | Wong | H01R 13/73 439/529 |
| 2016/0118758 A1 | 4/2016 | Cymerman | |
| 2016/0141815 A1 | 5/2016 | Warren | |
| 2016/0204816 A1 | 7/2016 | Abramovich | |
| 2016/0209885 A1 * | 7/2016 | Ellis | H01R 31/065 |
| 2016/0218536 A1 | 7/2016 | Caren et al. | |
| 2016/0380457 A1 | 12/2016 | Criss | |
| 2017/0005496 A1 | 1/2017 | Warren | |
| 2017/0012450 A1 | 1/2017 | Warren | |
| 2017/0101256 A1 | 4/2017 | Zeitlin | |
| 2017/0163080 A1 | 6/2017 | Warren | |

OTHER PUBLICATIONS

Office Action, dated Sep. 12, 2016, U.S. Appl. No. 15/008,402, filed Jan. 27, 2016.
Notice of Allowance, dated Jan. 23, 2017, U.S. Appl. No. 14/634,568, filed Feb. 27, 2015.
Notice of Allowance, dated Feb. 1, 2017, U.S. Appl. No. 15/008,402, filed Jan. 27, 2016.
International Search Report and Written Opinion dated Sep. 4, 2015 for Patent Cooperation Treaty Application PCT/US2015/034073, filed Jun. 3, 2015.

* cited by examiner

US 10,027,149 B2

ELECTRICAL CHARGING DEVICE CHASSIS AND CASES

CROSS REFERENCE TO RELATED APPLICATIONS

The present application is a Continuation-in-Part of U.S. patent application Ser. No. 15/008,402 (now issued as U.S. Pat. No. 9,627,802 on Apr. 18, 2017), filed on Jan. 27, 2016, which is a Continuation-in-Part of U.S. patent application Ser. No. 14/634,568 (now issued as U.S. Pat. No. 9,620,911 on Apr. 11, 2017), filed on Feb. 27, 2015, which claims the benefit of U.S. Provisional Application No. 61/998,497, filed on Jun. 29, 2014, of U.S. Provisional Application No. 61/998,646, filed on Jul. 2, 2014, of U.S. Provisional Application No. 61/998,649, filed on Jul. 3, 2014, of U.S. Provisional Application No. 61/998,770, filed on Jul. 6, 2014, and of U.S. Provisional Application No. 62/124,684, filed on Dec. 29, 2014; the present application also claims the benefit of U.S. Provisional Application No. 62/231,762, filed on Jul. 14, 2015; U.S. patent application Ser. No. 15/008,402 also claims the benefit of U.S. Provisional Application No. 62/179,669, filed on May 14, 2015, and of U.S. Provisional Application No. 62/231,762, filed on Jul. 14, 2015. All of the above applications are hereby incorporated by reference herein in their entireties including all references and appendices cited therein.

FIELD OF TECHNOLOGY

The present technology pertains to devices for electronic charging, and more specifically, but not by way of limitation, to chassis that comprise a static or deployable DC or AC electrical connector (such as USB or electrical prongs) that extends from the chassis. An example chassis is a case or shell of a laptop computer, tablet, or other similar computing device. Some embodiments comprise mechanisms for transitioning a DC connector (USB connector) between a deployed configuration to a storage configuration and vice versa.

SUMMARY

According to some embodiments, the present technology is directed to a device, comprising: (a) a chassis for a computer, the chassis having a sidewall extending perpendicularly from the chassis, the chassis being configured to enclose computer components of the computer, the computer components comprising an energy storage device, the chassis comprising an electrical connector that extends from the sidewall; and (b) a circuit mounted on the chassis that charges the energy storage device when the electrical connector is coupled with a power source According to some embodiments, the present technology is directed to a device, comprising: (a) a chassis for a computer, the chassis enclosing computer components of the computer that comprise an energy storage device; a second housing tray comprising an electrical connector for electrically coupling power source, the electrical connector capable of being placed in either a deployed configuration or a stored configuration, the electrical connector being electrically coupled with the energy storage device; and a third housing tray that comprises a stabilizer that supports the chassis against a support surface.

According to some embodiments, the present technology is directed to a device, comprising: (a) a chassis for a computer, the chassis having a sidewall extending perpendicularly from the chassis, the chassis being configured to enclose computer components of the computer, the computer components comprising an energy storage device; (b) a second housing tray comprising: (i) a circuit mounted on the chassis that charges the energy storage device when the electrical connector is coupled with a power source; and (ii) a universal serial bus (USB) connector for electrically coupling the circuit with a USB outlet, the USB connector capable of being placed in either a deployed configuration or a stored configuration based on pivoting movement of a third housing tray relative to the second housing tray; and (c) the third housing tray that comprises a stabilizer, the stabilizer contacting a support surface to support a weight of the chassis and computer.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
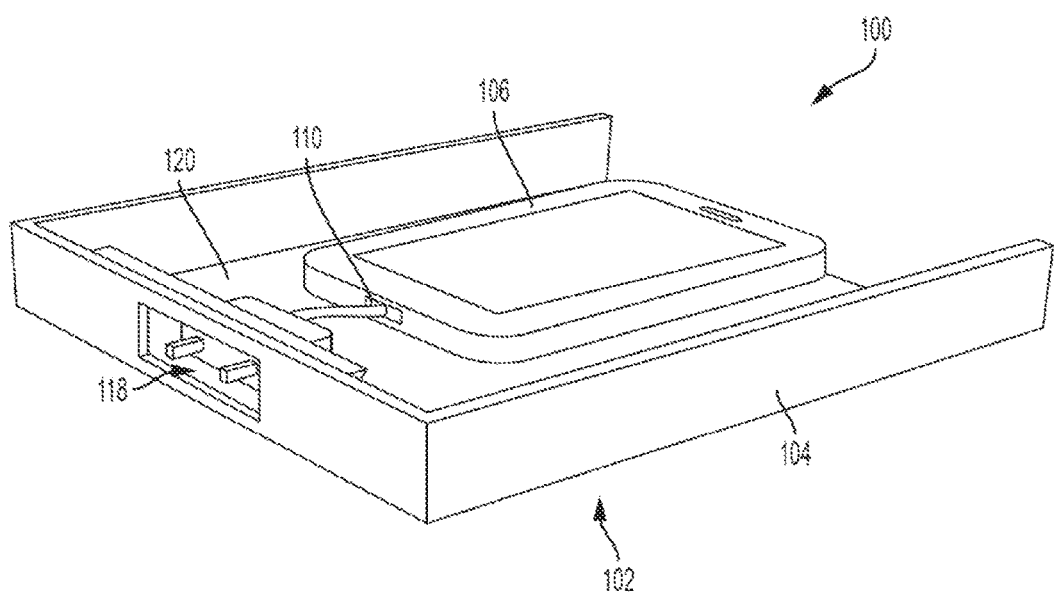
FIG. 1 is a perspective view of an example device of the present technology.

The present disclosure is now described more fully with reference to the accompanying drawings, in which example embodiments of the present disclosure are shown. The present disclosure may, however, be embodied in many different forms and should not be construed as necessarily being limited to the example embodiments set forth herein. Rather, these example embodiments are provided so that the disclosure is thorough and complete, and fully conveys the concepts of the present disclosure to those skilled in the art. Also, features described with respect to certain example embodiments may be combined in and/or with various other example embodiments. Different aspects and/or elements of example embodiments, as disclosed herein, may be combined in a similar manner. Further, at least some example embodiments may individually and/or collectively be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity, at least as described herein, in any manner, irrespective of the at least one entity have any relationship to the subject matter of the present disclosure.

Generally described, the present technology involves devices that are used to charge electronic devices. Example types of electronic devices that can be charged using the present technology include, but are not limited to, cellular telephones, Smartphones, PDAs, tablets, phablets, laptops, or any other mobile electronic device that requires recharging through an electrical interface or charging port.

Some embodiments include a single housing tray that is provided with an electrical plug that is configured to fit in an electrical wall outlet. The electrical plug can be configured to transition between a deployed configuration and a stored configuration. In the deployed configuration, prongs of the electrical plug extend such that they can be inserted into the outlet. In the stored configuration, the prongs of the electrical plug are retracted or folded into the tray.

When plugged into the outlet, the housing tray is a cantilever that supports the weight of the electronic device that is being charged by the device. The housing tray comprises a circuit for transforming the AC power received from the outlet to DC power that can be used to recharge the electronic device.

In some embodiments, the housing tray can comprise a stabilizer that contacts the outlet or the wall and at least partially bears the weight of the electronic device.

In other embodiments, the device includes additional housing trays that are disposed in a stacked configuration. Movement of these housing trays relative to one another function to move the electrical plug between its deployed and stored configurations. Also, stabilizers can be stored in one or more of these additional trays. In some embodiments, one or more of the additional trays is pivotally hinged to an adjacent housing tray.

Turning now to FIGS. 1-8, which collectively illustrates an example device 100, constructed in accordance with the present technology.

The device 100 includes a housing tray 102 having a sidewall 104 extending perpendicularly from the housing tray 102. The housing tray 102 is configured to hold a personal electronic device 106.

Figure 2:
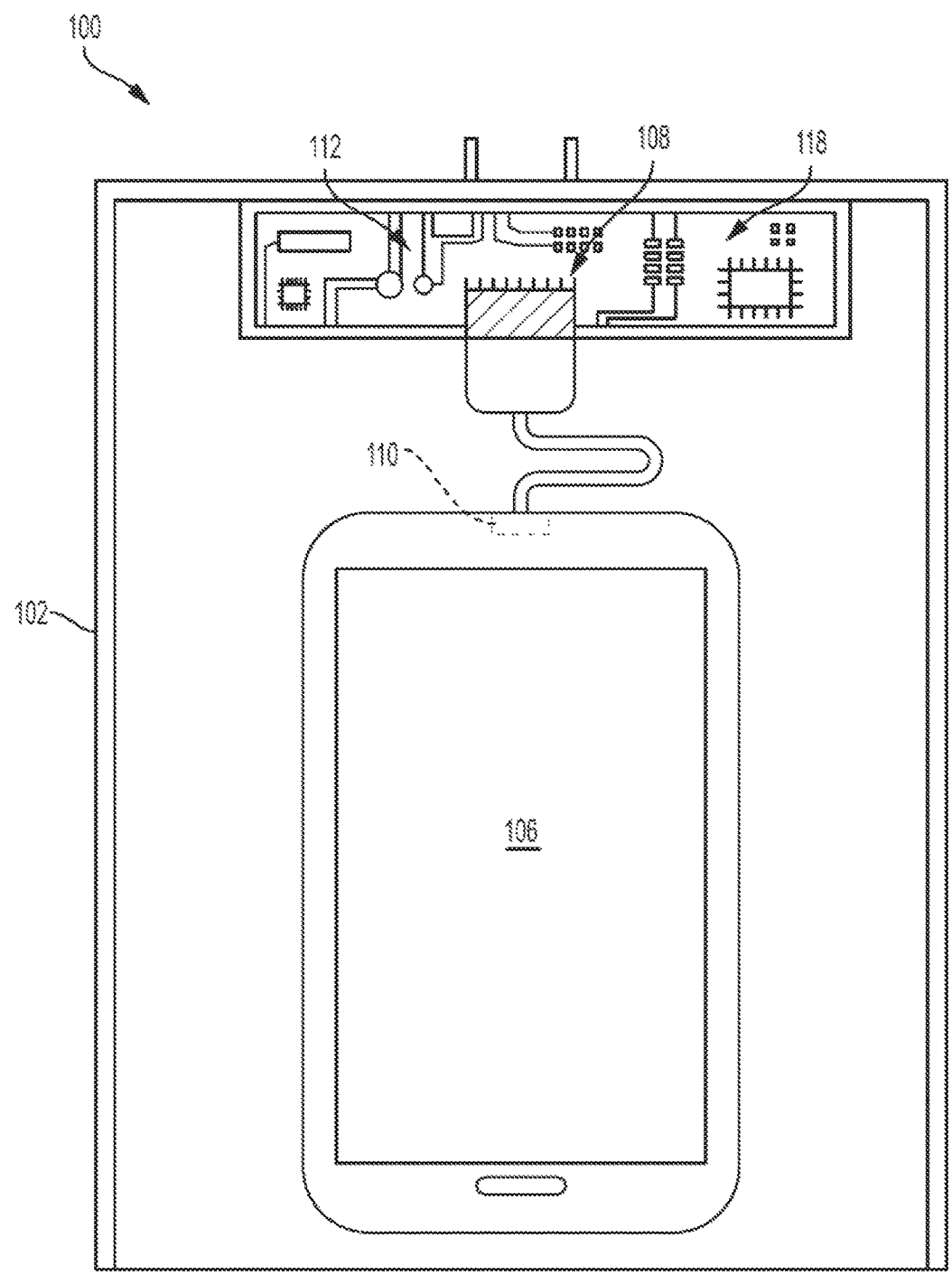
FIG. 2 is a top down view of the device of FIG. 1.

The housing tray 102 comprises an electrical connector interface 108 that couples with a charging connector 110 of the personal electronic device 106, as illustrated in FIG. 2. The device 100 also includes a circuit 112 mounted on the housing tray 102 for converting alternating current received from an electrical outlet 114 of a wall 116 (see FIG. 3) to direct current that charges the personal electronic device 106 through the electrical connector interface 108.

In some embodiments, the device 100 includes an electrical connector 118 for electrically coupling the circuit 112 with the electrical outlet 114. The electrical connector 118 is capable of being placed in either a deployed configuration (see FIG. 3) where the electrical connector 118 can couple with the electrical outlet 114 or a stored configuration (see FIG. 1) where the electrical connector 118 cannot couple with the electrical outlet 114.

In more detail, the housing tray 102 includes a plate 120. The plate 120 supports the circuit 112 and the personal electronic device 106. The sidewall 104 extends around at least a portion of a periphery of the plate 120. In one example, the sidewall 104 extends around one or more sides, and in some embodiments four sides of the plate 120.

According to some embodiments, the circuit 112 can comprise a printed circuit board with various permutations of electrical components. In general, the circuit 112 is configured to transform the AC power waveform received from the outlet 114 into DC power that is appropriate for charging the personal electronic device 106.

In some embodiments, the circuit 112 can include combinations of electrolytic capacitors, MOSFET switching transistors, flyback transformers, a controller integrated circuit, capacitors, diodes, R-C snubber circuits, EMI (electromagnetic interference) circuits, inductors, control chips, Schottky diodes, Tantalum filter capacitors, as well as any combinations thereof, in order to provide the desired transformation of AC to DC functions.

Figure 5:
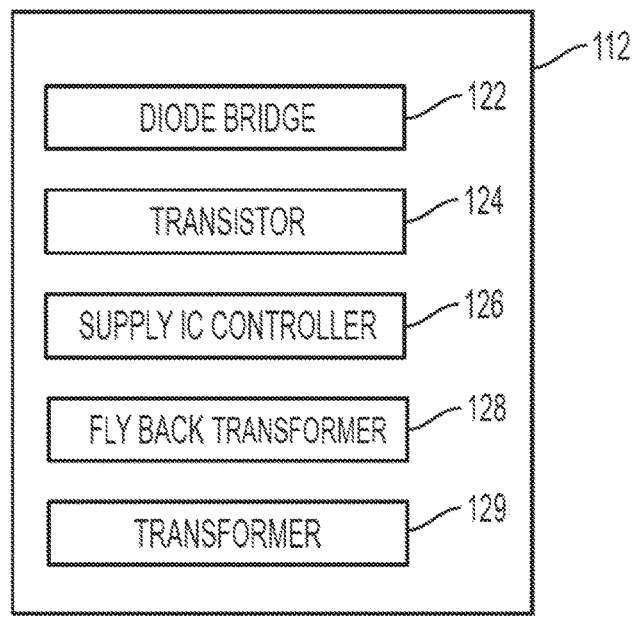
FIG. 5 is a schematic diagram of an example circuit for use in the example devices of the present technology.

In some embodiments, such as in FIG. 5, the circuit 112 is an advanced flyback switching power supply that receives the AC voltage in ranges of 100 to 240 volts, and produces approximately five watts of smooth voltage power. AC line power is converted to high voltage DC current using a diode bridge 122. The DC power is switched off and on by a transistor 124 controlled by a power supply IC controller 126.

In other embodiments, the chopped DC power supply is fed back into a flyback transformer 128, which converts the DC power to a low voltage AC waveform. The AC waveform is then converted into DC, which is filtered with a filter 132 to obtain smooth power that is substantially free of interference. This smoothed power is provided to a USB port (e.g., electrical connector interface 108). The circuit 112 can comprise a feedback circuit 133 that measures the voltage output to the electrical connector interface 108 and sends a signal to the power supply IC controller 126, which adjusts the switching frequency to obtain a desired voltage.

While the use of USB port is contemplated, the electrical connector interface 108 can be selectively changed depending upon the type electrical device that needs to be charged. Other examples include power over Ethernet, firewire, MIDI, Thunderbolt, and so forth.

Figure 6:
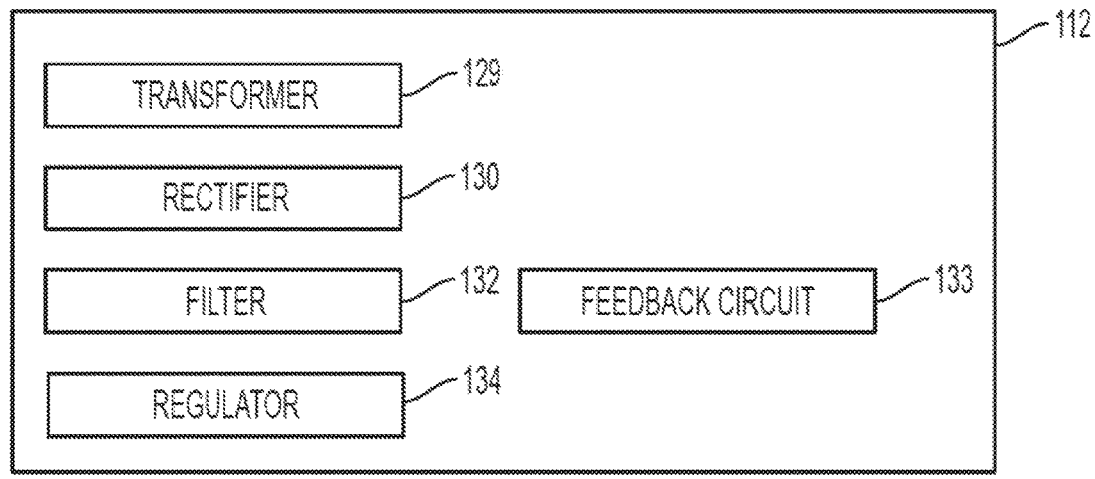
FIG. 6 is a schematic diagram of another example circuit for use in the example devices of the present technology.

In another example circuit, illustrated in FIG. 6, the circuit 112 comprises a transformer 129 that performs a step down of the AC voltage received from the outlet 114 to a working output voltage. A rectifier 130 then converts the stepped down voltage from AC to DC. In some embodiments, the rectifier 130 is a full wave bridge rectifier. At filter 132, a capacitor may be used to smooth the DC voltage. A regulator 134 can also be employed to even further smooth the DC current. For example, a zener diode or IC voltage regulator can be utilized.

The circuits of FIGS. 5 and 6 are merely example circuits that can be used to transform the AC power received at a wall outlet to a DC power feed that can be used to charge an electronic device without causing any damage to the circuitry of the electronic device.

Figure 7:
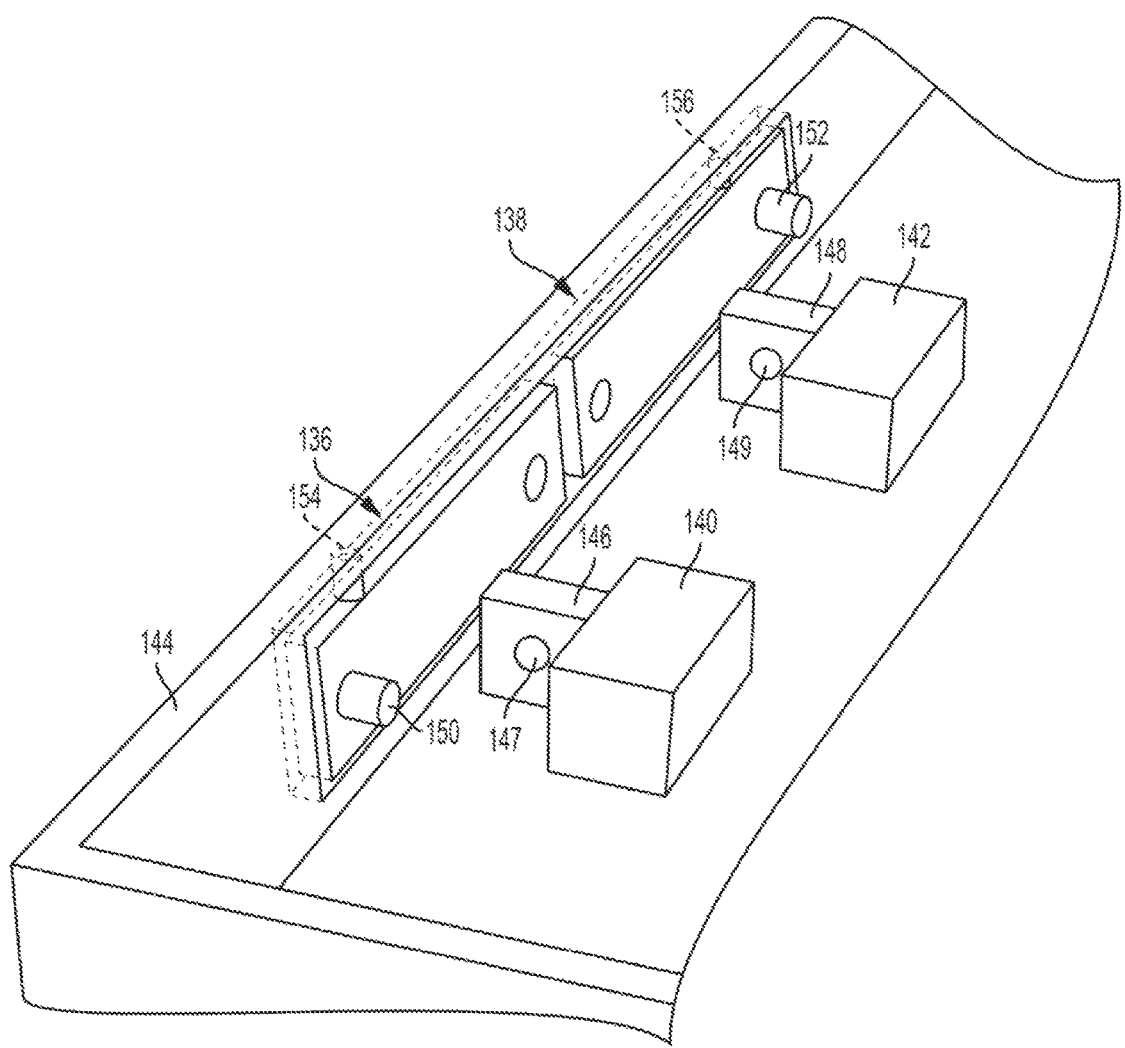
FIG. 7 is a partial view of a pair of pivoting prongs and pair of electrical posts.
Figure 8:
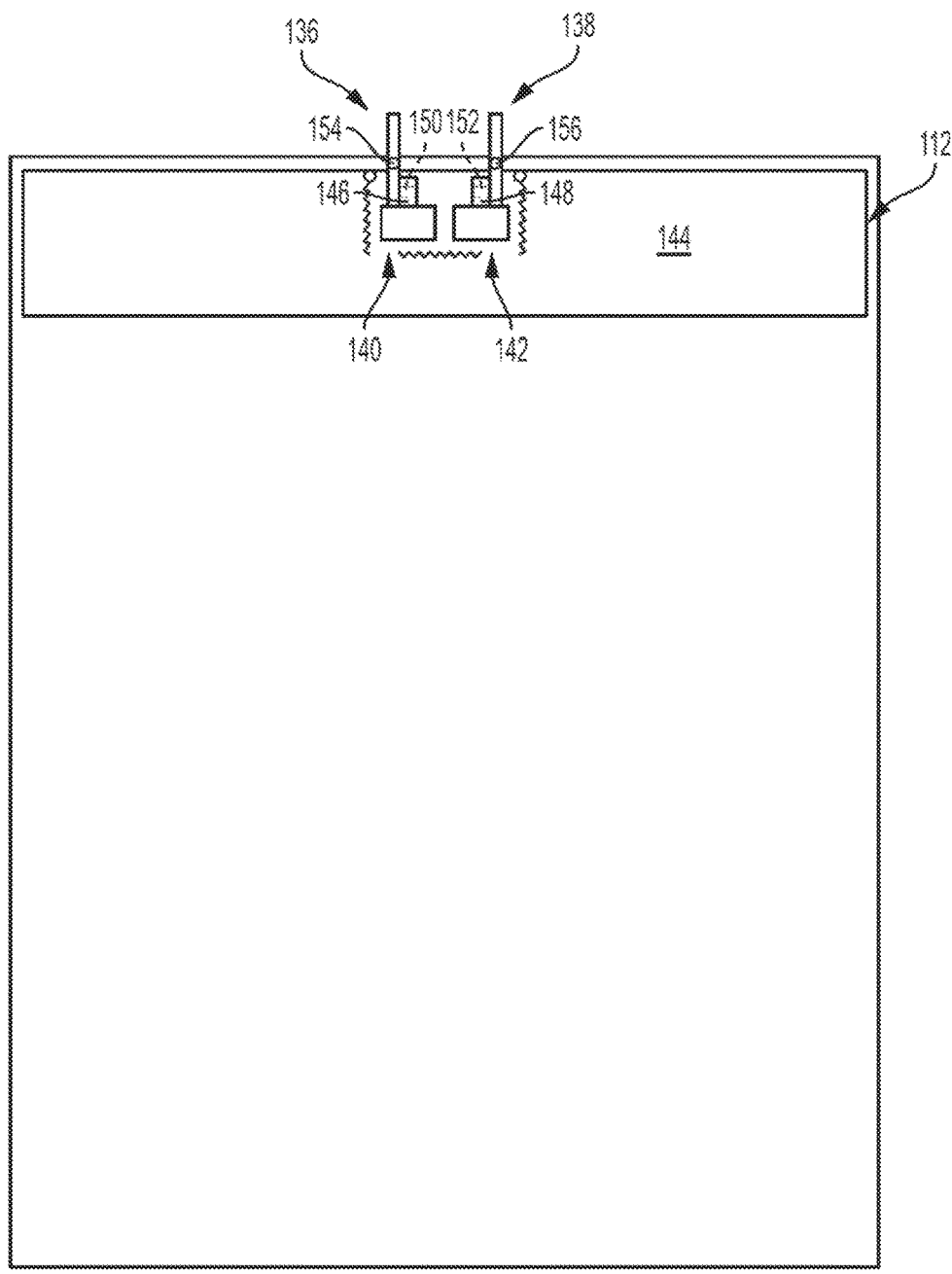
FIG. 8 is a cutaway view of the pair of pivoting prongs and pair of electrical posts in a deployed configuration.
Figure 9:
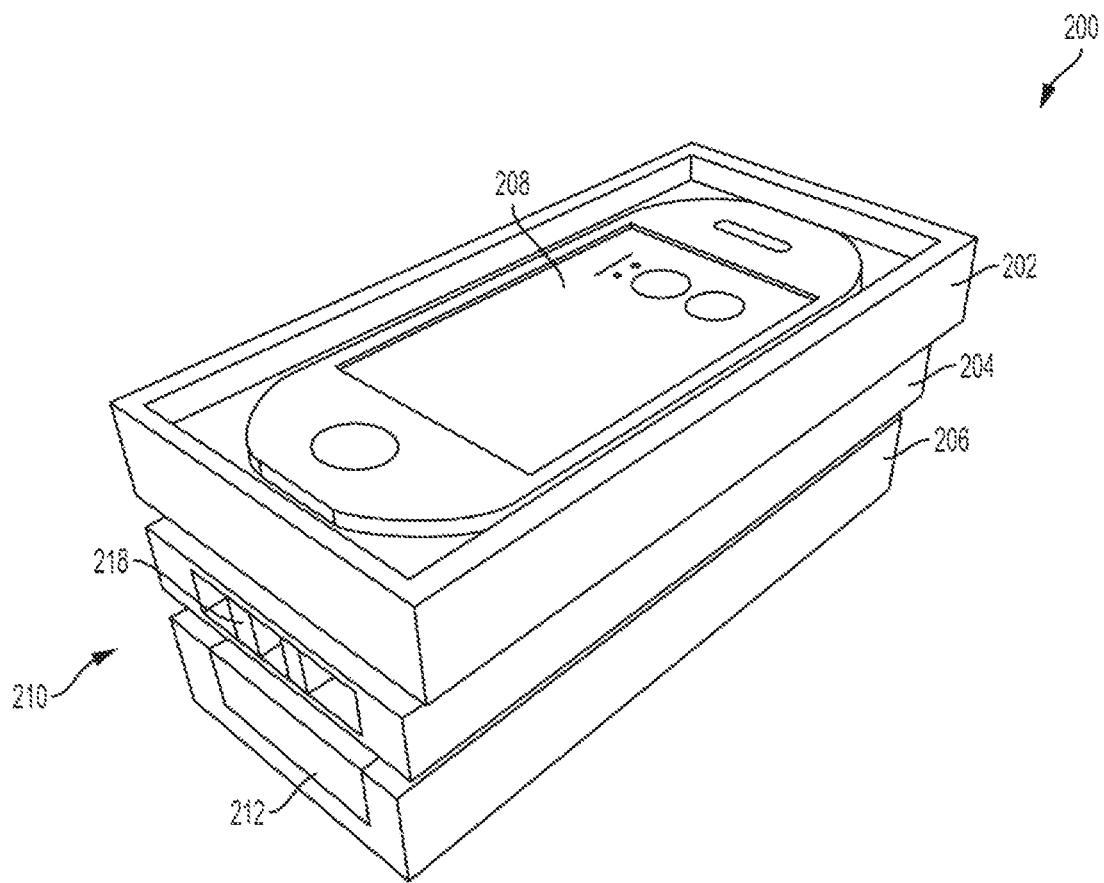
FIG. 9 is a perspective view of another example device of the present technology.

Turning now to FIGS. 7-8, the electrical connector interface 108 comprises a pair of pivoting prongs 136 and 138 that are designed to move into and out of contact with a pair of electrical posts 140 and 142 of the circuit 112 and provide power to the circuit (when the device is plugged into the outlet).

The prongs 136 and 138 move into contact with the posts 140 and 142, respectively, when the electrical connector is moved into the deployed configuration. Likewise, the prongs 136 and 138 move out of contact with the posts 140 and 142, respectively, when the electrical connector is moved into the stored configuration.

Figure 3:
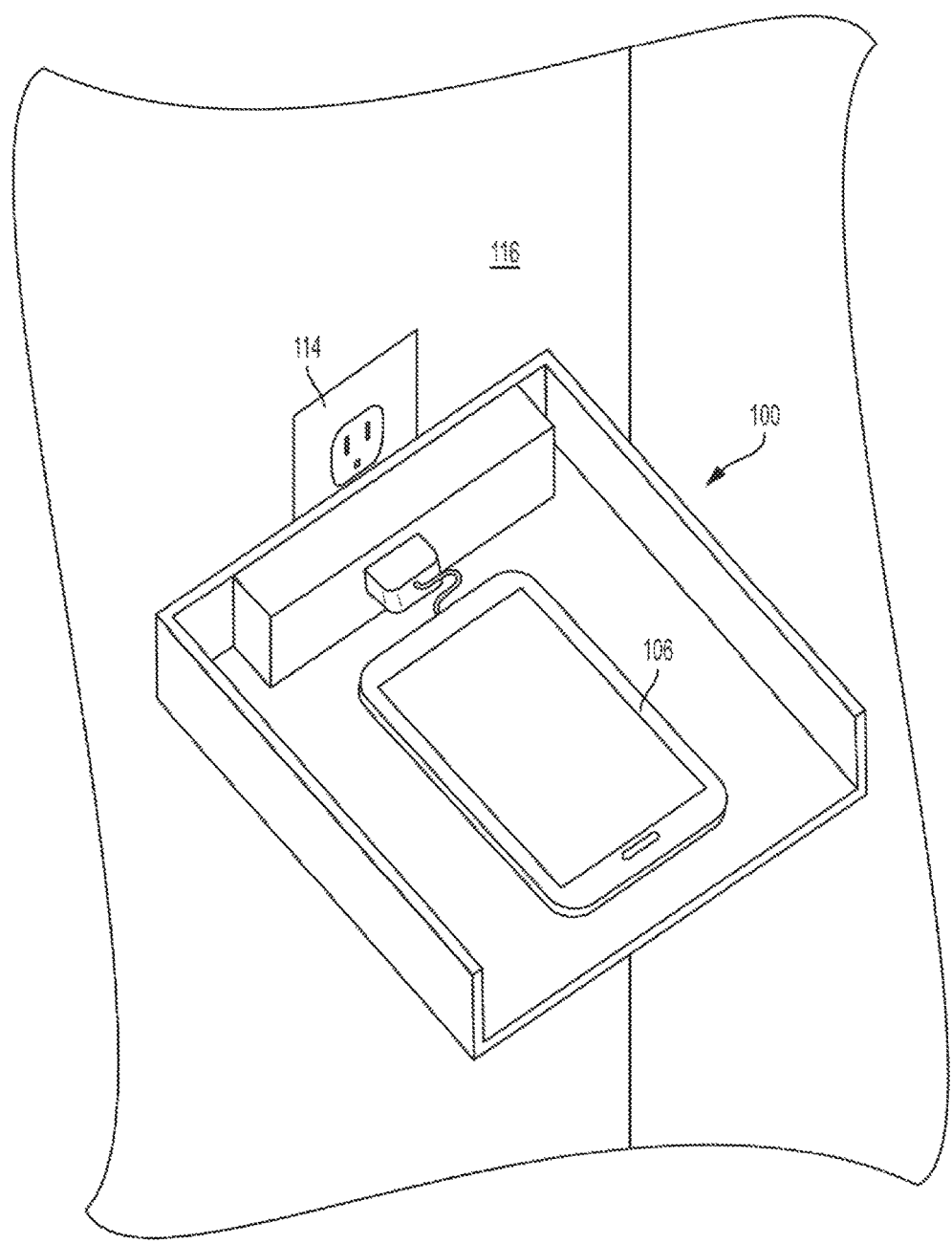
FIG. 3 is a perspective view of the device of FIG. 1, installed into an outlet of a wall.
Figure 4:
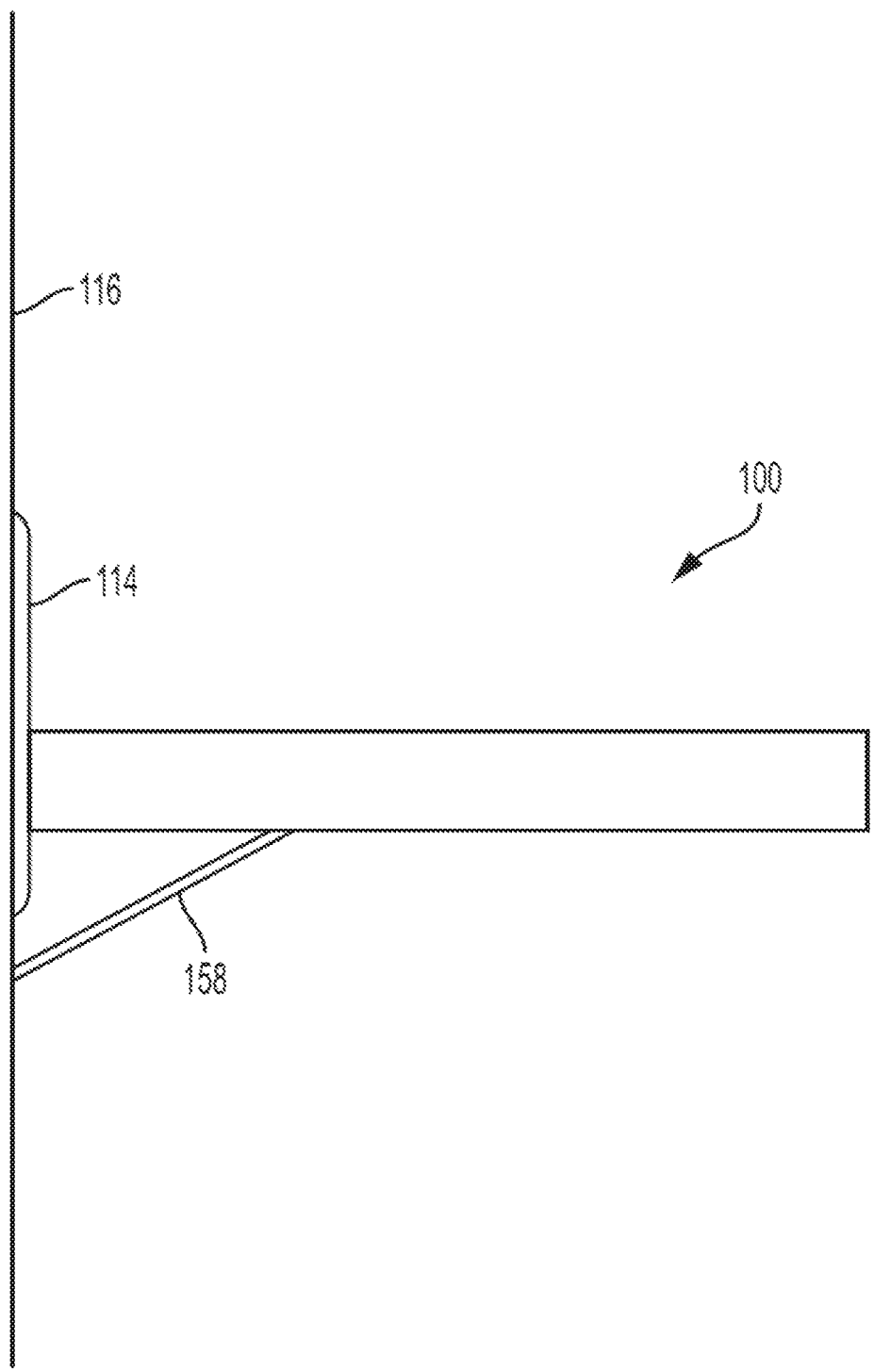
FIG. 4 is a side view of the device of FIG. 1, installed into an outlet of a wall.

The prongs 136 and 138, when stored, lie flat with the front of an enclosure 144 that covers the circuit 112, as illustrated in FIG. 1. The prongs 136 and 138 will extend away from the enclosure 144 when in the deployed configuration, as illustrated in FIG. 3.

In some embodiments, each of the pair of electrical posts 140 and 142 comprises a post interface 146 and 148 (respectively). Each of the pair of pivoting prongs 136 and 138 include a prong interface 150 and 152 (respectively) that electrically couple when the electrical connector is in the deployed configuration.

In one embodiment, the post interfaces 146 and 148 include apertures 147 and 149, respectively, and the prong interfaces 150 and 152 are pegs/protrusions that are each sized to matingly fit within an aperture. The mating fit should be sufficient to provide an electrical connection between the prongs 136 and 138 and the posts 140 and 142.

In some embodiments, the prongs 136 and 138 pivotally connect to the enclosure 144 using pins 154 and 156, respectively.

Turning back to FIG. 4 briefly, in some embodiments, the housing tray 102 is provided with a stabilizer 158 that pivotally extends from a lower part of the housing tray 102. The stabilizer 158 is configured to contact the electrical outlet 114 or a wall 116 of the electrical outlet 114.

Turning now to FIGS. 9-17, which collectively illustrate another example device 200, which is constructed in accordance with the present technology. The device includes plurality of housing trays. In one embodiment, the plurality of housing trays includes a first housing tray 202, a second housing tray 204, and a third housing tray 206. The device 200 can comprise additional of fewer housing trays than those illustrated. An electrical device (also referred to herein as personal electronic device) 208 is disposed in the first housing tray 202.

The second housing tray 204 is provided with an electrical connector 210 that includes prongs 218. The third housing tray 206 comprises a stabilizer 212 that is capable of being disposed in a stored configuration (see FIG. 9), and a deployed configuration (see FIG. 10). The third housing tray 206 is pivotally or hingedly (for example, at third wheel 236) connected to the second housing tray 204 (see FIG. 15 and FIG. 16) and, in some embodiments supports the weight of the personal electronic device 208 by contacting the wall 209 or the electrical outlet 211 (see FIG. 11).

Figure 12:
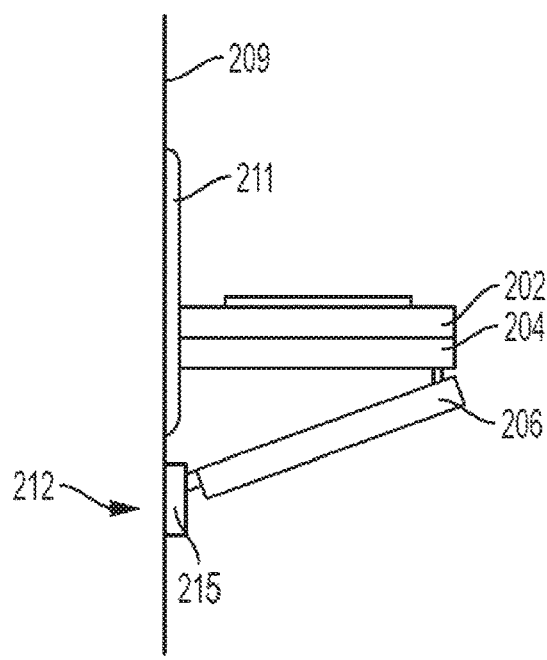
FIG. 12 is a side view of the device of FIG. 9 plugged into an outlet and supported on a wall by a two section stabilizer.

As illustrated in FIG. 12, the stabilizer 212 (or a section of the stabilizer 212) rotates when extended from the third housing tray 206 such that a mating surface 215 of the stabilizer 212 rests flat against the wall 209 or the electrical outlet 211.

Figure 13:
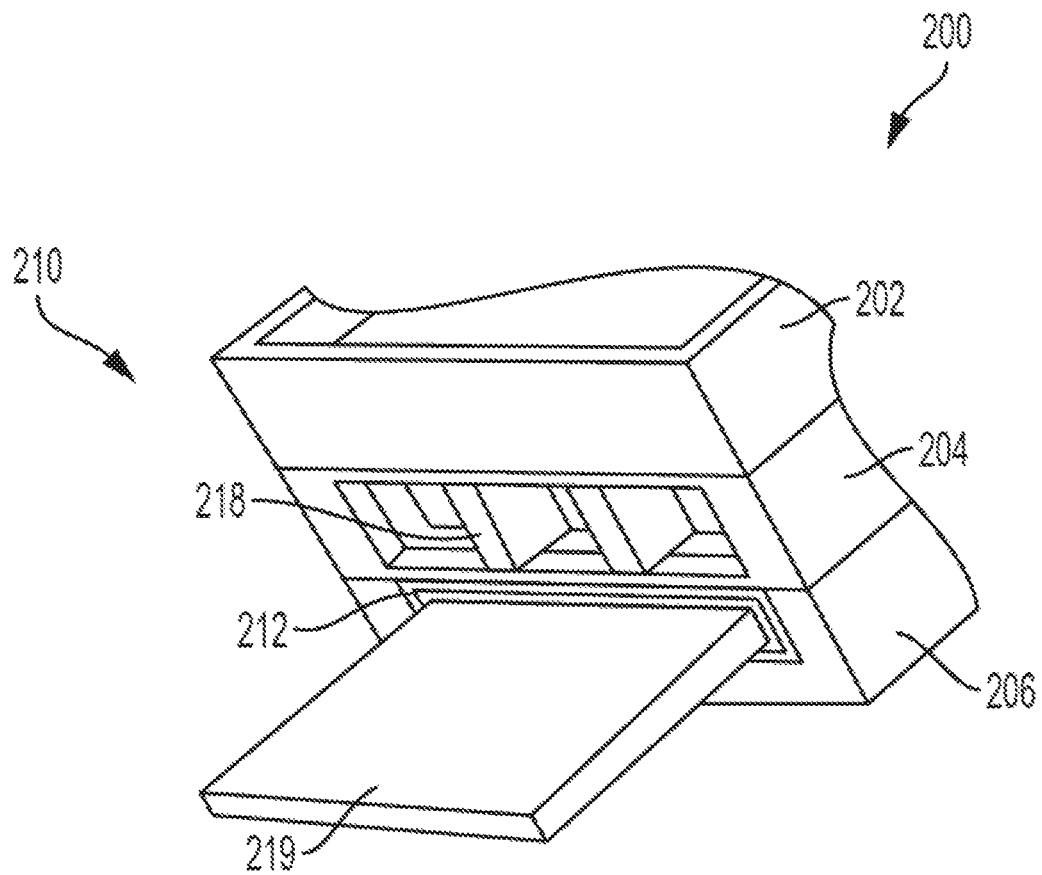
FIG. 13 is a perspective view of a stabilizer with an internal stabilizer flap.

FIG. 13 illustrates the stabilizer 212, which includes an internal stabilizer flap 219 that extends from the stabilizer 212.

In some embodiments, the hinged movement of the third housing tray 206 relative to the second housing tray 204 causes the linear movement of the electrical connector 210. For example, hinged movement of the third housing tray 206 causes the electrical connector 210 translate along a horizontal axis H when moving between the deployed and stored configurations. Additional details regarding the movement of the electrical connector 210 are provided with respect to FIGS. 16-17.

Figure 14:
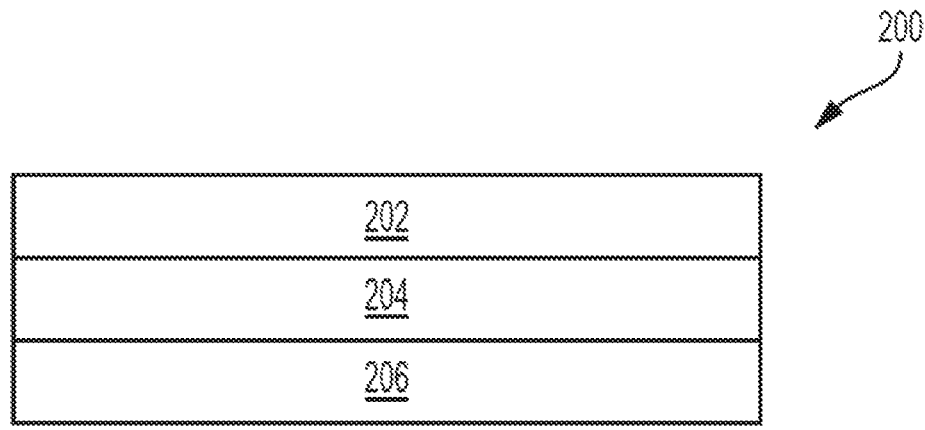
FIG. 14 is a perspective view of the device of FIG. 9, in a stored configuration.
Figure 15:
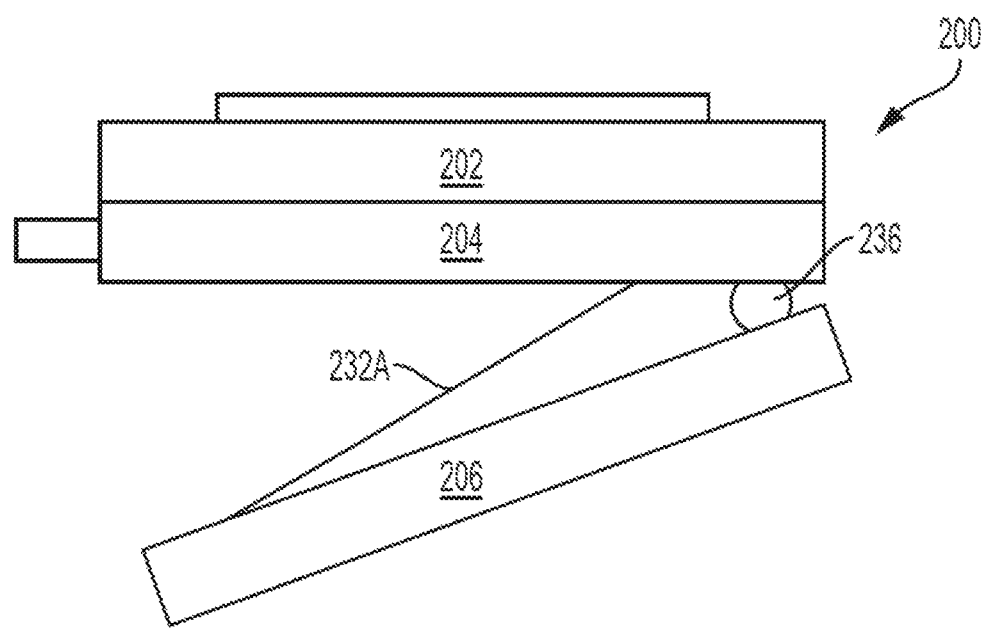
FIG. 15 is a perspective view of the device of FIG. 9, in a deployed configuration, showing vertical and horizontal axes of travel.

FIGS. 14 and 15 illustrate side elevational views of the device 200 in both a retracted (FIG. 14) and a deployed configuration (FIG. 15).

Figure 16:
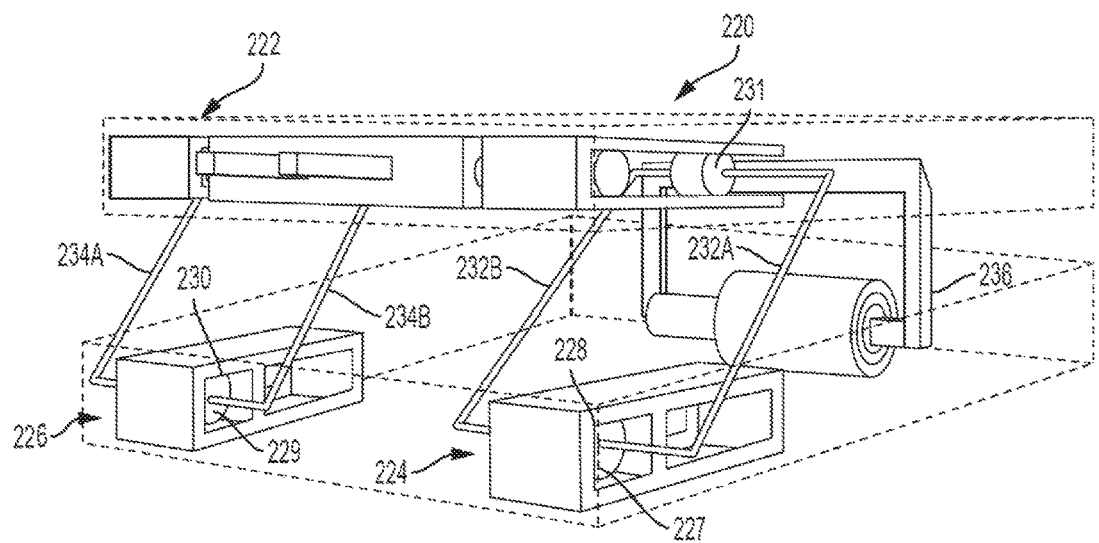
FIG. 16 is a perspective view of a pair of upper and lower guides with hinges attached.
Figure 17:
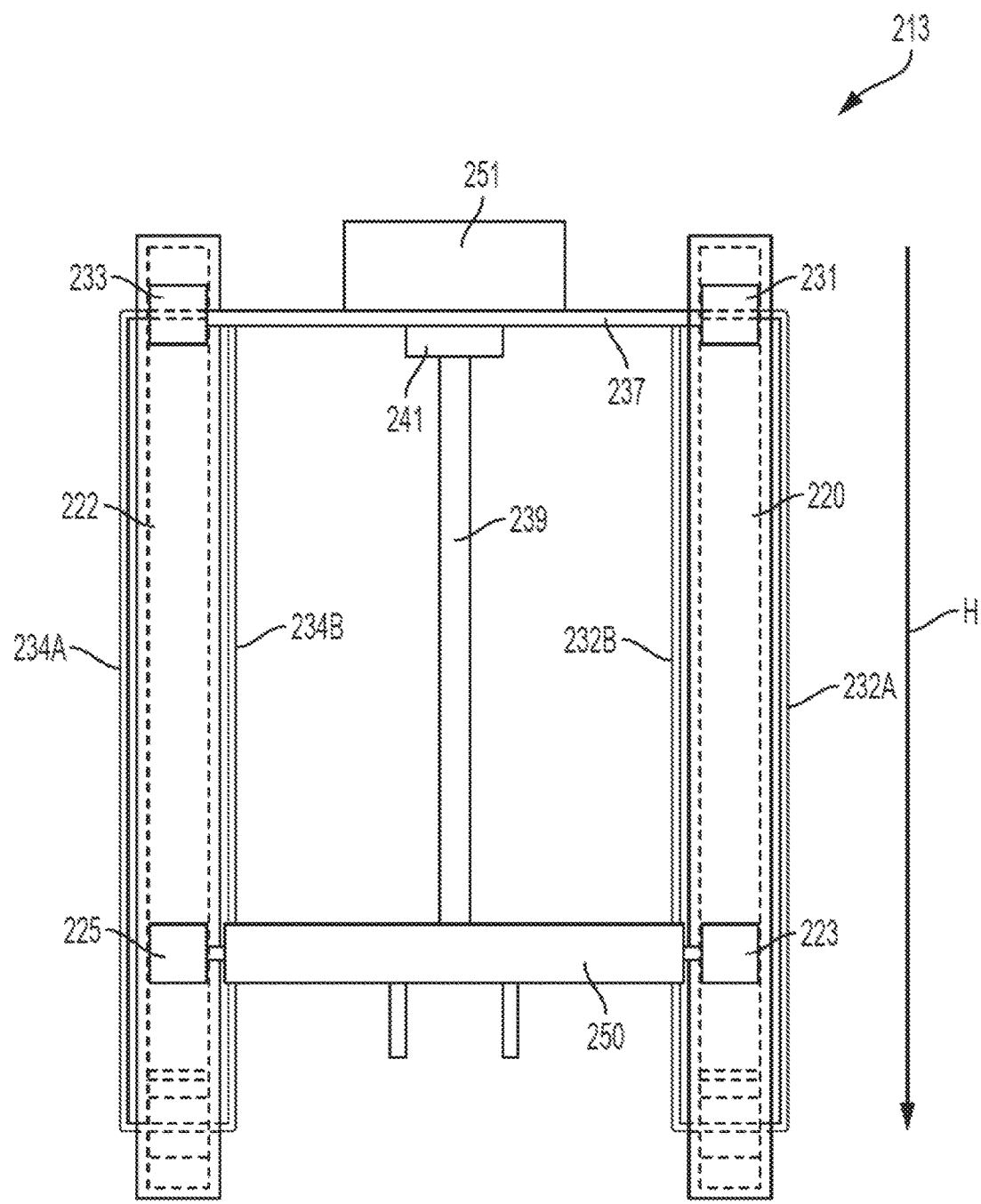
FIG. 17 is a top down view of the pair of upper and lower guides with hinges attached of FIG. 16.

FIGS. 16 and 17 collectively illustrate an example electrical connector actuator assembly 213 that is configured to move the electrical connector 210 between deployed and/or stored configurations.

The assembly 213 comprises a pair of upper guides 220 and 222, and the second housing tray comprises a pair of lower guides 224 and 226. The upper guides 220 and 222 are associated with the second housing tray 204 and the lower guides are associated with the third housing tray 206.

The upper guides 220 and 222 comprise substantially rectangular frames that are configured to receive wheels 223 and 225 therein, as described below. The wheels 223 and 225 will translate or travel within the upper guides 220 and 222, which causes the electrical connector 210 to move along the horizontal axis H. In some embodiments, as illustrated in FIG. 17, the circuit and enclosure 250 is coupled with the upper guides 220 and 222 using the wheels 223 and 225.

The lower guides 224 and 226 also comprise rectangular frames that each comprises a confinement area such as confinement areas 228 and 230 that are configured to receive wheels 227 and 229. The confinement areas 228 and 230 allow the wheels to rotate therein but not translate along the guides 224 and 226.

A fourth wheel 231 and fifth wheel 233 are also within the upper guides 220 and 222. The fourth wheel 231 and fifth wheel 233 are joined to an axle 237.

A strut 239 extends between the enclosure 250 and the axle 237. The strut 239, in some embodiments, is coupled to the axle 237 with an annular ring 241 that allows the axle 237 to freely rotate while allowing the axle to push and/or pull the strut along the horizontal axis H as the wheels 231 and 233 translated within the upper guides 220 and 222.

In one embodiment, the fourth wheel 231 of the pair of upper guides is connected to a first wheel 227 of the pair of lower guides with first armatures 232A and 232B. Likewise the fifth wheel 233 of the pair of upper guides is connected to a second wheel 229 of the pair of lower guides with second armatures 234A and 234B.

As illustrated in FIG. 17, the assembly 213 comprises a hinge that functions to displace the axle 237. Because the enclosure 250 and is coupled to the axle 237 by the strut 239, movement of the axle 237 forwardly and/or rearwardly along the horizontal axis will cause the enclosure 250 and prongs to deploy or retract. When the third housing tray 206 is hinged away from the second housing tray 204, the hinge 251 pushes the axle 237 forwardly, pushing the enclosure 250 into a deployed position. Likewise, when the third housing tray 206 is hinged upwardly towards the second housing tray 204, the hinge 251 pushes the axle 237 rearwardly, pushing the enclosure 250 into a deployed position.

Because of the connection of the wheels with the first and second armatures, and the non-translation of the wheels 227 and 229, the wheels 231 and 233 of the upper guides 220 and 222 will translate, pushing the axle 237.

Figure 18:
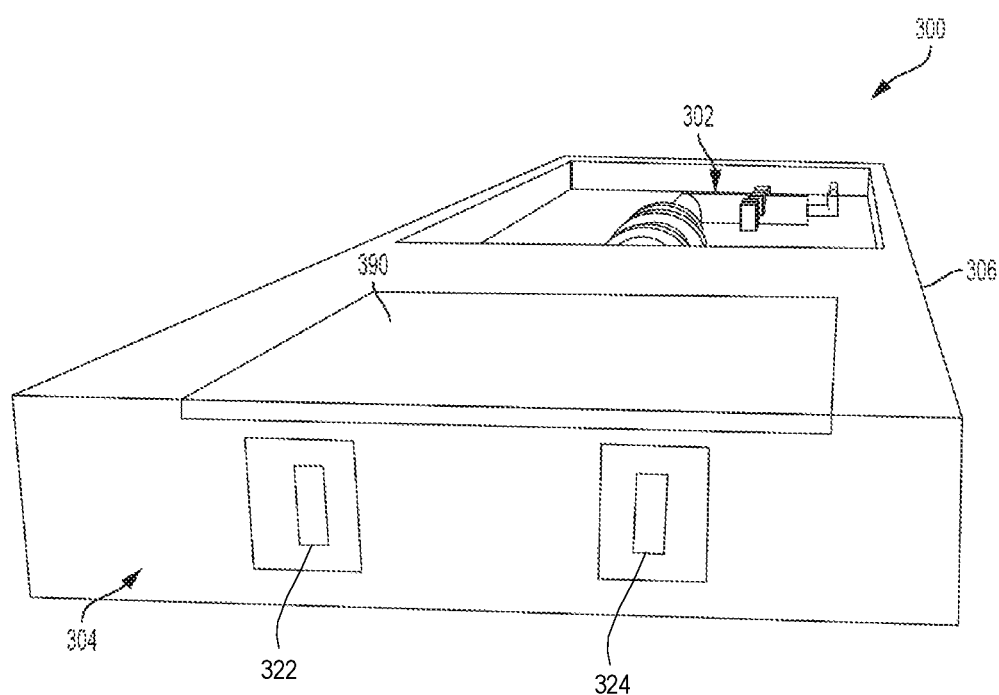
FIG. 18 is a perspective view of another example second housing tray that comprises a pushrod assembly.
Figure 19:
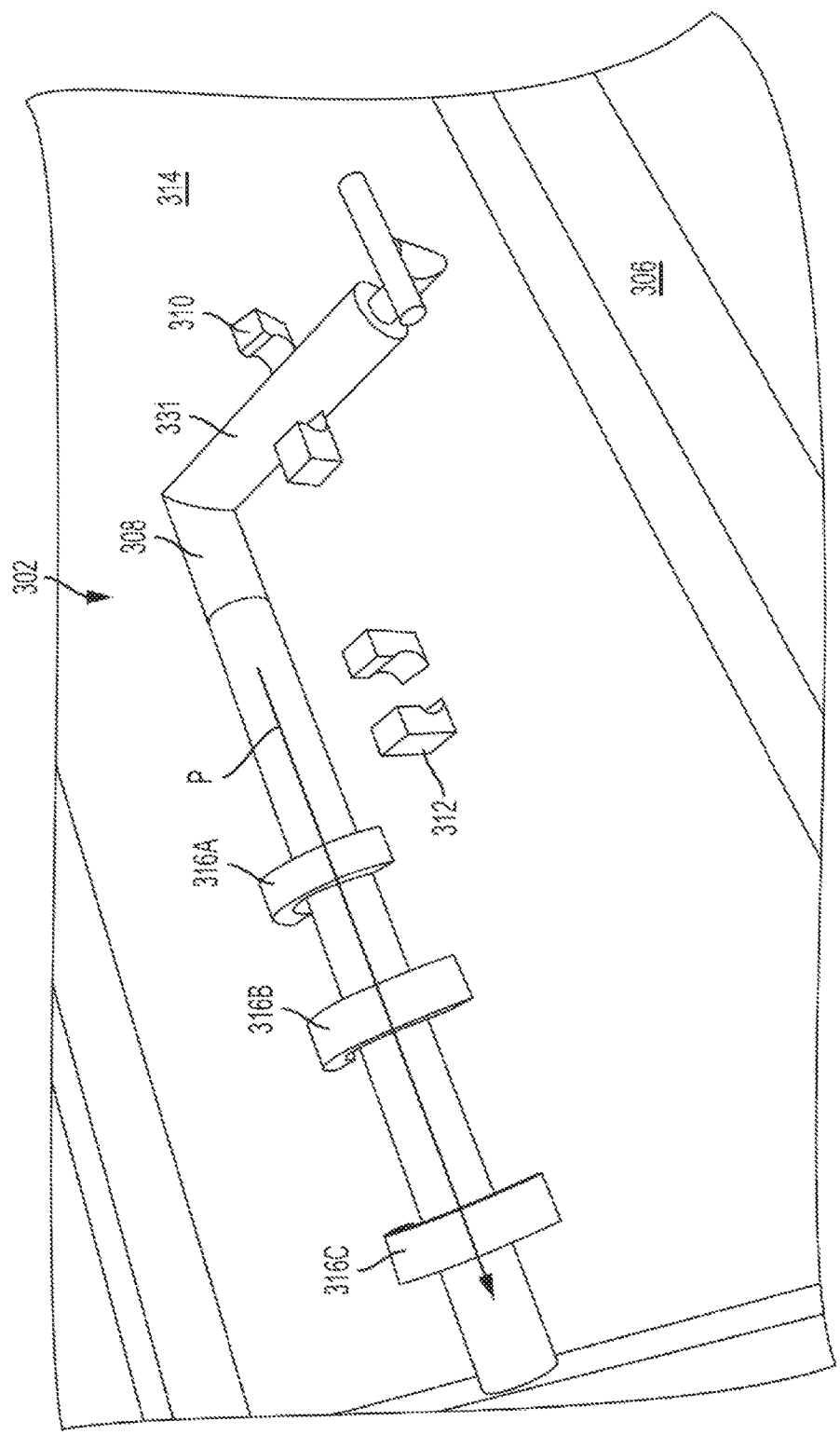
FIG. 19 is a perspective view of the pushrod assembly.
Figure 20:
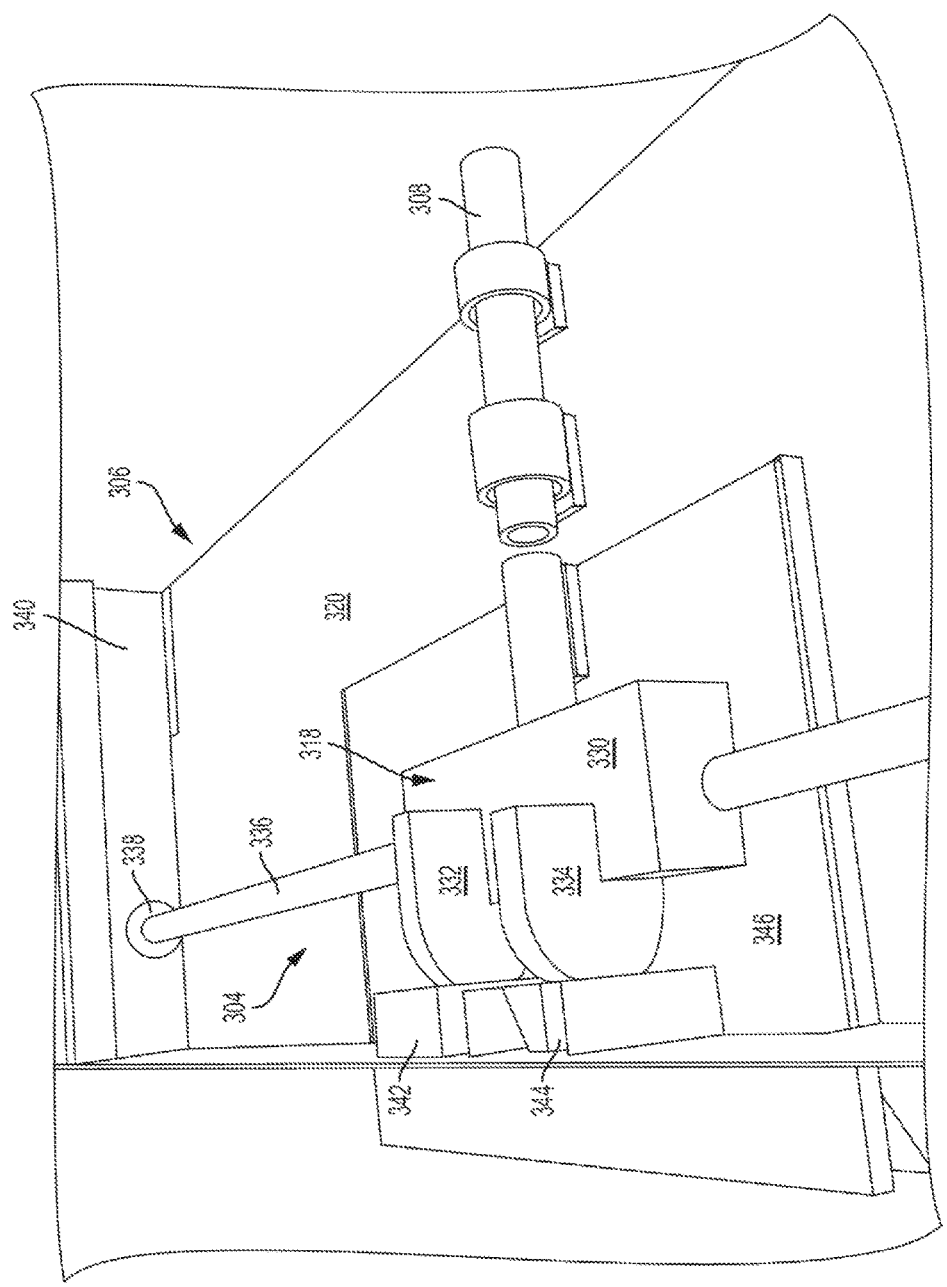
FIG. 20 is a perspective view of the pushrod assembly in combination with a circuit enclosure and electrical connector.

Referring now to FIGS. 18-20, another example device 300 is illustrated. This device 300 comprises a pushrod assembly 302 for moving an electrical connector 304 between deployed and stored configurations.

In FIG. 19, the pushrod assembly 302 is disposed within a second housing tray 306 of the device 300. The pushrod assembly 302 comprises a pushrod 308, a first clip 310 for storing the pushrod 308 when the electrical connector 304 is in the stored configuration (see FIG. 18). A second clip 312 is provided for storing the pushrod 308 when the electrical connector 304 is in the deployed configuration where the prongs are extended. The second housing tray 306 can replace the second housing tray 204 of FIG. 7, for example.

The pushrod embodiment can also comprise a stabilizer 390 that is integrated the bottom surface of the second housing tray 306. The stabilizer 390 is illustrated in greater detail in FIG. 22.

The pushrod 308 is held in place in a cavity 314 of the second housing tray 306 using holders 316A-C.

The device 300 comprises a circuit 318, which can include any circuit that is similar or identical to the circuit of the device 100 of FIG. 1. The circuit 318 is disposed within an enclosure 320. The enclosure 320 also houses the electrical connector 304 such that prongs 322 and 324 of the electrical connector extend from the enclosure 320.

As with the embodiments of FIGS. 9-17, the device 300 includes three separate housing trays such as a first housing tray, the second housing tray, and a third housing tray. As with the device 200 of FIGS. 9-17, the third housing tray is pivotally connected to the second housing tray.

Figure 10A:
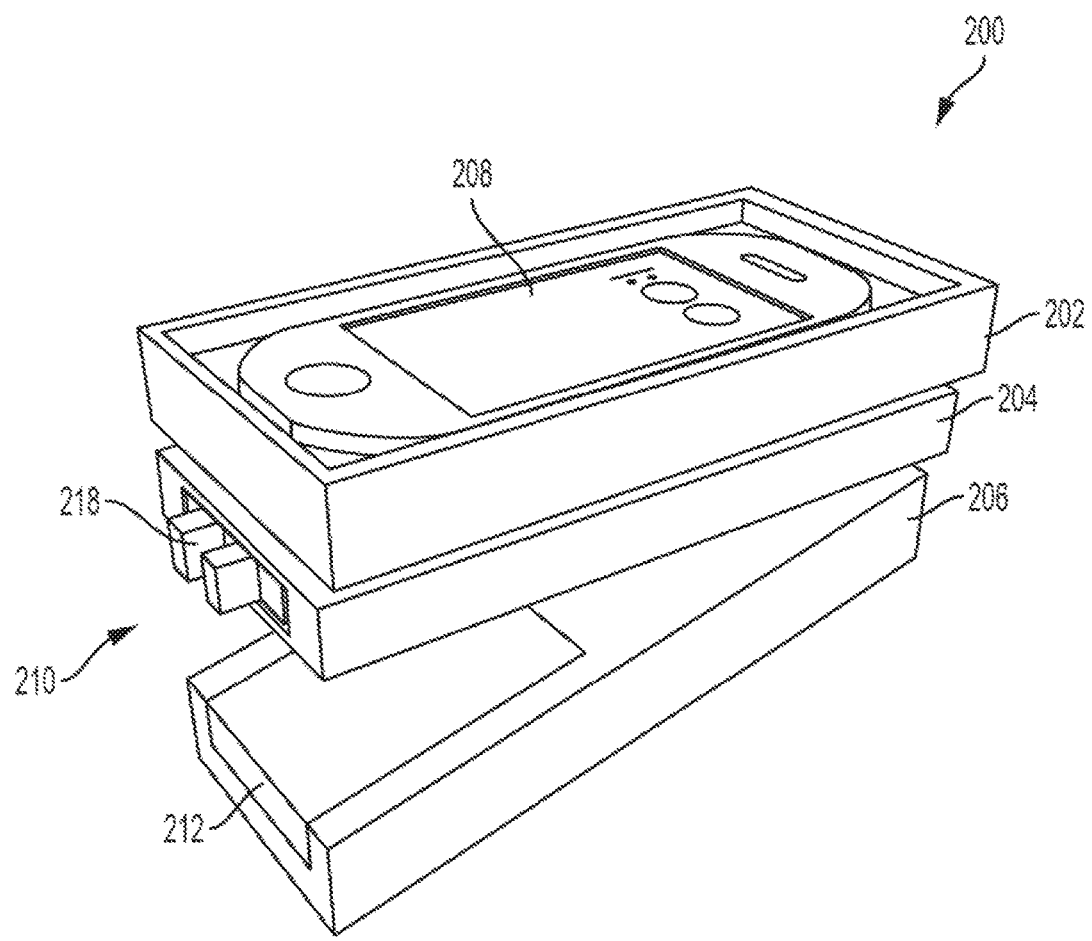
FIG. 10A is another perspective view of the device of FIG. 9.
Figure 10B:
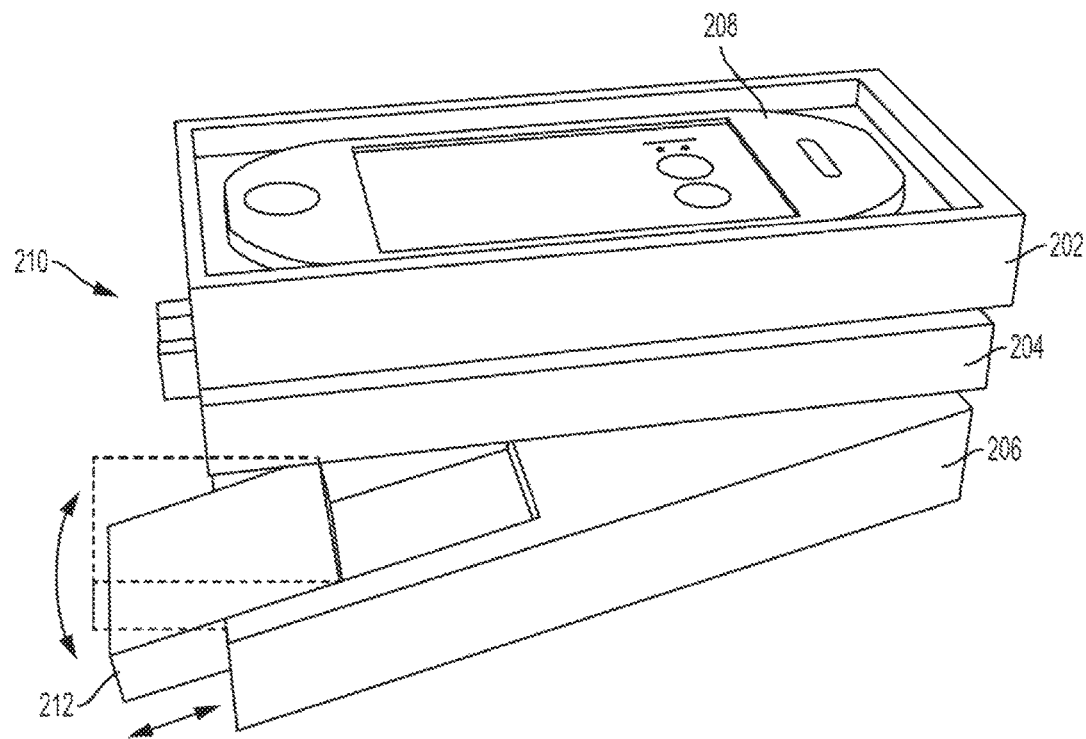
FIG. 10B is another perspective view of the device of FIG. 9, illustrating deployment of a stabilizer.
Figure 11:
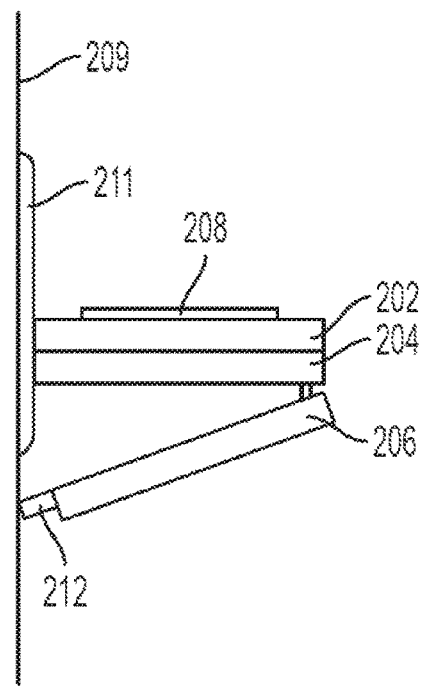
FIG. 11 is a side view of the device of FIG. 9 plugged into an outlet and supported on a wall by a stabilizer.

The pushrod 308 is accessible when the third housing tray is pivoted away from the second housing tray, as illustrated in FIG. 10.

The pushrod 308 has a substantially L-shape with an arm extension 331. The arm extension 331 locks into the first and/or second clips 310 and 312 as needed. When not locked into a clip, the arm extension 331 can be rotated about, and translated along a pushrod axis P to move the electrical connector 304 between the deployed and stored configurations.

As illustrated in FIG. 20, the electrical circuit 318 is enclosed within an enclosure 330. Prongs 332 and 334 are attached to the enclosure 330. For stability, the enclosure 330 is rotatably supported on both sides by a drive shaft 336 that includes wheels, such as wheel 338 that are disposed within tracks, such as track 340, fabricated into the sidewall of the second housing tray 306. As the pushrod 308 is moved along the pushrod axis P, the wheels translated within their respective tracks, allowing the prongs 332 and 334 to move in and out of prong apertures 342 and 344.

In some embodiments, a wall support or stabilizer 346 is also attached to the enclosure 330 (and positioned below the enclosure 330).

Figure 21:
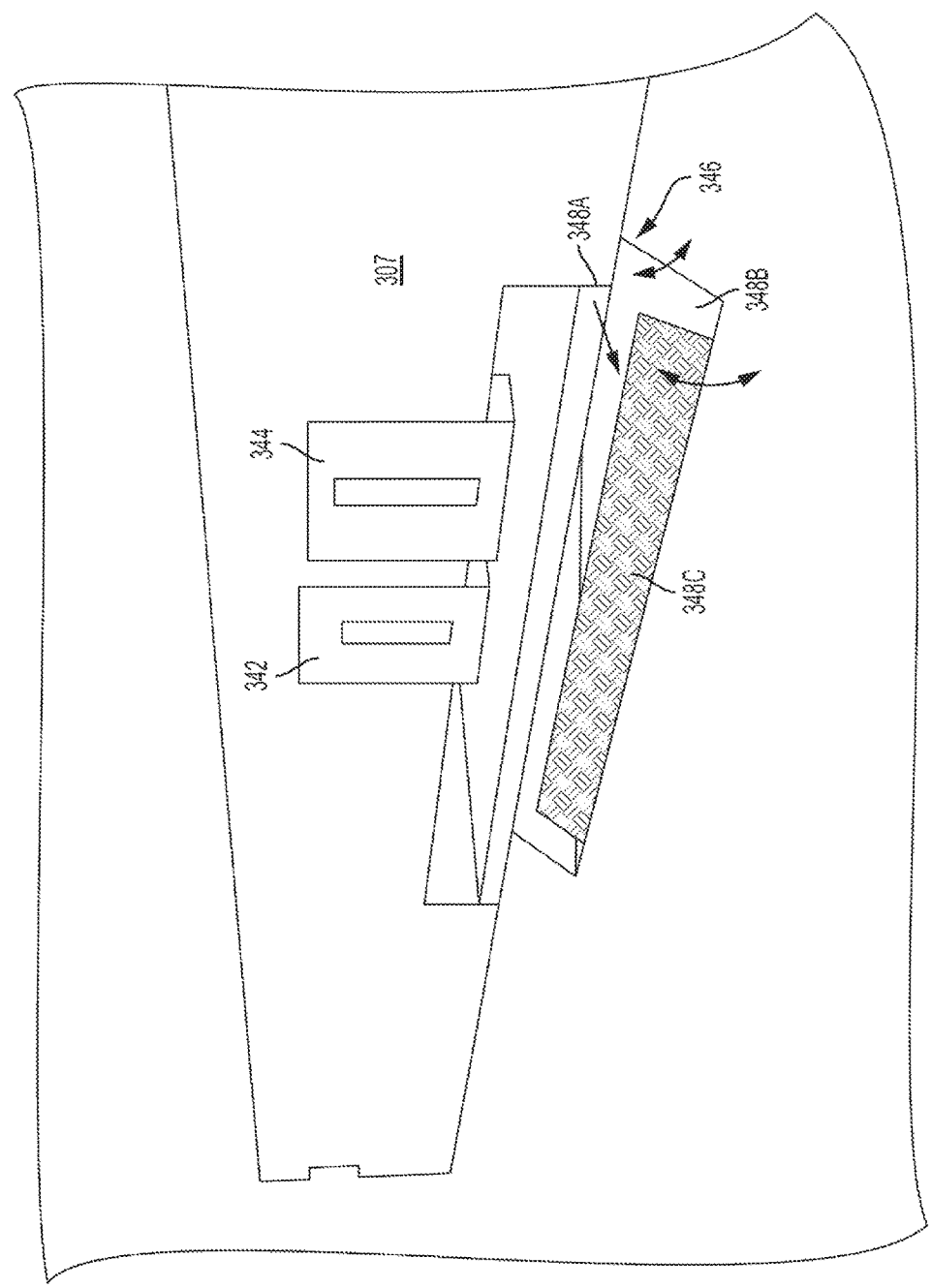
FIG. 21 is a perspective view of an example stabilizer comprising a plurality of stabilizer flaps.

In FIG. 21, the stabilizer 346 is provided with three sections or flaps 348A-C. A primary flap 348A extends from the third housing tray 307 when the pushrod 308 is moved forward. A secondary flap 348B pivots from the bottom of the primary flap 348A, and a tertiary flap 348C pivots outwardly from the top of the secondary flap 348B. Depending upon the geometry of the wall or outlet, the primary, secondary, or tertiary flaps can be deployed.

Figure 22:
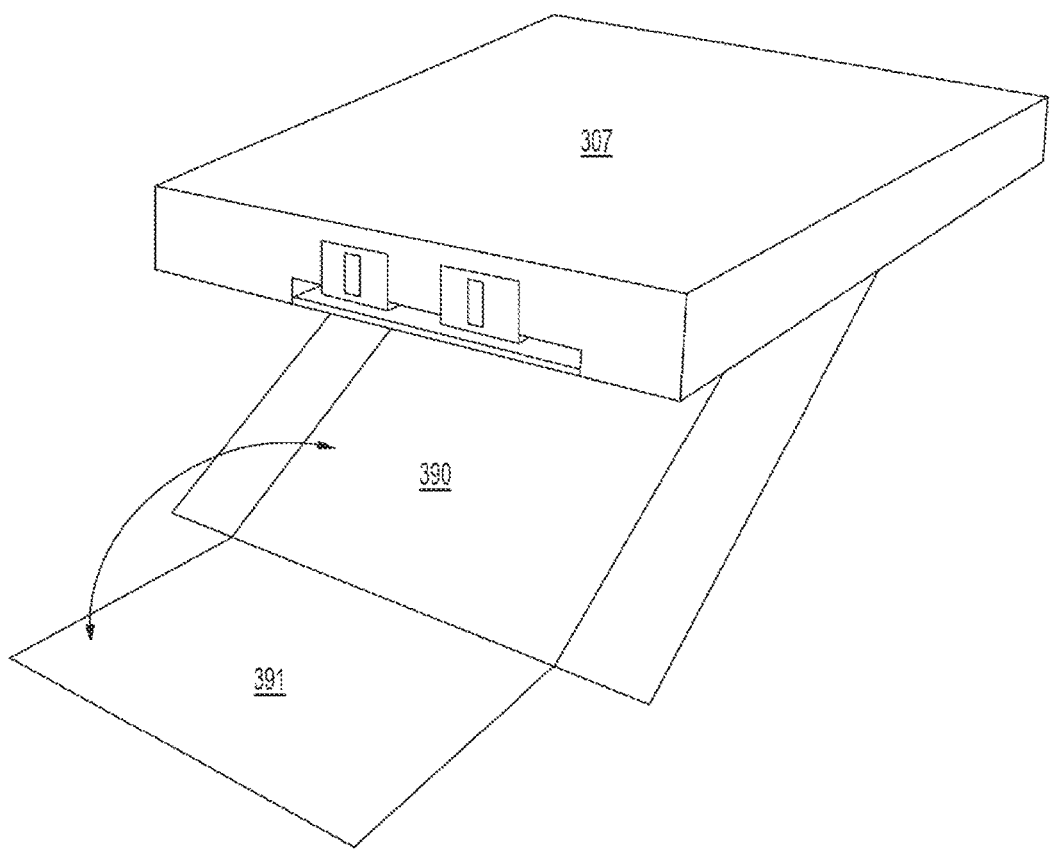
FIG. 22 is a perspective view of another example stabilizer.

In FIG. 22, the third housing tray 307 can comprise a pull down, pivoting stabilizer 390 that pivots from a lower portion of the third housing tray 307. In some embodiments, the pull down, pivoting stabilizer 390 comprises a secondary flap 391 that pivots away from the body of the pull down, pivoting stabilizer 390. The secondary flap 391 can contact a wall or other surface to stabilize the device when plugged into an electrical outlet.

The stabilizer 390 of FIG. 22 can alternatively be used in any housing tray embodiment described herein.

FIGS. 23-40 collectively illustrate additional embodiments of electrical charging devices that incorporate electrical input connectors such as USB connectors, micro USB connectors, and other similar electrical connectors that are configured to interface with power sources such as wall outlets or other charging devices.

Figure 23:
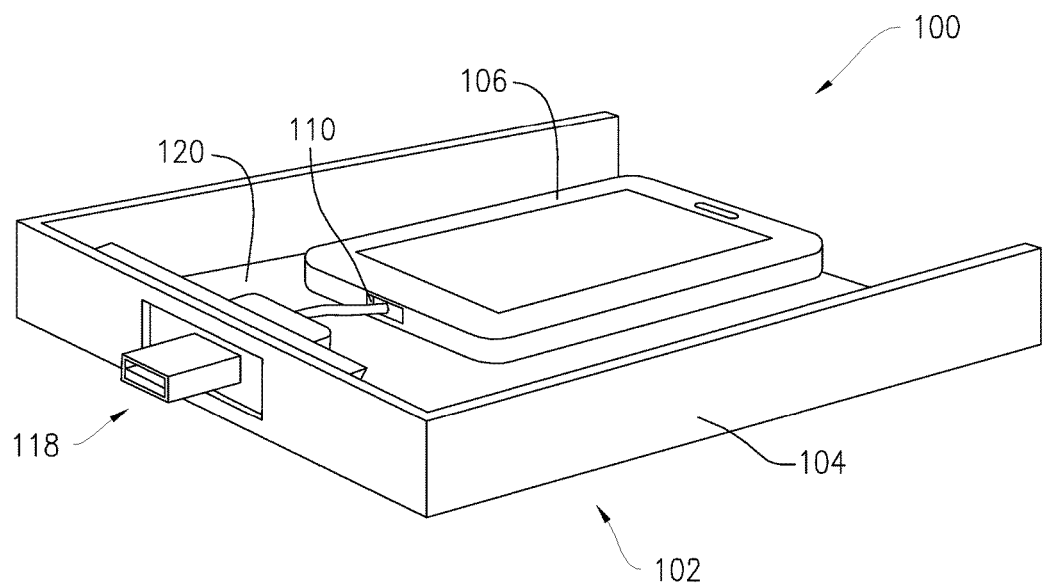
FIG. 23 is a perspective view of an example device of the present technology comprising a USB connector.
Figure 24:
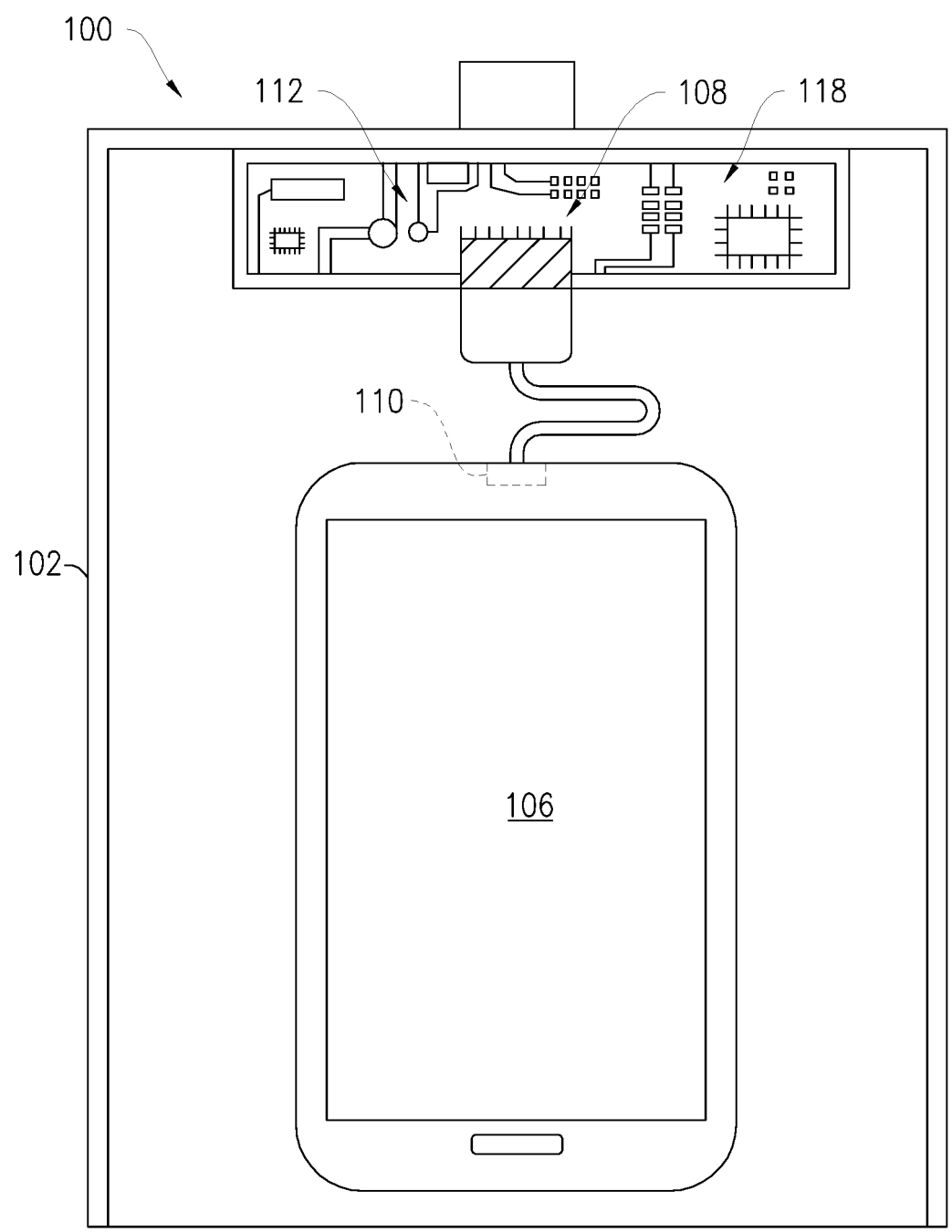
FIG. 24 is a top down view of the device of FIG. 23.
Figure 25:
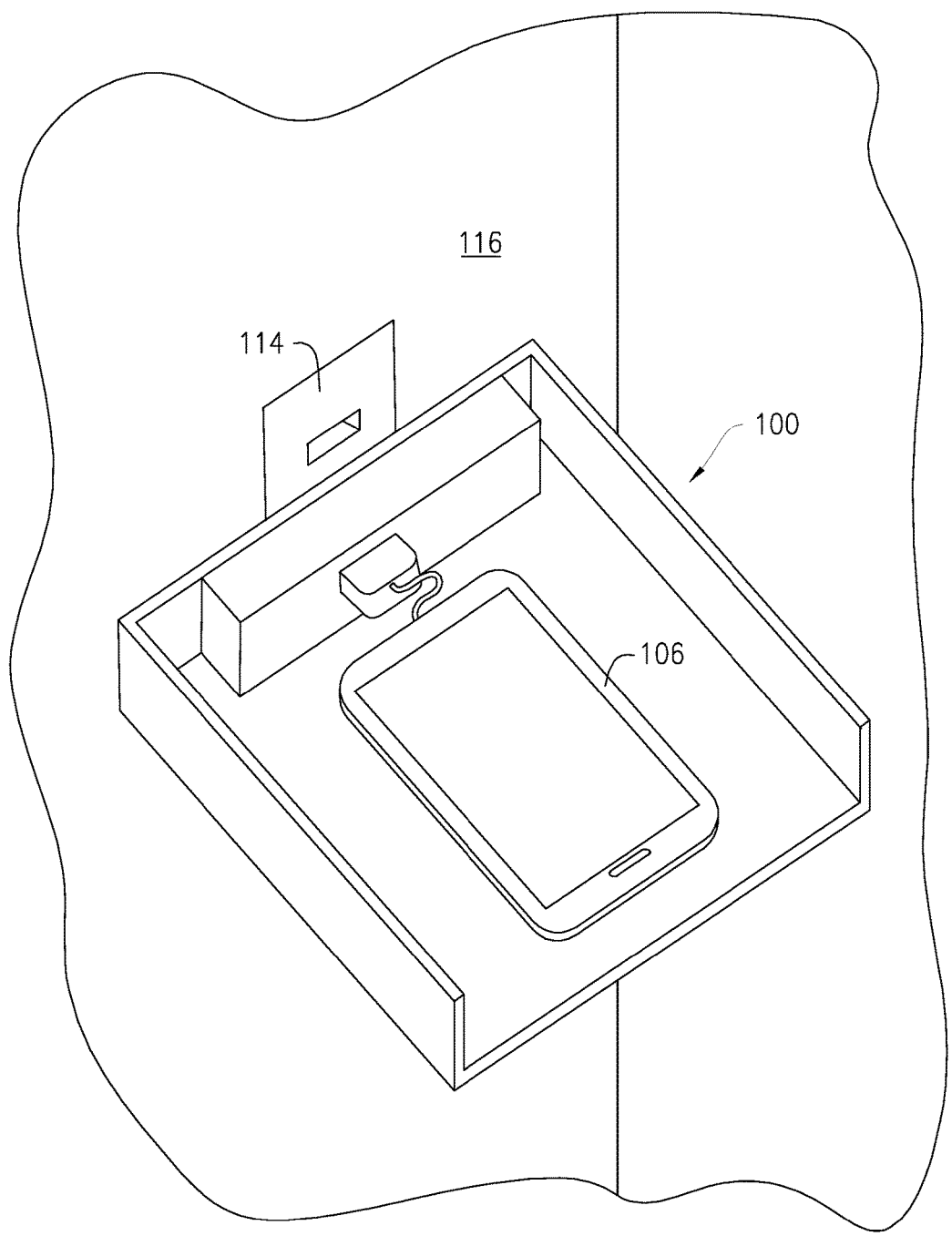
FIG. 25 is a perspective view of the device of FIG. 23, installed into an outlet of a wall.
Figure 26:
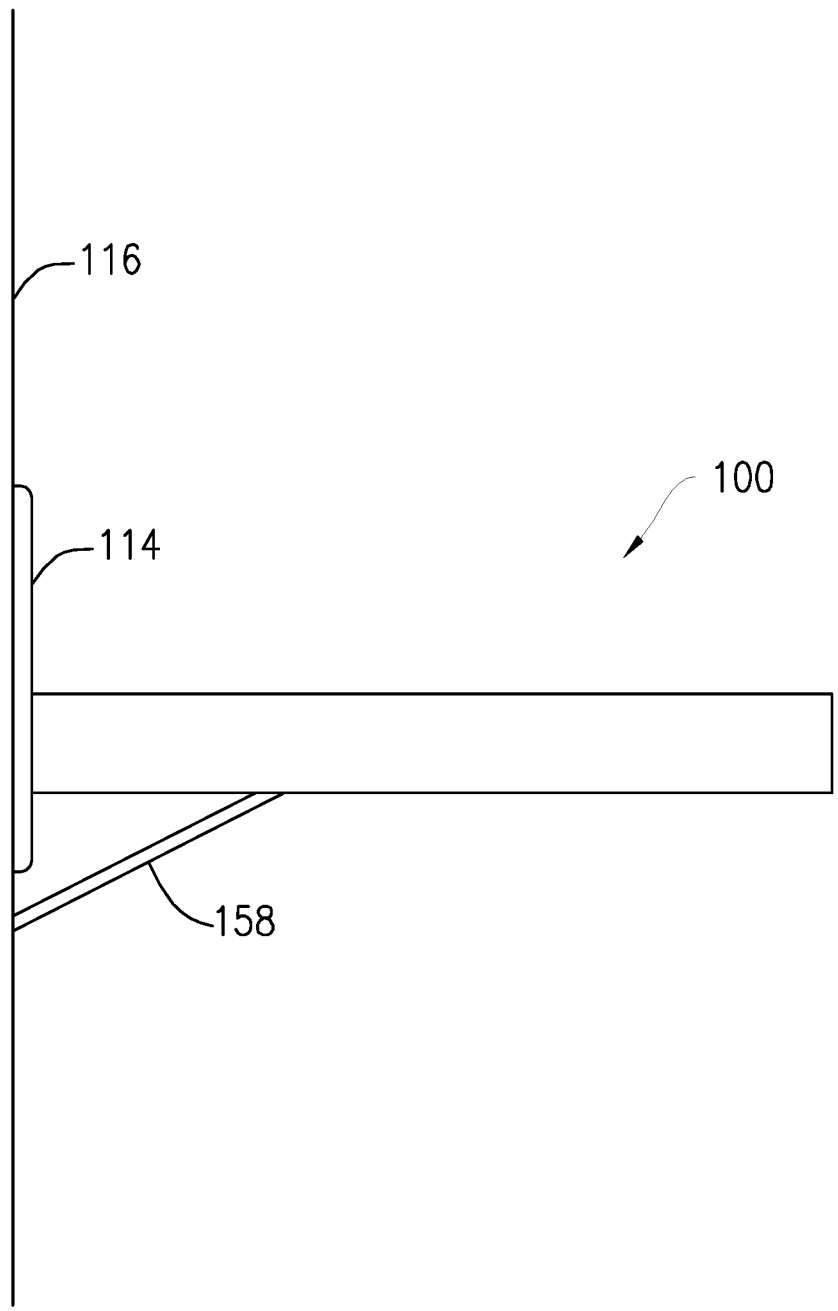
FIG. 26 is a side view of the device of FIG. 23, installed into an outlet of a wall.
Figure 27:
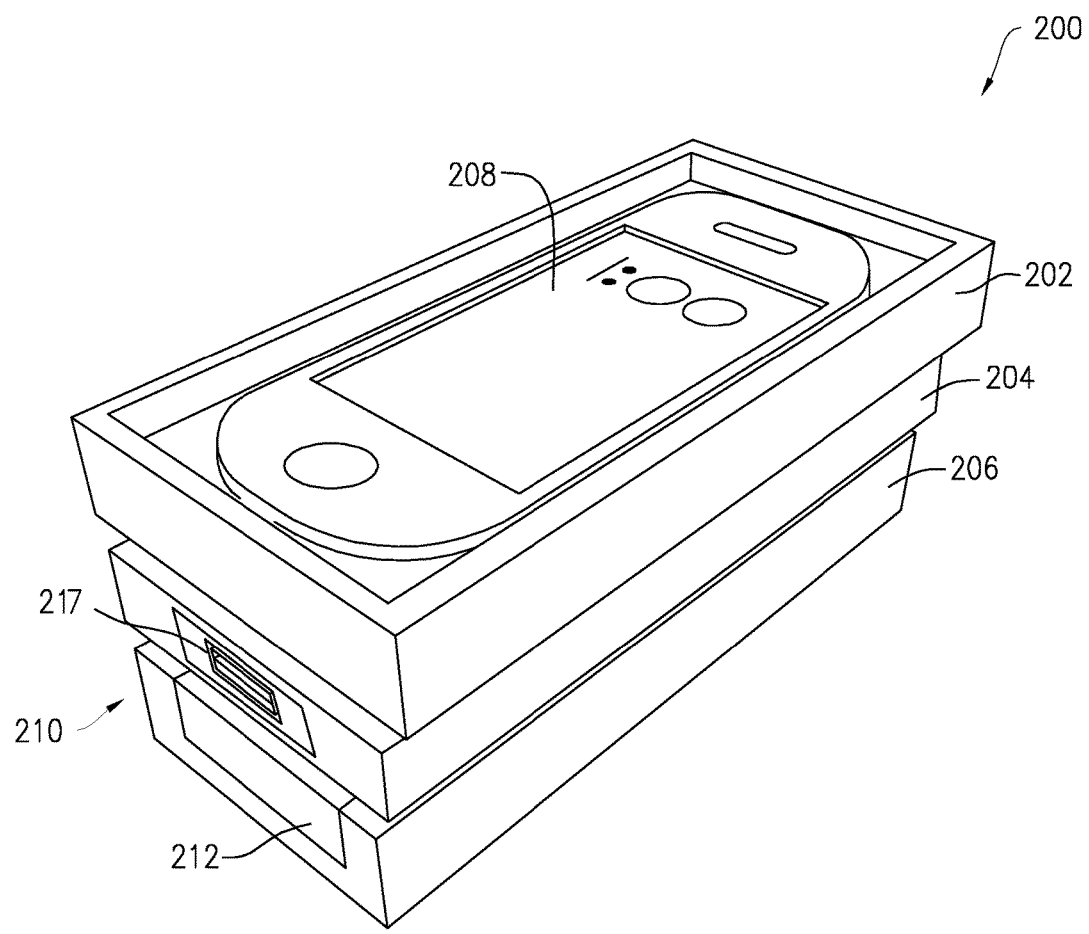
FIG. 27 is a perspective view of another example device of the present technology.
Figure 28A:
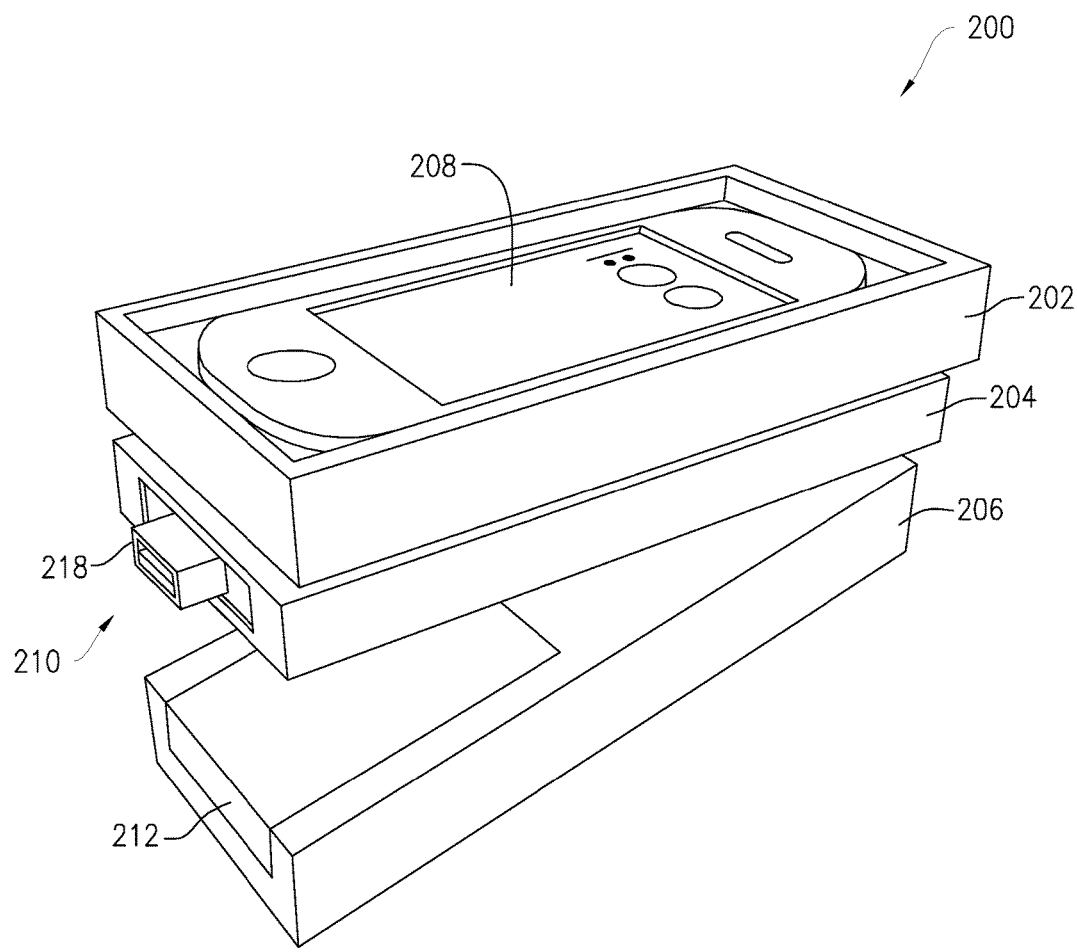
FIG. 28A is another perspective view of the device of FIG. 27.
Figure 28B:
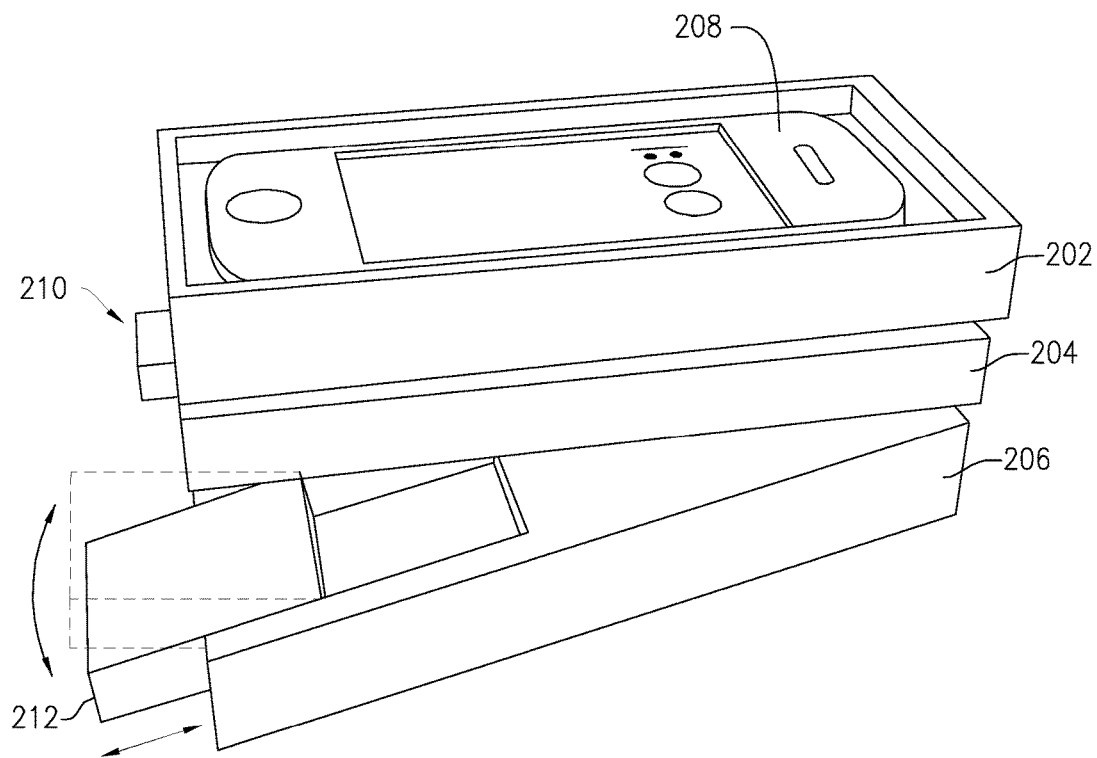
FIG. 28B is another perspective view of the device of FIG. 27, illustrating deployment of a stabilizer.

FIGS. 23-24 collectively illustrate an electrical charging device 100 that includes a housing tray 102 having a sidewall 104 extending perpendicularly from the housing tray 102. The housing tray 102 is configured to hold a personal electronic device 106.

The housing tray 102 comprises an electrical connector interface 108 that couples with a charging connector 110 of the personal electronic device 106, as illustrated in FIG. 24. The device 100 also includes a circuit 112 mounted on the housing tray 102 for converting alternating current received from an electrical outlet 114 of a wall 116 (see FIGS. 24 and 25) to direct current that charges the personal electronic device 106 through the electrical connector interface 108.

To be sure, the circuit 112 can also be configured to amplify or reduce DC power received from an electrical outlet 114. In one embodiment, the electrical outlet 114 includes a USB port that is configured to deliver DC power. Some embodiments of USB connectors, and specifically wall outlet based USB connections may carry AC power. Thus, the circuit 112 can be configured with any of the components of FIGS. 5 and 6 above.

In some embodiments, the circuit 112 can be omitted all together, such as when the DC source provides a DC power signal that does not require amplification or any signal processing.

In some embodiments, the device 100 includes an electrical connector 118 for electrically coupling the circuit 112 with the electrical outlet 114.

Rather than plugging into an electrical outlet 114, the electrical connector 118 can be coupled with a USB port of another computing device, such as a laptop computer or a charger device that plugs into a standard two or three pronged electrical wall outlet (as with the standard AC electrical outlet illustrated in the embodiment of FIG. 3).

As mentioned above, the electrical connector 118 can comprise a USB connector, a micro USB connector, or any other connector capable of interfacing with a DC source.

Some embodiments allow the electrical connector 118 to be configured to be placed in either a deployed configuration (see FIGS. 28A and 28B) where the electrical connector 118 can couple with the electrical outlet 114 or a stored configuration (see FIG. 27) where the electrical connector 118 cannot couple with the electrical outlet 114.

In more detail, the housing tray 102 includes a plate 120. The plate 120 supports the circuit 112 and the personal electronic device 106. The sidewall 104 extends around at least a portion of a periphery of the plate 120. In one example, the sidewall 104 extends around one or more sides, and in some embodiments four sides of the plate 120.

According to some embodiments, the circuit 112 can comprise a printed circuit board with various permutations of electrical components. In general, the circuit 112 is configured to transform the AC power waveform received from the outlet 114 into DC power that is appropriate for charging the personal electronic device 106.

In some embodiments, the circuit 112 can include combinations of electrolytic capacitors, MOSFET switching transistors, flyback transformers, a controller integrated circuit, capacitors, diodes, R-C snubber circuits, EMI (electromagnetic interference) circuits, inductors, control chips, Schottky diodes, Tantalum filter capacitors, as well as any combinations thereof, in order to provide the desired transformation of AC to DC functions.

Again, these circuitry features are required if the charging device 100 is coupled with an AC source, rather than a DC source, or if a DC source requires modification.

Turning back to FIG. 26 briefly, in some embodiments, the housing tray 102 is provided with a stabilizer 158 that pivotally extends from a lower part of the housing tray 102. The stabilizer 158 is configured to contact the electrical outlet 114 or a wall 116 of the electrical outlet 114.

Turning now to FIGS. 27-35, which collectively illustrate another example device 200, which is constructed in accordance with the present technology. The device includes plurality of housing trays. In one embodiment, the plurality of housing trays includes a first housing tray 202, a second housing tray 204, and a third housing tray 206. The device 200 can comprise additional of fewer housing trays than those illustrated. An electrical device 208 is disposed in the first housing tray 202.

The second housing tray 204 is provided with an electrical connector 210 that includes a USB connector 217. The third housing tray 206 comprises a stabilizer 212 that is capable of being disposed in a stored configuration (see FIG. 27), and a deployed configuration (see FIGS. 28A and 28B). The third housing tray 206 is pivotally or hingedly connected (for example, at third wheel 236) to the second housing tray 204 (see FIG. 33 and FIG. 34) and, in some embodiments supports the weight of the personal electronic device 208 by contacting the wall 209 or the electrical outlet 211 (see FIG. 29 and FIG. 30).

Figure 29:
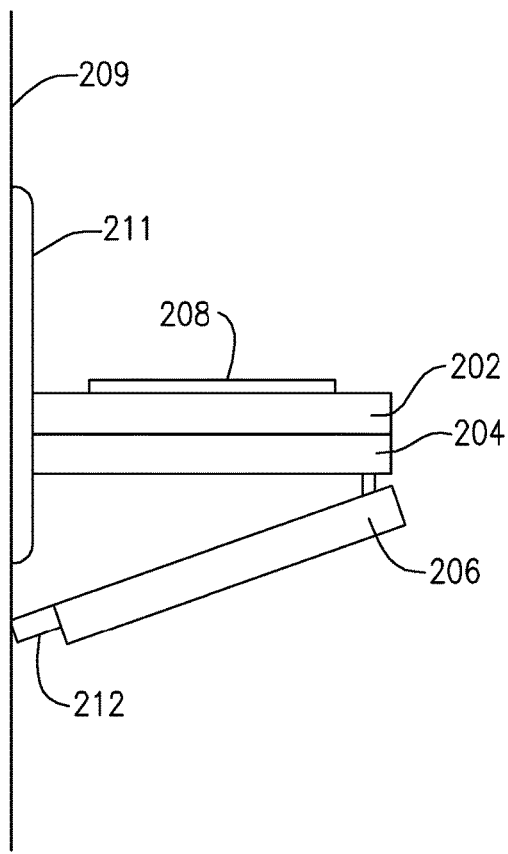
FIG. 29 is a side view of the device of FIG. 27 plugged into an outlet and supported on a wall by a stabilizer.

As illustrated in FIG. 29, the stabilizer 212 (or a section of the stabilizer 212) rotates when extended from the third housing tray 206 such that a mating surface 215 of the stabilizer 212 rests flat against the wall or the electrical outlet.

Figure 30:
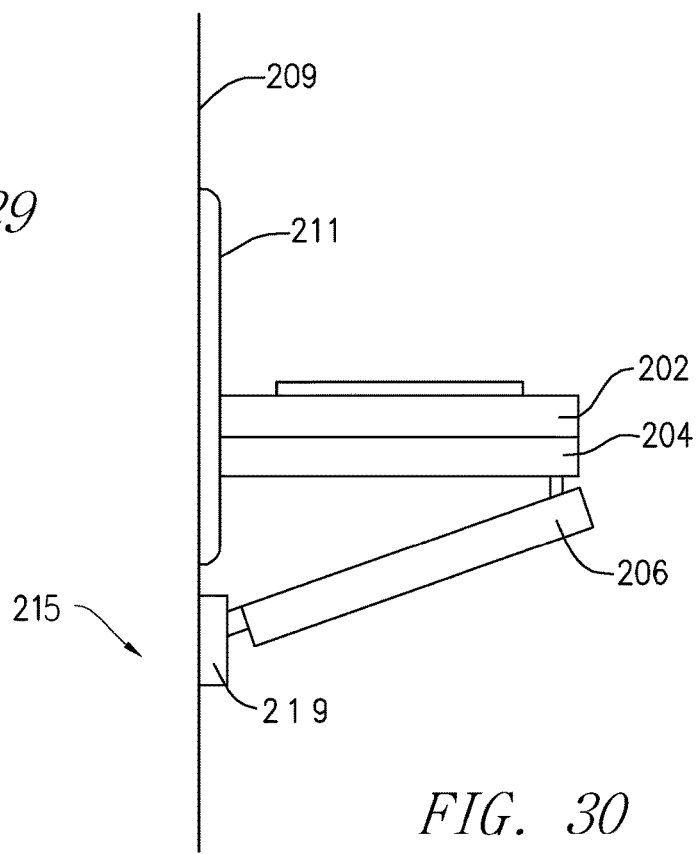
FIG. 30 is a side view of the device of FIG. 27 plugged into an outlet and supported on a wall by a two section stabilizer.
Figure 31:
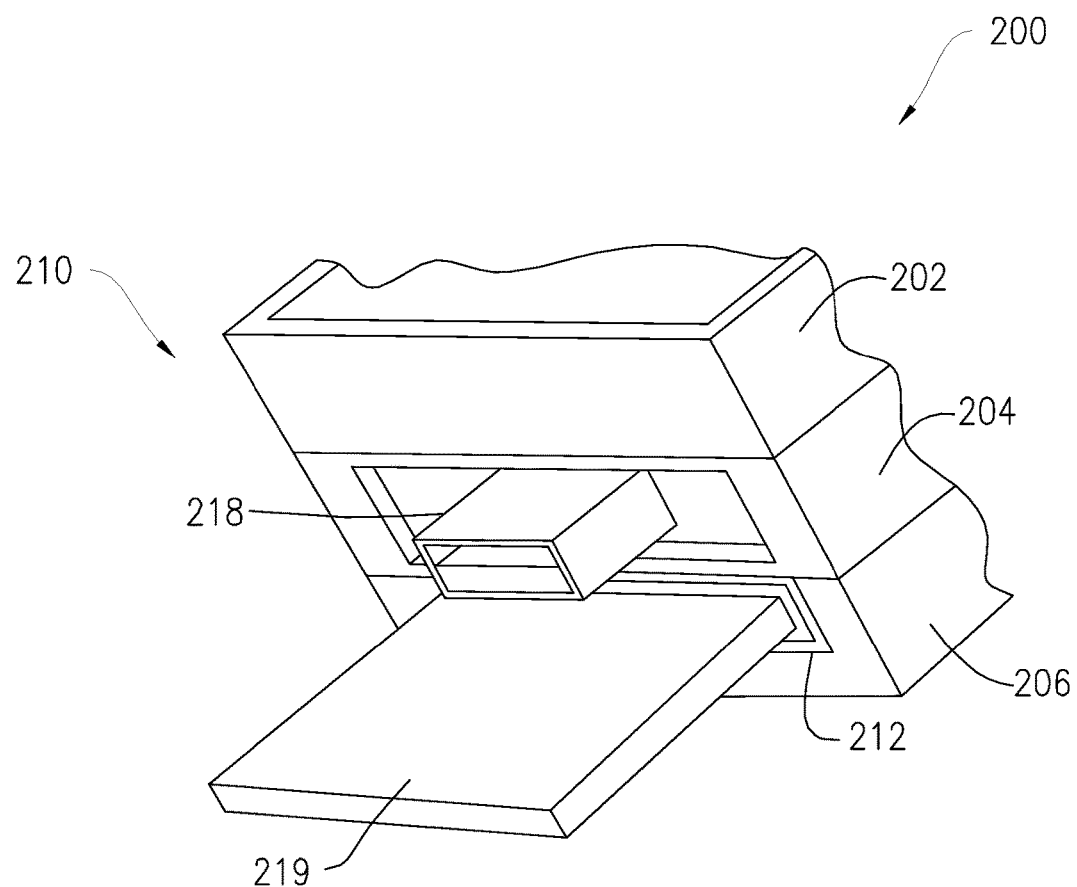
FIG. 31 is a perspective view of a stabilizer with an internal stabilizer flap.

FIG. 30 illustrates the stabilizer 212, which includes an internal stabilizer flap 219 that extends from the stabilizer 212.

In some embodiments, the hinged movement of the third housing tray 206 relative to the second housing tray 204 causes the linear movement of the electrical connector 210. For example, hinged movement of the third housing tray 206 causes the electrical connector 210 to translate along a horizontal axis H when moving between the deployed and stored configurations. Additional details regarding the movement of the electrical connector 210 are provided with respect to FIGS. 32-35.

Figure 32:
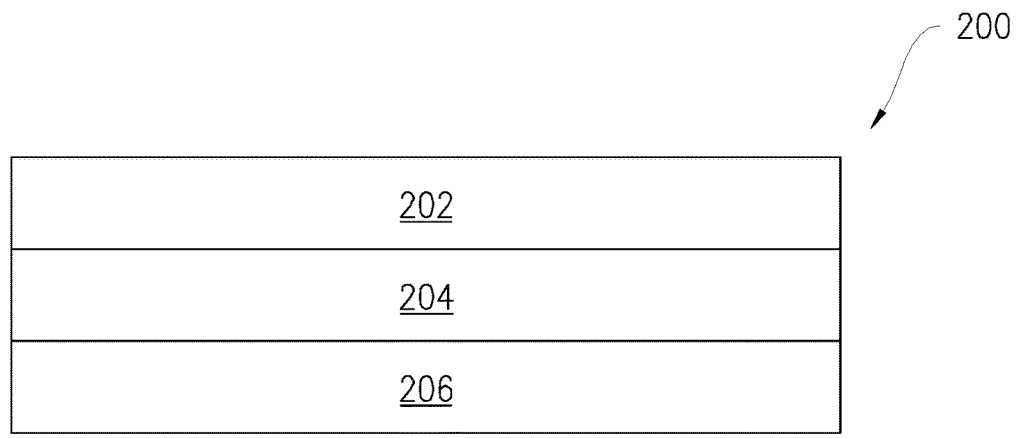
FIG. 32 is a perspective view of the device of FIG. 27, in a stored configuration.
Figure 33:
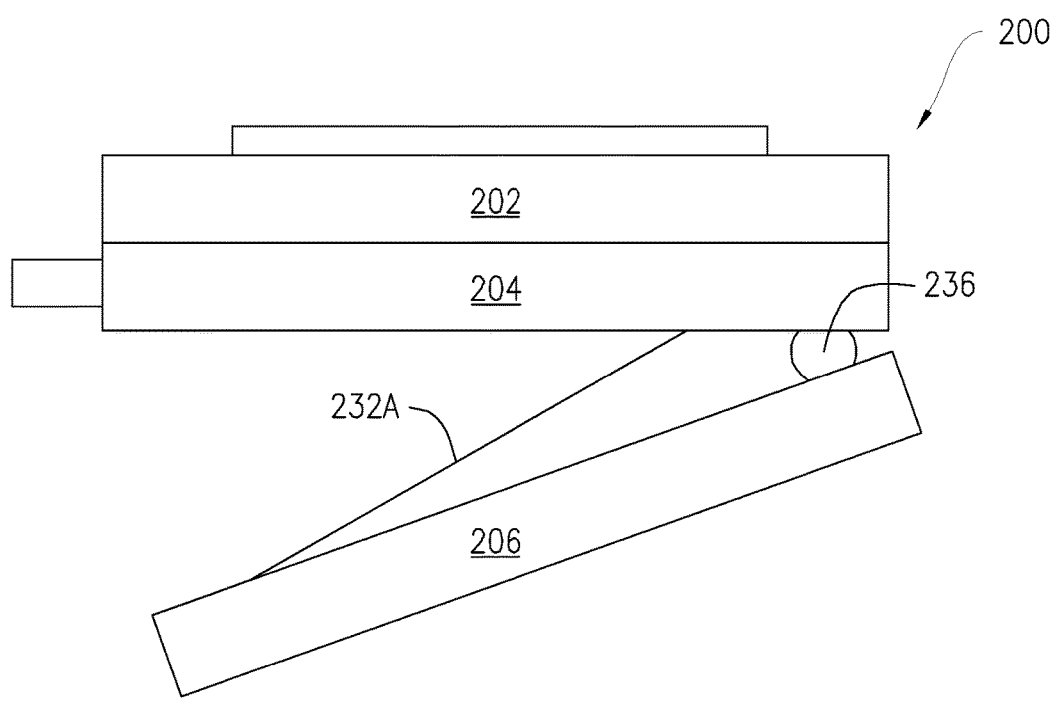
FIG. 33 is a perspective view of the device of FIG. 27, in a deployed configuration, showing vertical and horizontal axes of travel.

FIGS. 32 and 33 illustrate side elevational views of the device 200 in both a retracted (FIG. 32) and a deployed configuration (FIG. 33).

Figure 34:
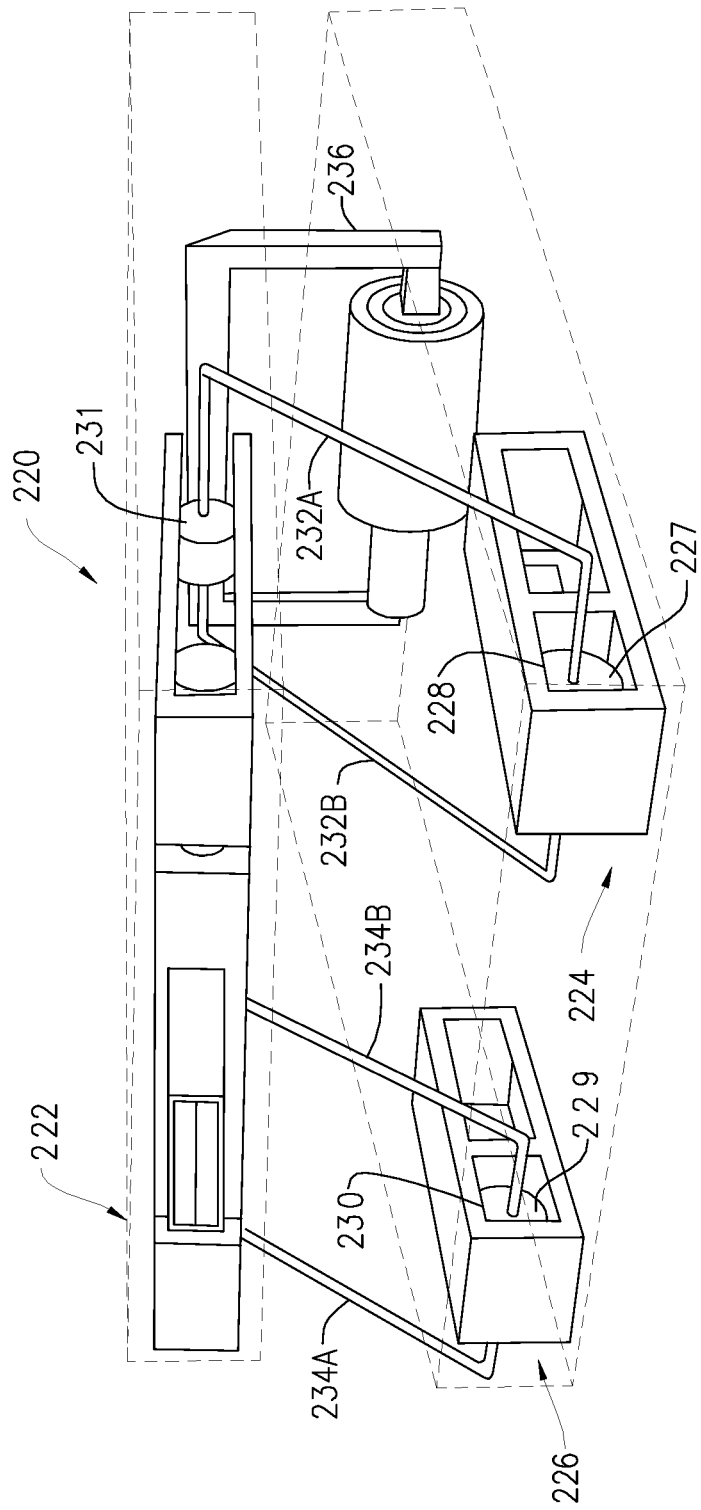
FIG. 34 is a perspective view of a pair of upper and lower guides with hinges attached.
Figure 35:
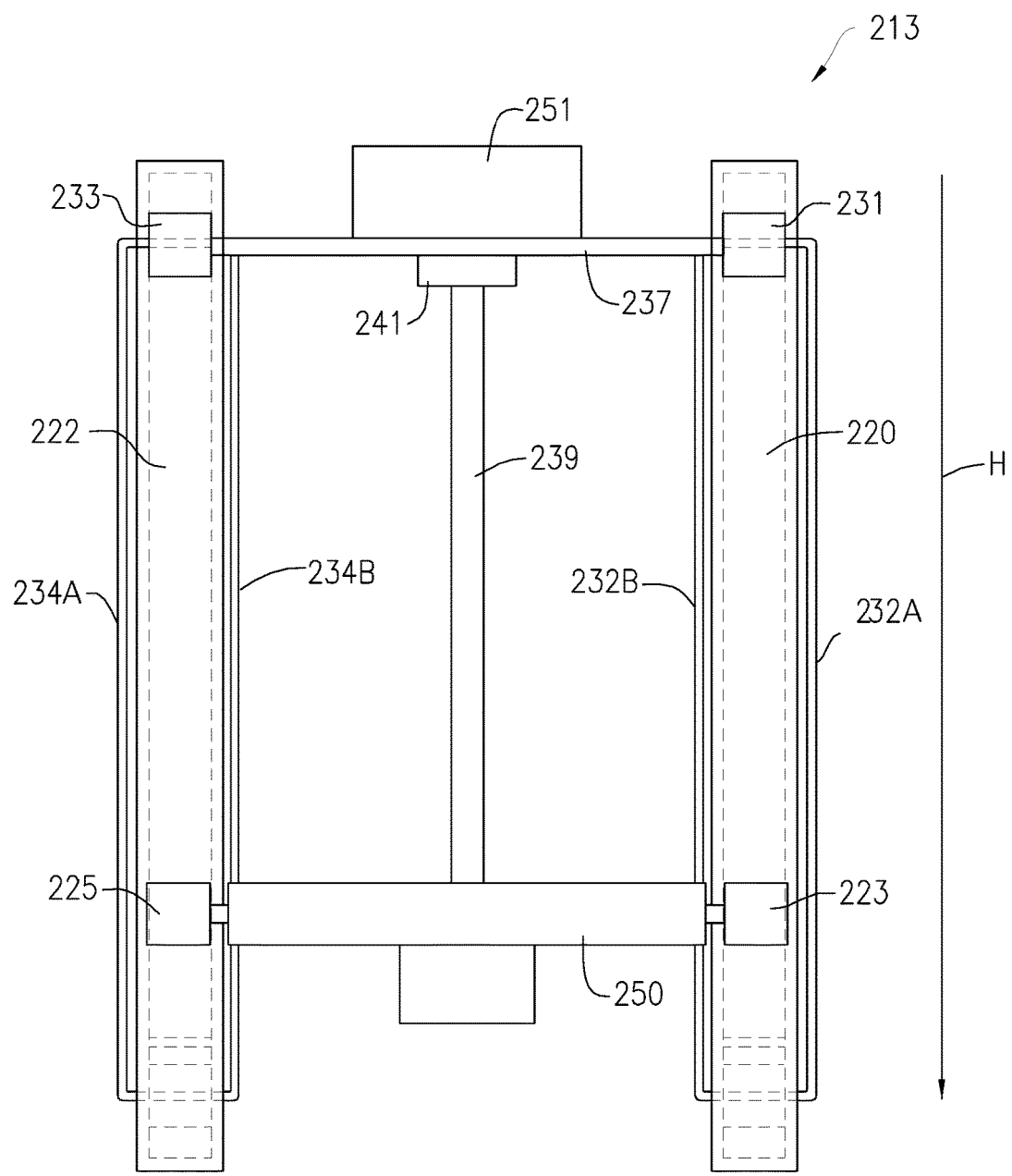
FIG. 35 is a top down view of the pair of upper and lower guides with hinges attached of FIG. 34.

FIGS. 34 and 35 collectively illustrate an example electrical connector actuator assembly 213 that is configured to move the electrical connector 210 between deployed and/or stored configurations.

The assembly 213 comprises a pair of upper guides 220 and 222, and the second housing tray comprises a pair of lower guides 224 and 226. The upper guides 220 and 222 are associated with the second housing tray 204 and the lower guides are associated with the third housing tray 206.

The upper guides 220 and 222 comprise substantially rectangular frames that are configured to receive wheels 223 and 225 therein, as described below. The wheels 223 and 225 will translate or travel within the upper guides 220 and 222, which causes the electrical connector 210 to move along the horizontal axis H. In some embodiments, as illustrated in FIG. 34, the circuit and enclosure 250 is coupled with the upper guides 220 and 222 using the wheels 223 and 225.

The lower guides 224 and 226 also comprise rectangular frames that each comprises a confinement area such as confinement areas 228 and 230 that are configured to receive wheels 227 and 229. The confinement areas 228 and 230 allow the wheels to rotate therein but not translate along the guides 224 and 226.

A fourth wheel 231 and fifth wheel 233 are also within the upper guides 220 and 222. The fourth wheel 231 and fifth wheel 233 are joined to an axle 237.

A strut 239 extends between the enclosure 250 and the axle 237. The strut 239, in some embodiments, is coupled to the axle 237 with an annular ring 241 that allows the axle 237 to freely rotate while allowing the axle to push and/or pull the strut along the horizontal axis H as the wheels 231 and 233 translated within the upper guides 220 and 222.

In one embodiment, the fourth wheel 231 of the pair of upper guides is connected to a first wheel 227 of the pair of lower guides with first armatures 232A and 232B. Likewise the fifth wheel 233 of the pair of upper guides is connected to a second wheel 229 of the pair of lower guides with second armatures 234A and 234B.

The assembly 213 comprises a hinge that functions to displace the axle 237. Because the enclosure 250 and is coupled to the axle 237 by the strut 239, movement of the axle 237 forwardly and/or rearwardly along the horizontal axis will cause the enclosure 250 and prongs to deploy or retract. When the third housing tray 206 is hinged away from the second housing tray 204, the hinge 251 pushes the axle 237 forwardly, pushing the enclosure 250 into a deployed position. Likewise, when the third housing tray 206 is hinged upwardly towards the second housing tray 204, the hinge 251 pushes the axle 237 rearwardly, pushing the enclosure 250 into a deployed position.

Because of the connection of the wheels with the first and second armatures, and the non-translation of the wheels 227 and 229, the wheels 231 and 233 of the upper guides 220 and 222 will translate, pushing the axle 237.

Referring now to FIGS. 37-40, another example device 300 is illustrated. This device 300 comprises a pushrod assembly 302 for moving an electrical connector 304 between deployed and stored configurations.

Figure 36:
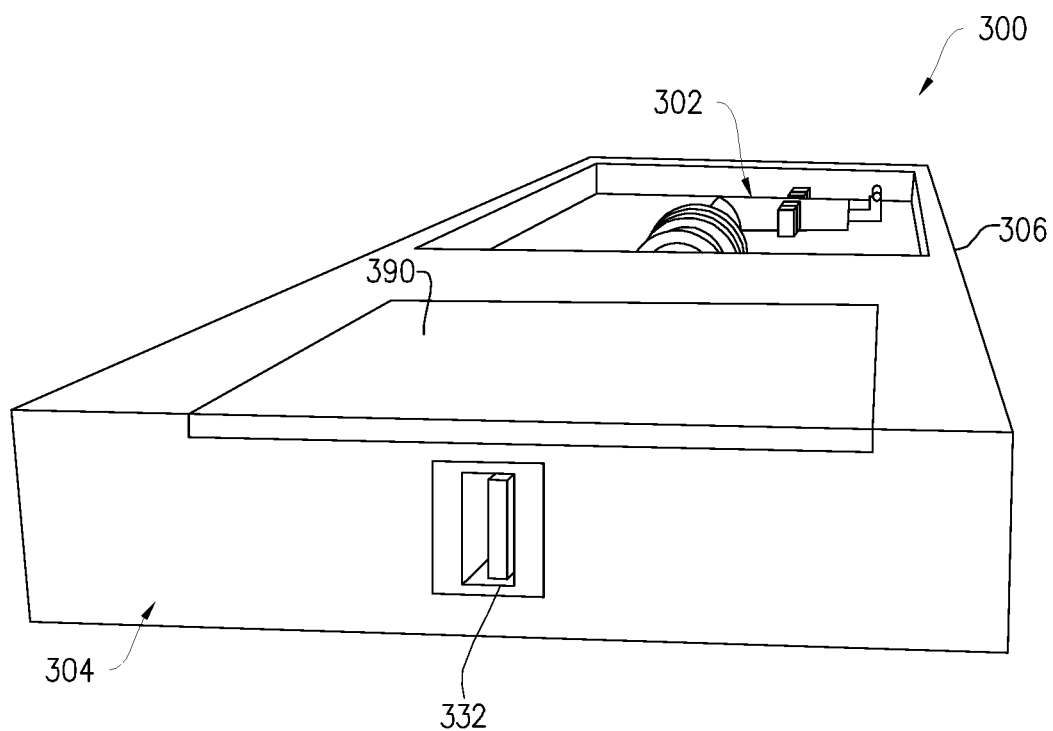
FIG. 36 is a perspective view of another example second housing tray that comprises a pushrod assembly.
Figure 37:
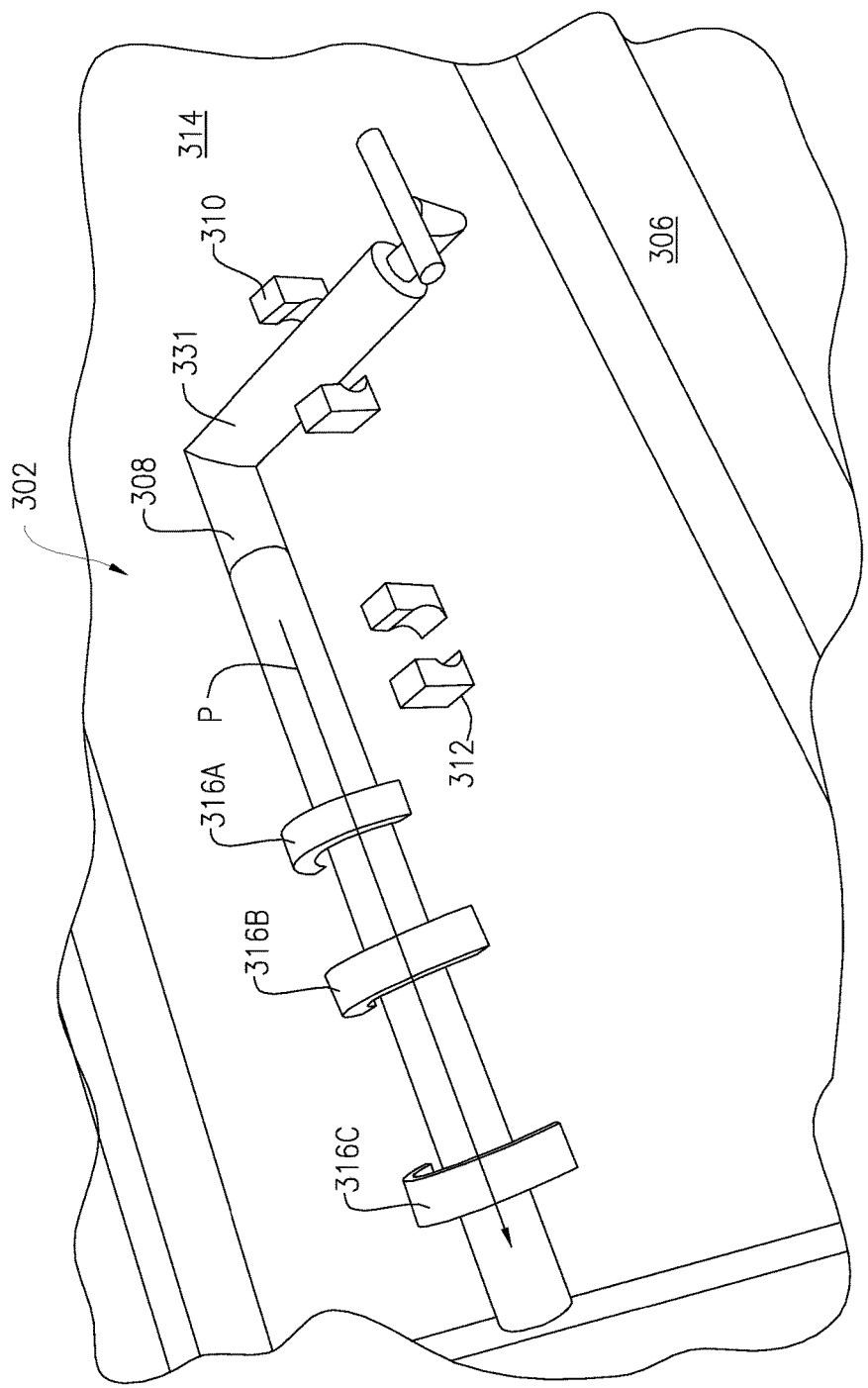
FIG. 37 is a perspective view of the pushrod assembly.

In FIGS. 36 and 37, the pushrod assembly 302 is disposed within a second housing tray 306 of the device 300. The pushrod assembly 302 comprises a pushrod 308, a first clip 310 for storing the pushrod 308 when the electrical connector 304 is in the stored configuration. A second clip 312 is provided for storing the pushrod 308 when the electrical connector 304 is in the deployed configuration where the prongs are extended. The second housing tray 306 can replace the second housing tray 204 of FIG. 27, for example.

The pushrod embodiment can also comprise a stabilizer 390 that is integrated the bottom surface of the second housing tray 306. The stabilizer 390 is illustrated in greater detail in FIG. 40.

The pushrod 308 is held in place in a cavity 314 of the second housing tray 306 using holders 316A-C.

The device 300 may comprise a circuit 318, which can include any circuit that is similar or identical to the circuit of the device 100 of FIG. 1. The circuit 318 is disposed within an enclosure 320. The enclosure 320 also houses the electrical connector 304 such that USB connector 333 of the electrical connector extend from the enclosure 320.

In some embodiments, the device 300 includes three separate housing trays such as a first housing tray, the second housing tray, and a third housing tray. As with the device 200 of FIGS. 27-35, the third housing tray is pivotally connected to the second housing tray.

The pushrod 308 is accessible when the third housing tray is pivoted away from the second housing tray.

The pushrod 308 has a substantially L-shape with an arm extension 331. The arm extension 331 locks into the first and/or second clips 310 and 312 as needed. When not locked into a clip, the arm extension 331 can be rotated about, and translated along a pushrod axis P to move the electrical connector 304 between the deployed and stored configurations.

Figure 38:
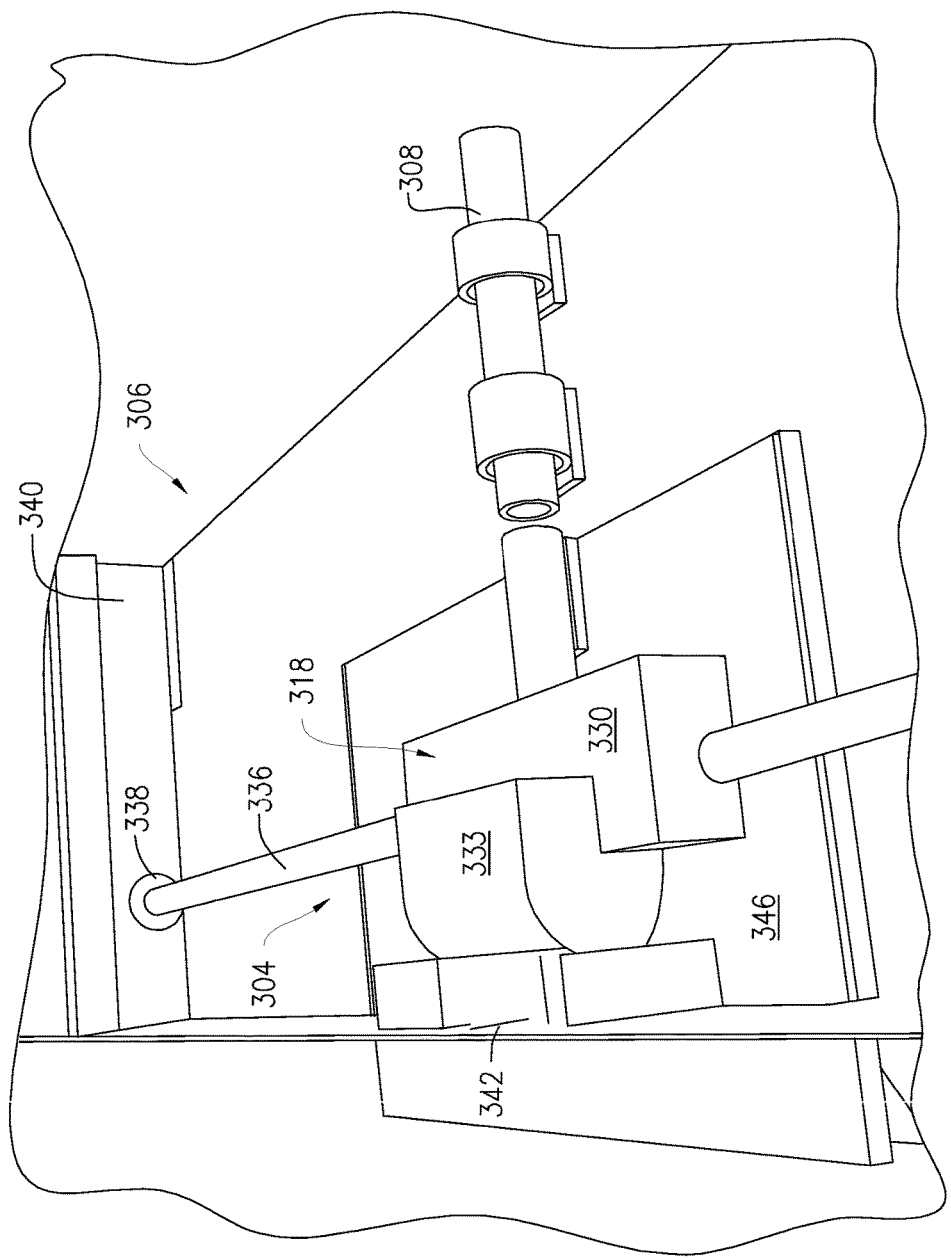
FIG. 38 is a perspective view of another example second housing tray that comprises a pushrod assembly.

As illustrated in FIGS. 37 and 38, the electrical circuit 318 is enclosed within an enclosure 330. USB connector 333 is attached to the enclosure 330. For stability, the enclosure 330 is rotatably supported on both sides by a drive shaft 336 that includes wheels, such as wheel 338 that are disposed within tracks, such as track 340, fabricated into the sidewall of the second housing tray 306. As the pushrod 308 is moved along the pushrod axis P (see FIG. 37), the wheels translated within their respective tracks, allowing the USB connector 333 to move in and out of an aperture 342.

In some embodiments, a wall support or stabilizer 346 is also attached to the enclosure 330 (and positioned below the enclosure 330).

Figure 39:
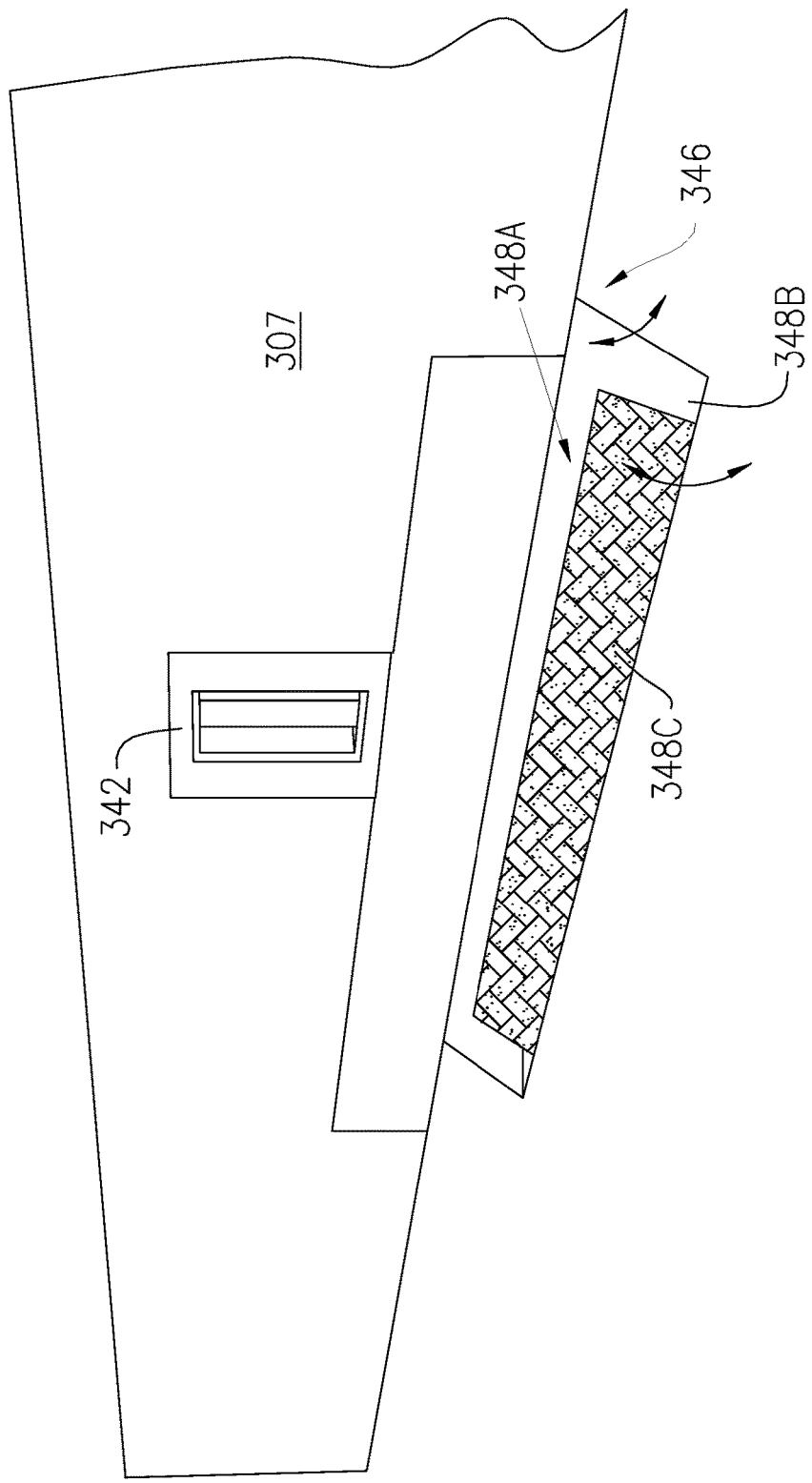
FIG. 39 is a perspective view of the second housing tray of FIG. 38, illustrating an aperture and USB connector disposed therein.

In FIG. 39, the stabilizer 346 is provided with three sections or flaps 348A-C. A primary flap 348A extends from the third housing tray 306 when the pushrod 308 is moved forward. A second flap 348B pivots from the bottom of the primary flap 348A, and a third flap 348C pivots outwardly from the top of the secondary flap 348B. Depending upon the geometry of the wall or outlet, the primary, second, or third flaps can be deployed.

As illustrated in FIG. 39, the USB connector 333 is disposed in a vertical, rather than horizontal orientation, in contrast with the embodiments of FIGS. 23-35. The aperture 342 is also oriented vertically.

In some embodiments, the apparatus 300 can comprise more than one USB connector 333. These multiple USB connectors can be deployed to couple with adjacently placed USB ports. For example, laptops (or outlets) can have USB connectors that are spaced apart from one another. The plurality of USB connectors can plug into the plurality of USB ports at the same time, in some embodiments.

Figure 40:
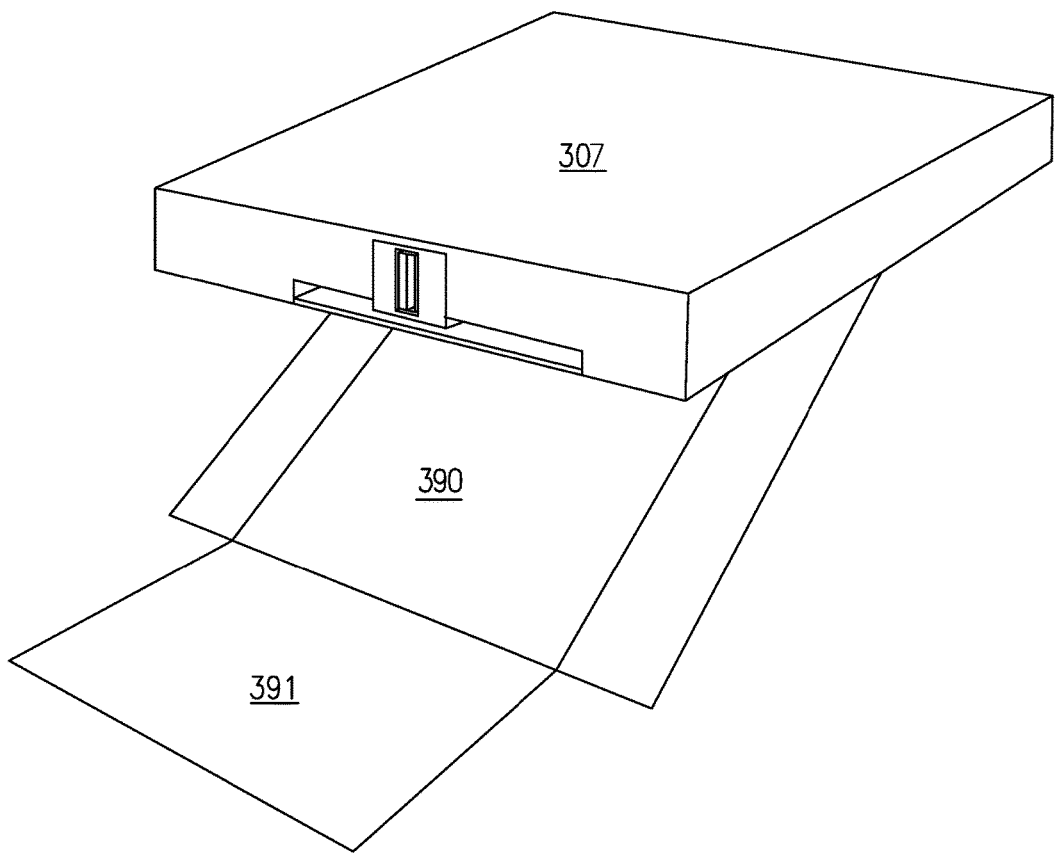
FIG. 40 is a perspective view of the second housing tray of FIG. 38 with two support members deployed.
Figure 41:
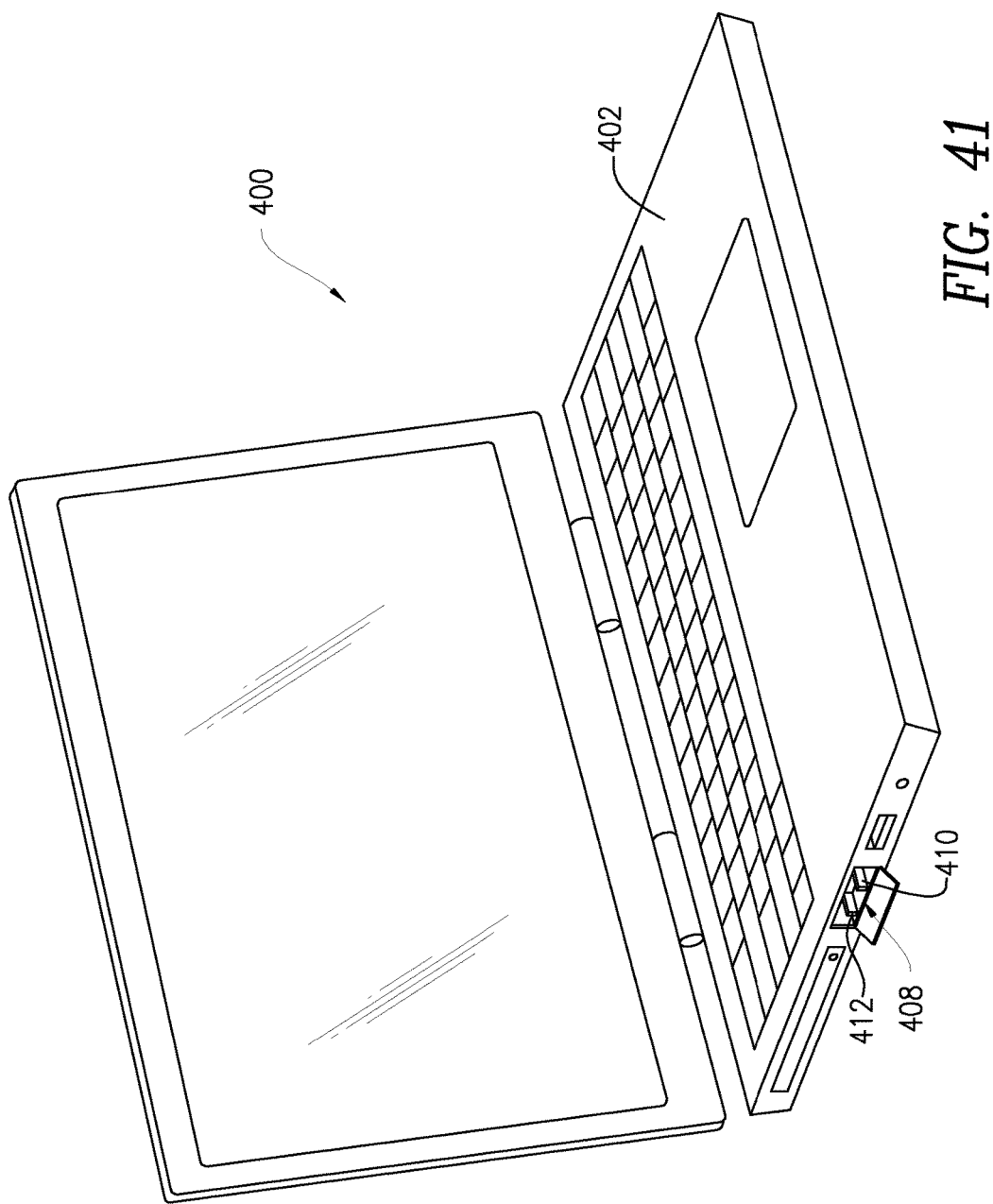
FIGS. 41-45 collectively illustrate an example embodiment of a computer comprising a chassis or body that functions as the outer body of the computer.
Figure 42:
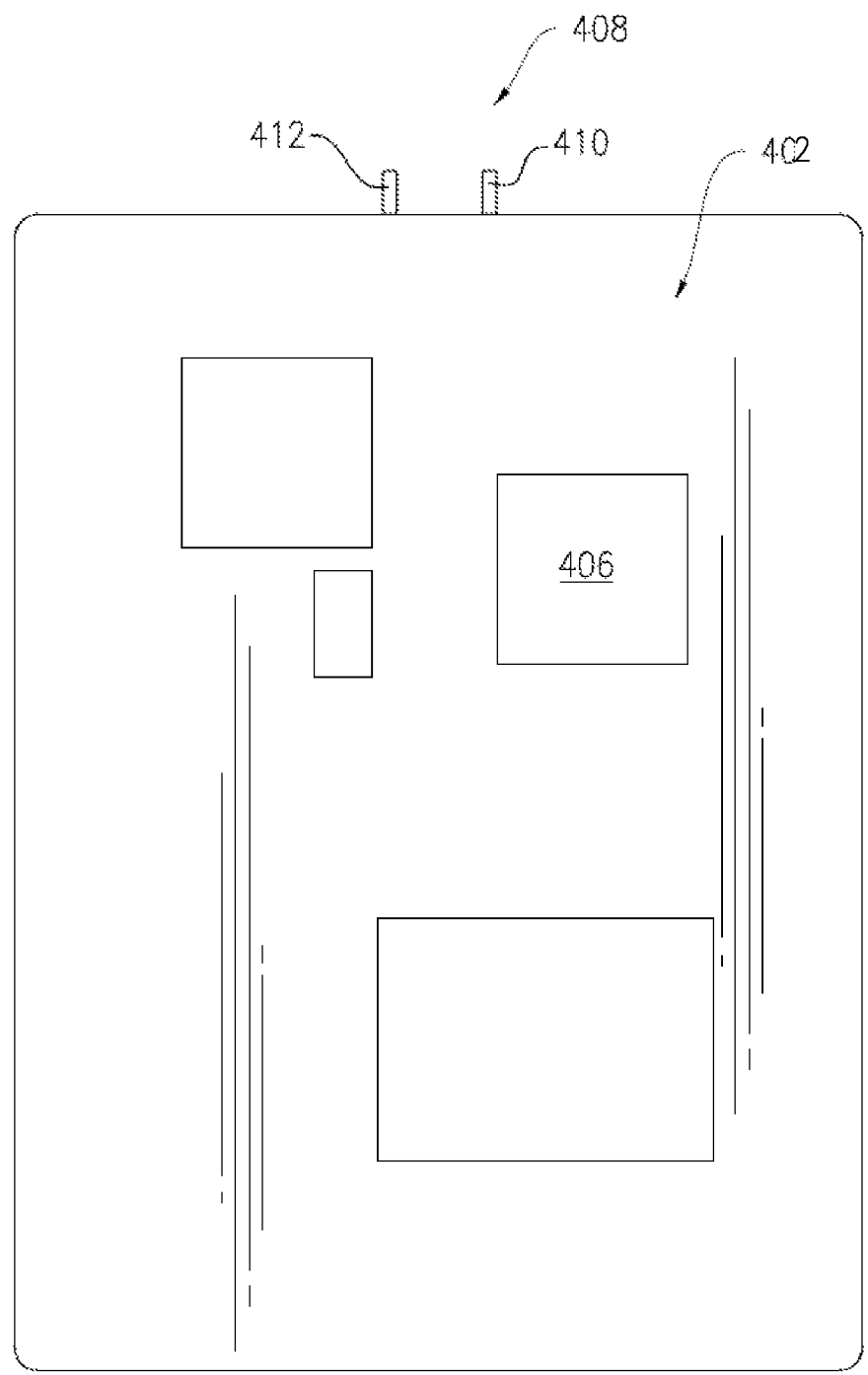

In FIG. 40, the third housing tray 307 can comprise a pull down, pivoting stabilizer 390 that pivots from a lower portion of the third housing tray 307. In some embodiments, the pull down, pivoting stabilizer 390 comprises a secondary flap 391 that pivots away from the body of the pull down, pivoting stabilizer 390. The secondary flap 391 can contact a wall or other surface to stabilize the device when plugged into an electrical outlet.

The stabilizer 390 of FIG. 40 can alternatively be used in any housing tray embodiment described herein.

According to some embodiments, the present disclosure is directed to device cases or chassis that integrate electrical connectors (e.g., charging ports). One example embodiment includes a chassis for a computer (such as a laptop computer or tablet) that houses the computer components of the computer such as the motherboard, CPU, hard drive, and so forth. The chassis comprises a male electrical connector that allows the computer to be directly coupled with an AC or DC power source such as an electrical wall outlet or a female USB port or outlet. The chassis can include a pivoting stabilizer armature or tray that hinges from the bottom of the chassis and contacts a surface such as a wall. The stabilizer armature or tray supports the weight of the chassis and computer when the electrical connector of the chassis is plugged into the power source. The stabilizer armature or tray relieves forces/stress that would be placed on the electrical connector due to the weight of the chassis and computer.

Another example embodiment includes a case/dock that receives a computing device. The case comprises one or more trays that can include a male electrical connector and/or stabilizer components as provided above. A first or upper tray of the case would receive the computer and electrically couple the computer with the power source.

In some embodiments, the devices described herein can comprise conditioning circuitry that can convert AC power received from an AC power source into DC power that can be stored by an energy storage device integrated into the chassis or a tray of the case/dock.

FIGS. 41-44 collectively illustrate an example embodiment of a computer 400 comprising a chassis or body 402 that functions as the outer body of the computer. The body 402 is an enclosure manufactured from any of a variety of materials such as plastics, polymers, metals, alloys, or other materials that would be known to one of ordinary skill in the art. The body 402 encloses various computer components such as a motherboard, a CPU, a hard drive, and various other components that would be found in a computing device such as a personal computer or laptop. Specifically, the body 402 encloses a battery or other energy storage device 406 that stores electrical energy that powers the computer 400.

The body 402 comprises an electrical connector 408 that includes prongs 410 and 412 that are configured to be inserted into an outlet of a wall. The electrical connector 408 is electrically coupled to the energy storage device 406 using wiring, electrical traces through the motherboard of the computer 400, or other common electrical couplings.

The electrical connector 408 can be placed in fixed position on the body 402 in some embodiments. In other embodiments described below the electrical connector 408 can be configured to translate from a stored position to a deployed position and vice versa.

In some embodiments, the electrical connector 408 is configured to mate with an AC power source, such as 110V power source. The computer 400 can comprise a circuit that conditions and/or transforms electrical energy in AC waveform to DC waveform that can be stored in the energy storage device 406. The circuit can comprise any of the components of the circuit of FIGS. 5 and 6 described above.

Figure 43:
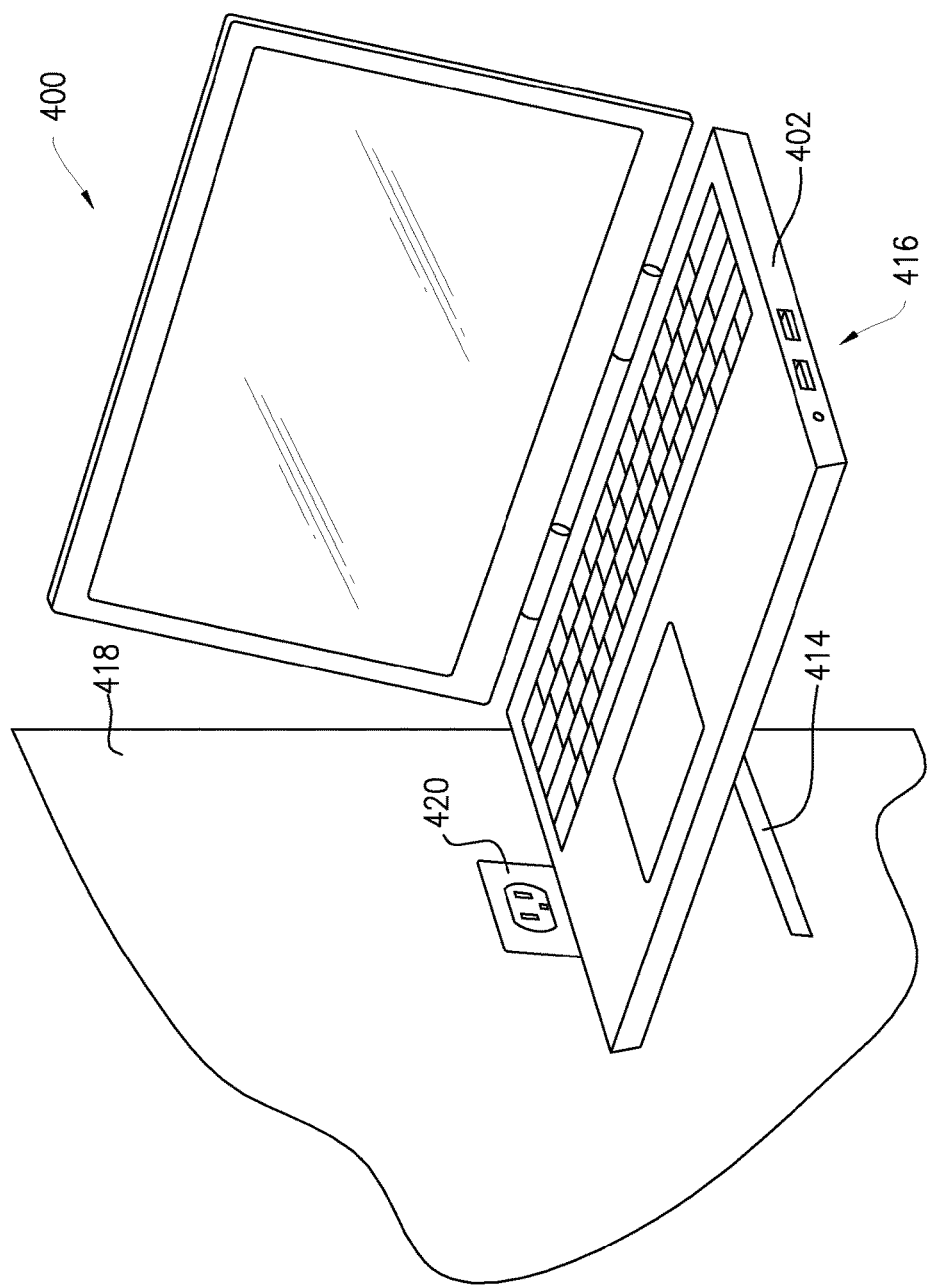
Figure 44:
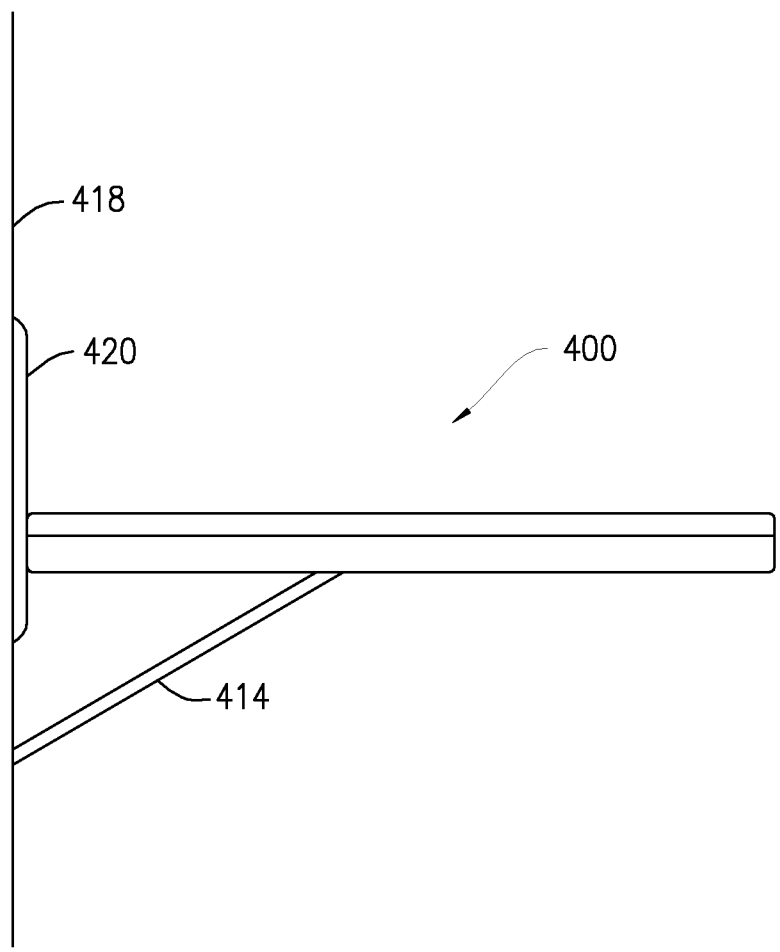

The body 402 comprises a stabilizer 414 that includes a bar or armature that is hingedly or pivotally connected to a lower surface 416 of the body 402. In some embodiments the stabilizer 414 is pivotally hinged into a mating relationship with a lower surface 416 of the body 402 when in a stored configuration, and can hinge into spaced relationship with the body 402 when in the deployed configuration. As illustrated in FIG. 43, the stabilizer 414 contacts a wall 418 when the electrical connector 408 is plugged into a wall outlet 420.

Figure 45:
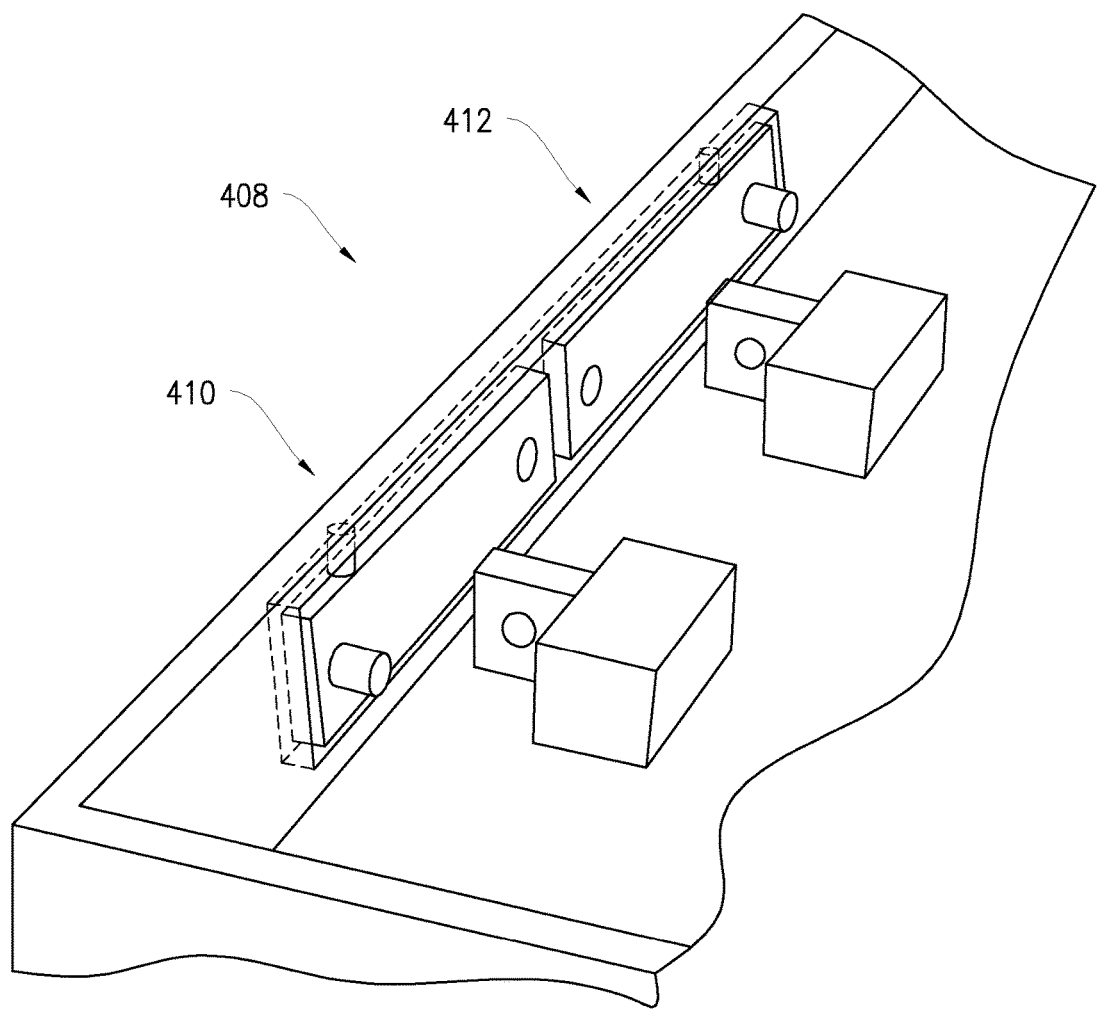

According to some embodiments, the electrical connector 408 and prongs 410 and 412 can pivotally hinge from a flat, stored position to an extended position as with the embodiments of FIGS. 7 and 8 above. The prongs 410 and 412, as generally illustrated in FIG. 45, can be flipped out by a user from the flat, stored position to the extended position. Stated otherwise, the prongs of the electrical connector are aligned flat relative to the sidewall when the electrical connector is in the stored configuration. The prongs of the electrical connector are perpendicular relative to the sidewall when the electrical connector is in the deployed configuration.

Figure 46:
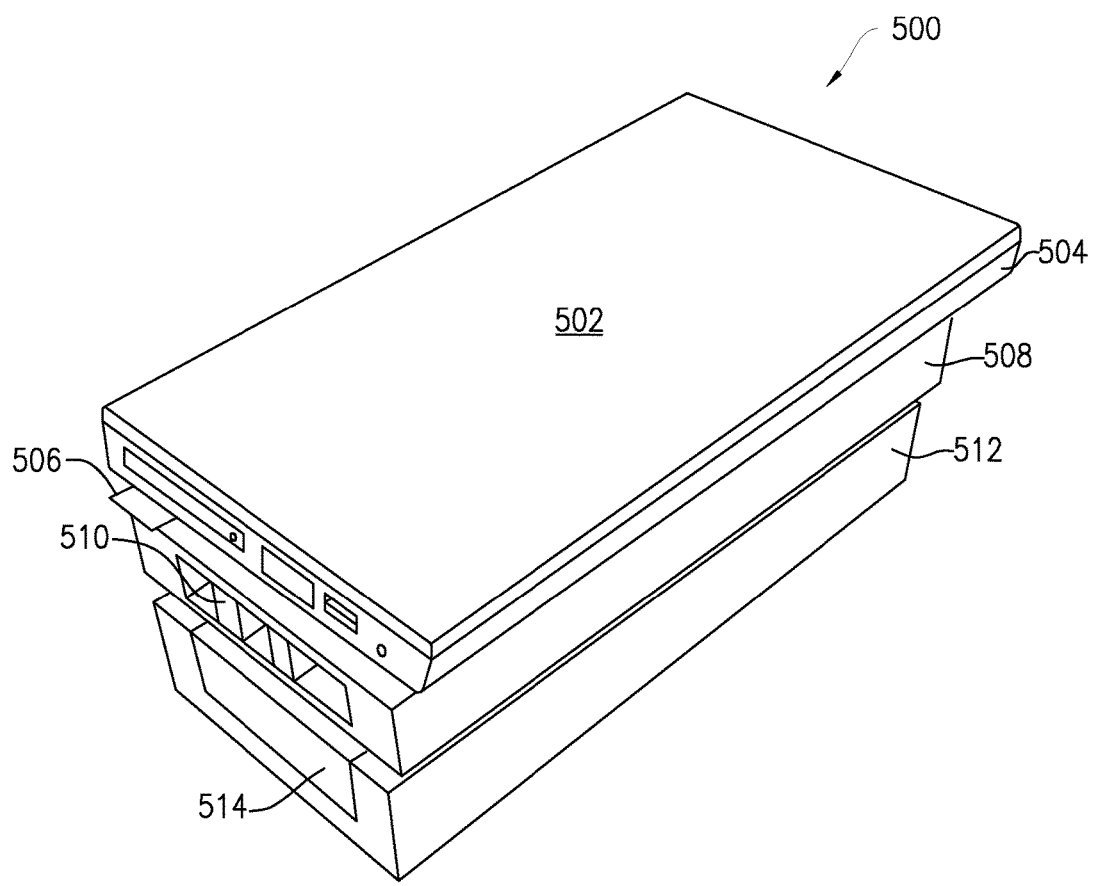
FIGS. 46-48 collectively illustrate another example embodiment of a device that functions as a dock to receive and charge a laptop or other computing device.

FIG. 46 illustrates another example embodiment of a device 500 that functions as a dock to receive and charge a laptop 502 or other computing device. The device comprises a chassis 504 or dock tray that receives the laptop 502. In some embodiments, the laptop 502 mates with a connector or interface 506 and the laptop 502 is secured within (e.g., docks) the chassis 504. The interface 506 can include an interface that mates electrically with any electrical port on the laptop 502. The interface 506 is configured to couple with the electrical port on the laptop 502. Thus, variations of the device 500 can be manufactured for each unique laptop configuration.

The interface 506 is electrically coupled through wiring or other means to a second housing tray 508 that at least partially (or entirely) encloses the electrical connector 510. As with other embodiments, the second housing tray 508 can include signal conditioning or transforming circuitry that converts AC waveform signal to DC waveforms for storage in an energy storage device, such as the battery of the laptop 502.

In some embodiments, the device 500 comprises a third housing tray 512 that comprises a stabilizer 514 that supports the chassis 504 against a support surface.

The second housing tray 508 and the third housing tray 512 are in hinged mechanical connection to one another. When the second housing tray 508 and the third housing tray 512 hingedly move away from one another the electrical connector 510 is disposed in the deployed configuration and when the second housing tray 508 and the third housing tray 512 hingedly move towards one another the electrical connector 510 is disposed in the stored configuration.

Figure 47:
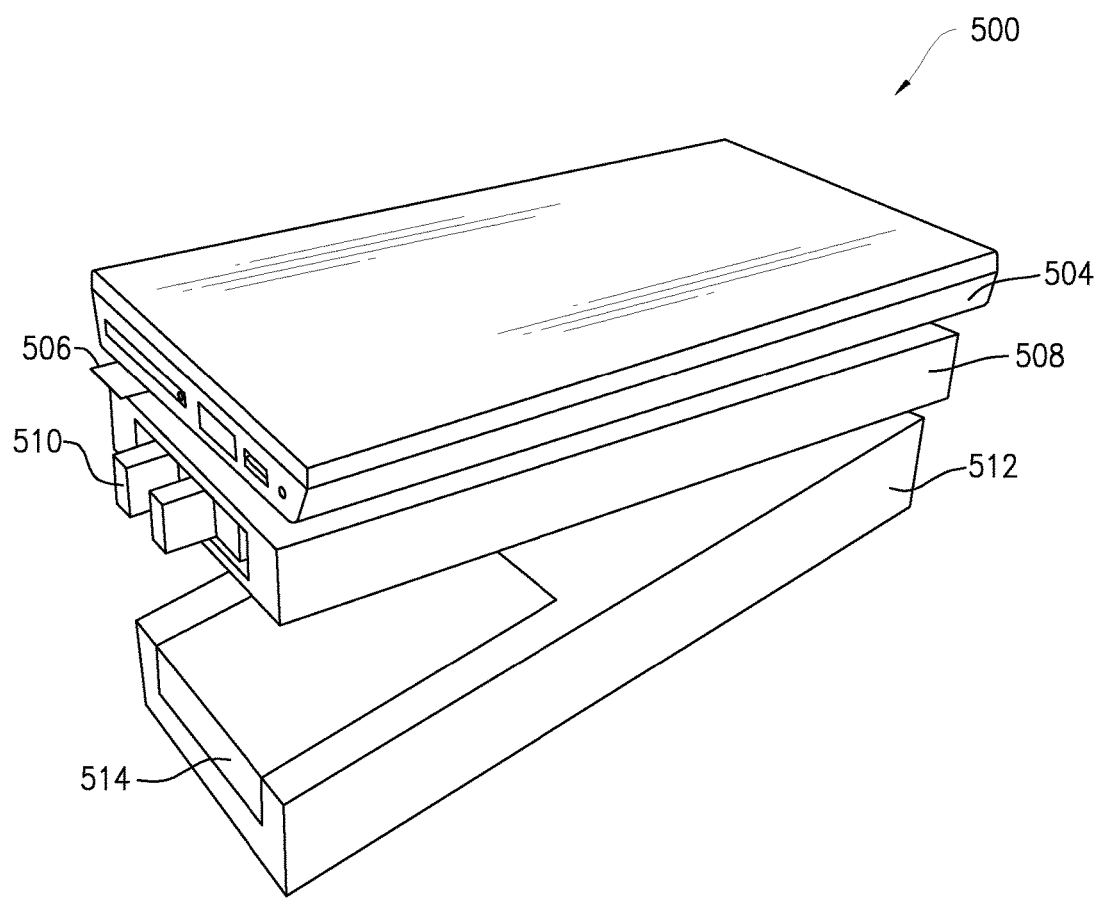
Figure 48:
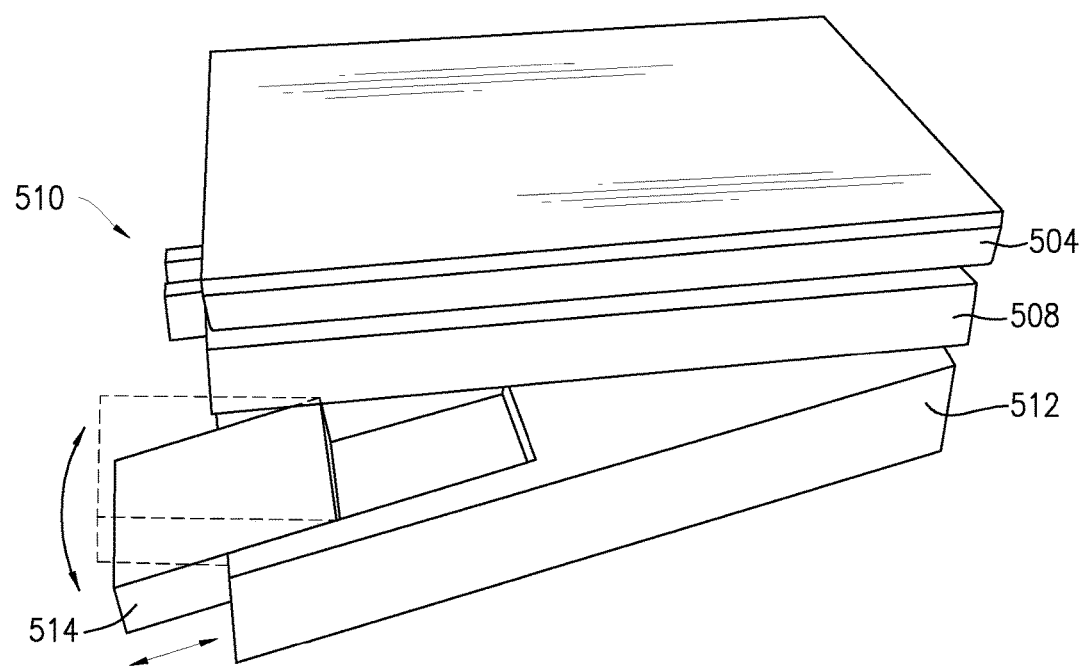

According to some embodiments, the electrical connector 510 translates along a horizontal axis when moving between the deployed and stored configurations and the third housing tray 512 pivots away from the second housing tray 508, as in the embodiments of FIGS. 47-48 (illustrating the deployed configuration).

Figure 49:
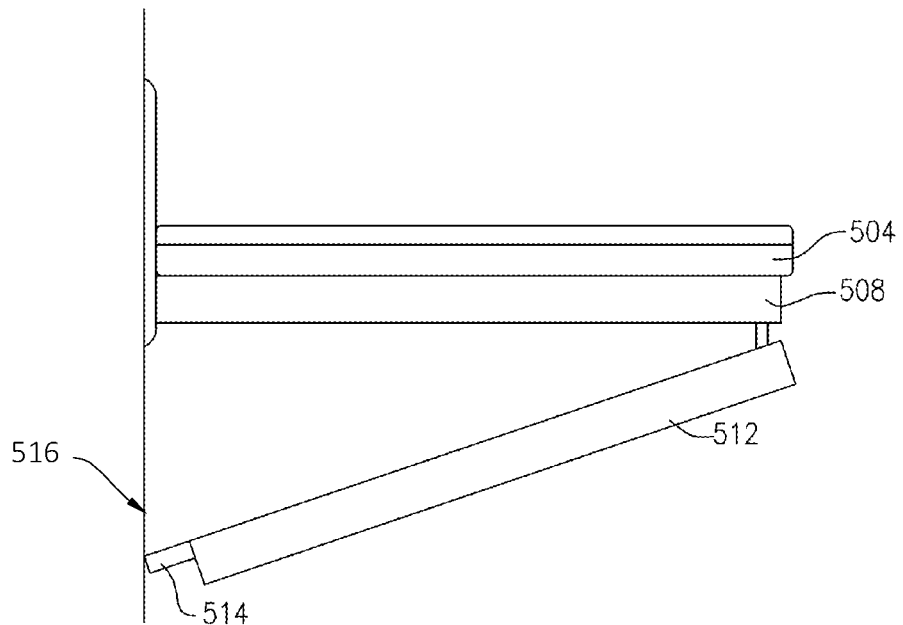
FIGS. 49-50 collectively illustrate a third housing tray that supports a chassis (including computer weight) and second tray against a wall surface.
Figure 50:
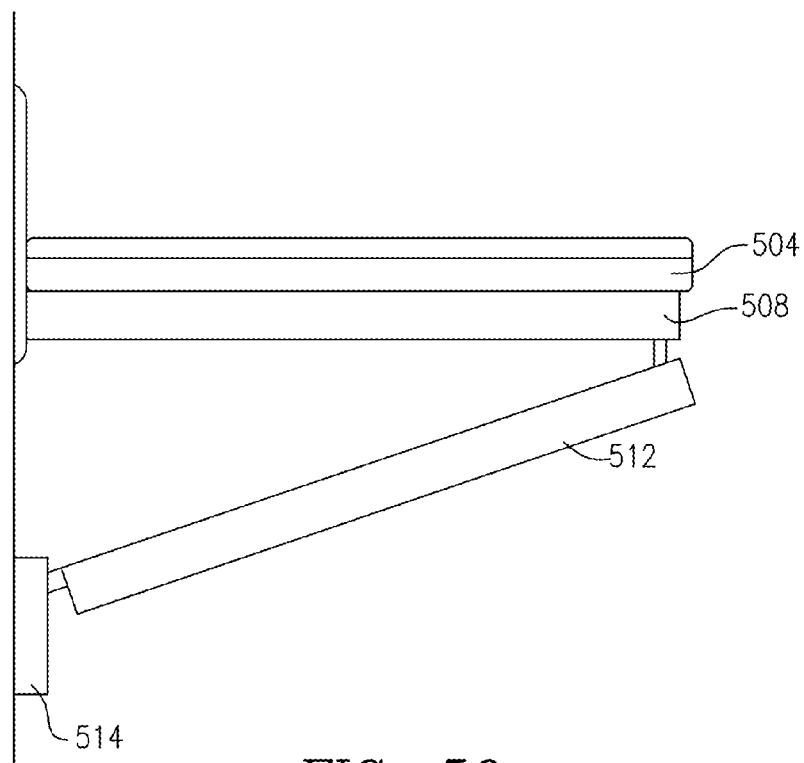

In some embodiments, the third housing tray 512 is pivotally connected to the second housing tray 508 and supports a weight of the laptop 502 and chassis 504 by contacting a support surface, such as a wall, as illustrated in FIGS. 49-50.

FIG. 49 also illustrates that the stabilizer 514 rotates when extended from the third housing tray 512 so that a mating surface of the stabilizer 514 rests flat against the support surface, such as a wall 516.

FIG. 50 illustrates an embodiment where the stabilizer 514 is an internal stabilizer flap that extends from the third housing tray 512.

Figure 51:
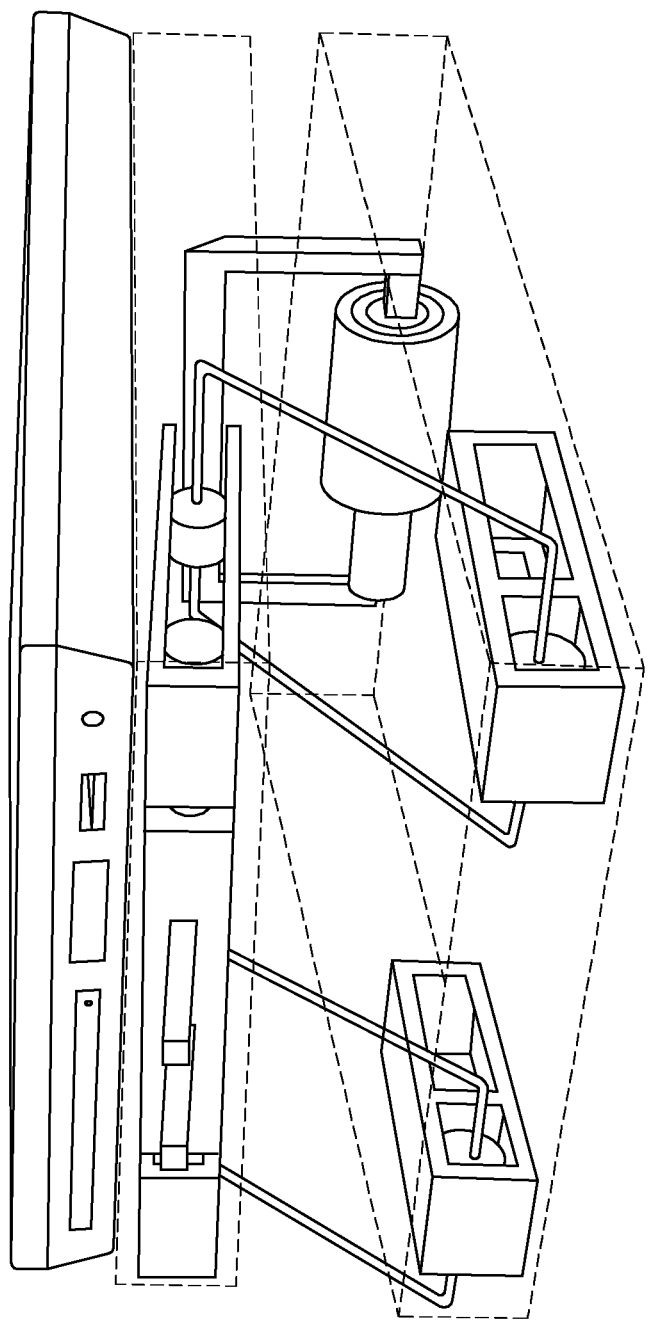
FIGS. 51-52 collectively illustrate an embodiment of a device that is similar to the embodiments of FIGS. 16 and 17 and FIGS. 34 and 35, where the first housing tray is replaced with a chassis of a computer.
Figure 52:
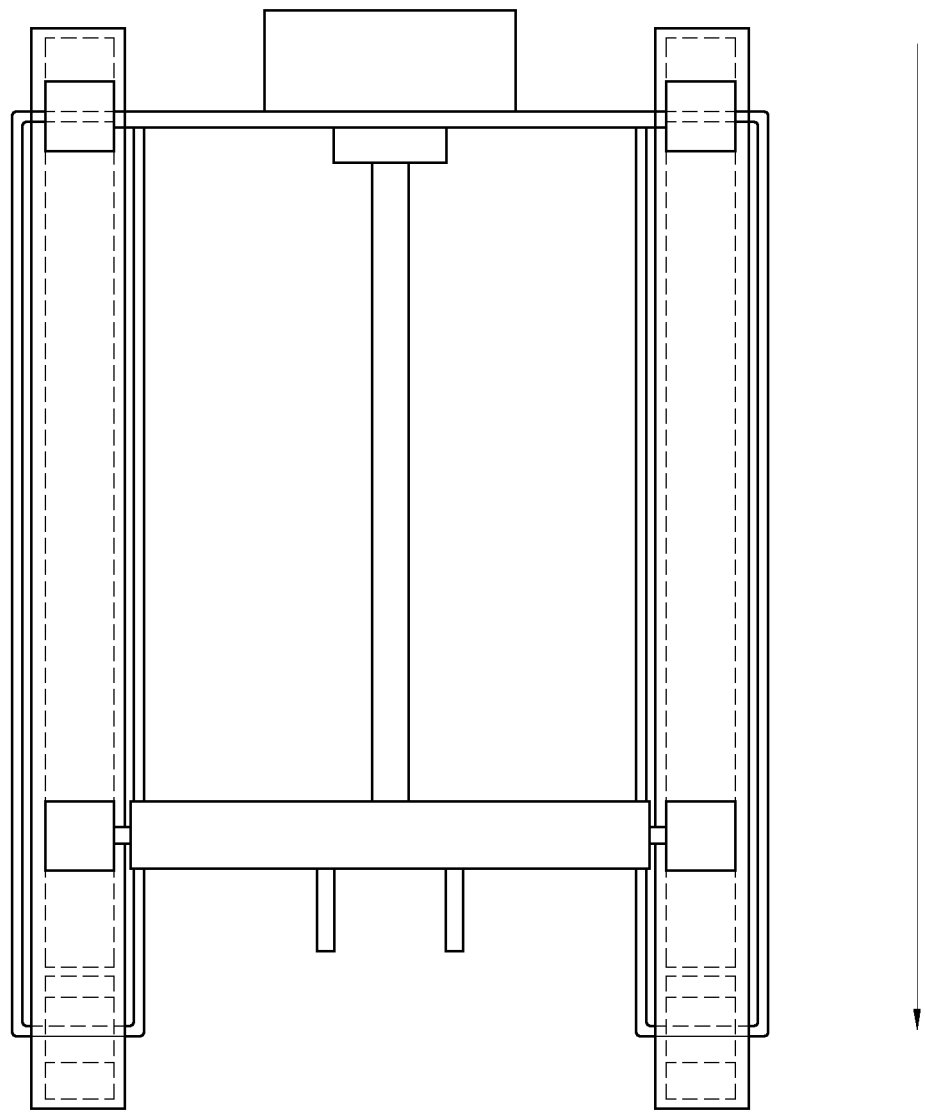

FIGS. 51 and 52 are constructed similarly to the embodiments of FIGS. 16 and 17, as well as FIGS. 34 and 35 with the exception that the first housing tray illustrated in FIGS. 16 and 17 and FIGS. 34 and 35 is replaced with the chassis 504. This configuration can also be utilized with the embodiments of FIGS. 41-43 such that the second and third housing trays are affixed to the lower surface of the body 402 of the computer 400. Again, the device can incorporate either an AC connector or a DC connector, depending on the embodiment desired.

Figure 53:
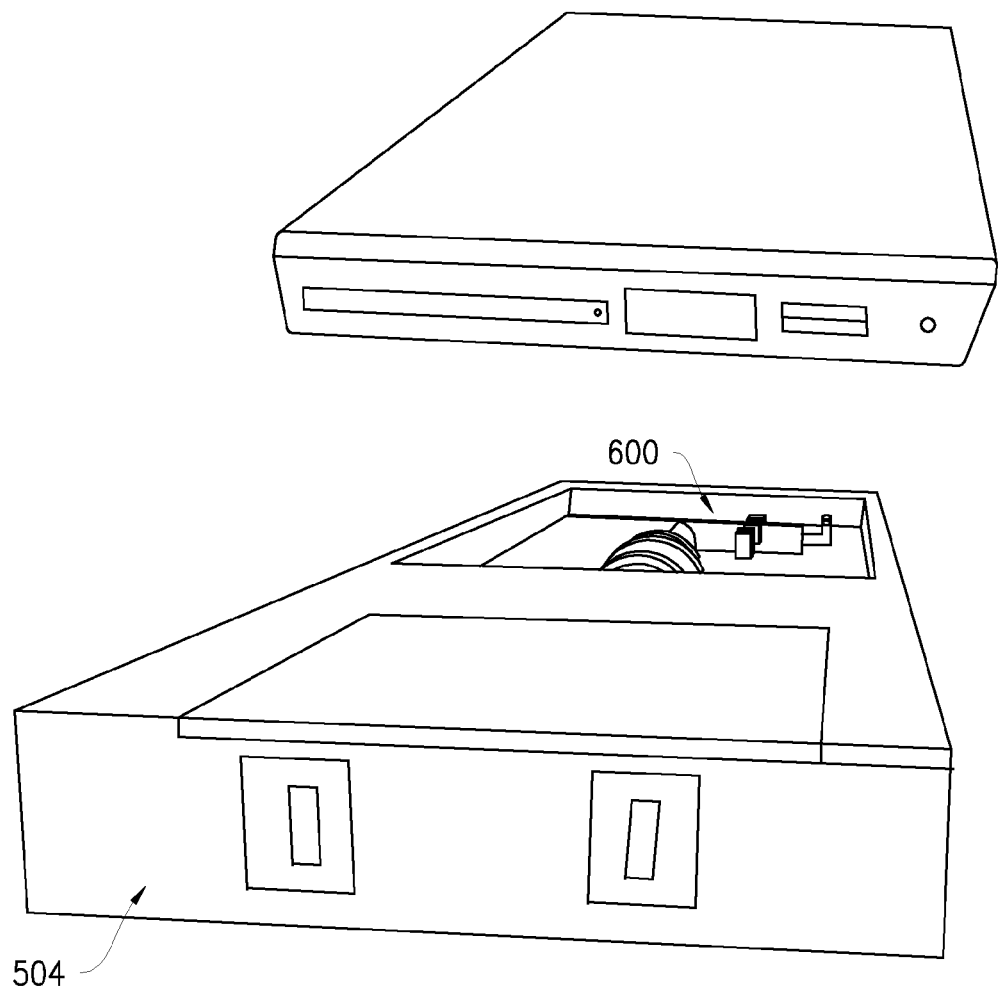
FIG. 53 illustrates a chassis with pushrod assembly for translating an electrical connector.

FIG. 53 illustrates an example embodiment that is constructed similarly to the embodiments illustrated in FIGS. 17-20 (an embodiment with AC electrical prongs) and FIGS. 36-38 (an embodiment with DC electrical USB male adapter), with the exception that exception that the first housing tray illustrated in FIGS. 17-20 and FIGS. 36-38 is replaced with the chassis 604 of the computer 400. Thus, the pushrod assembly 600 illustrated can be integrated into the bottom portion of the case (chassis 504) of the laptop.

Figure 54:
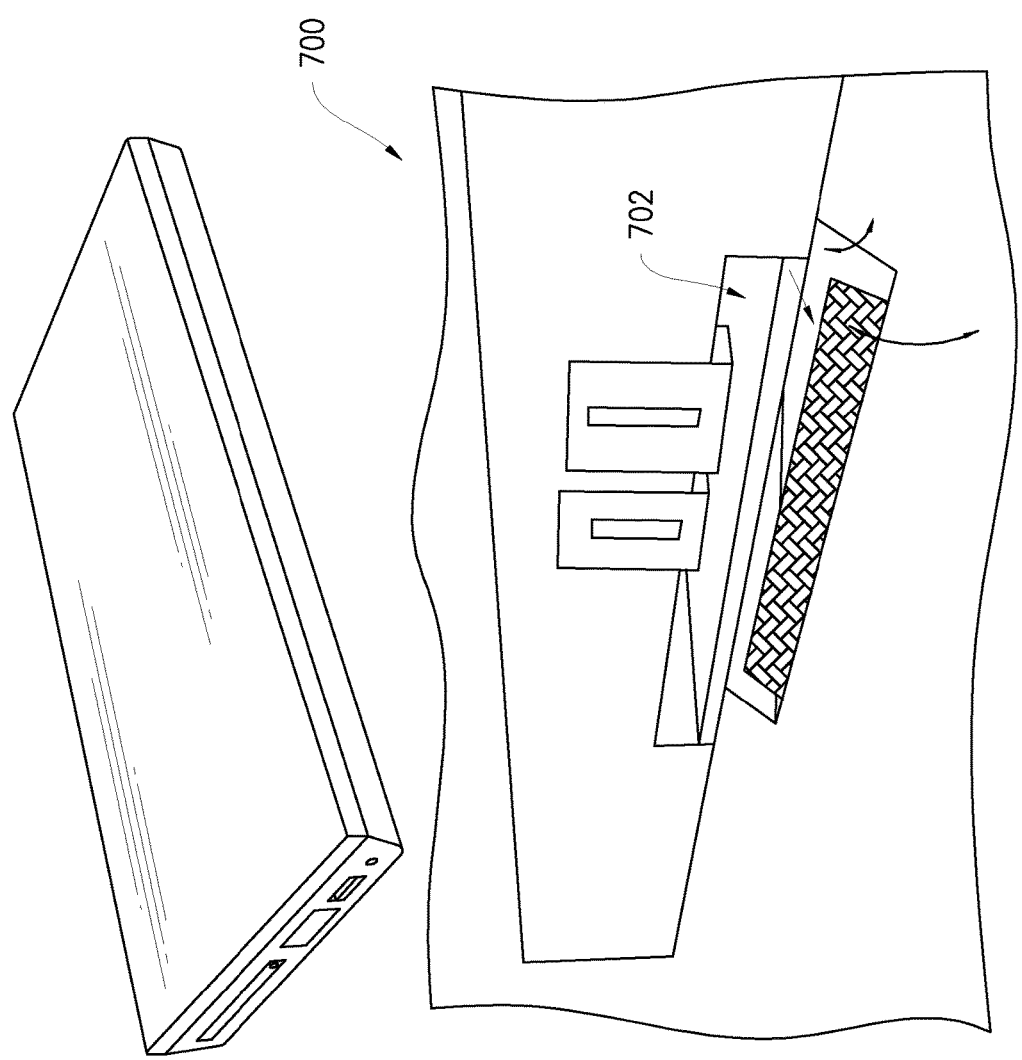
FIGS. 54 and 55 illustrate additional embodiments of chassis that can be utilized as the body of a laptop computer, which comprise multi-component stabilizers.
Figure 55:
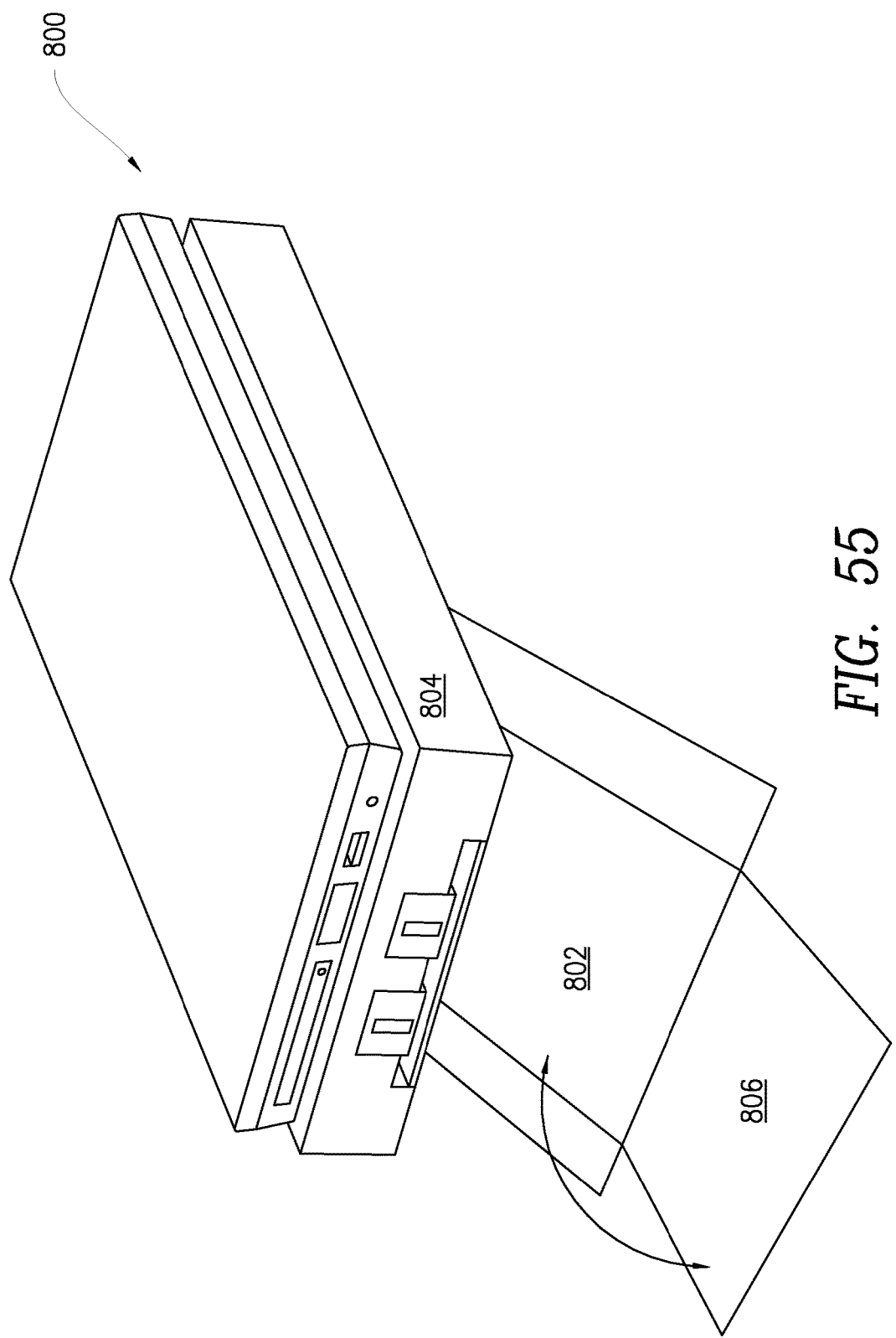

FIGS. 54 and 55 illustrate an additional embodiment of chassis 700 that can be utilized as the body of a laptop computer. These embodiments are similar in construction to the embodiments of FIGS. 39 and 40 and comprise multi-component stabilizer flaps. In FIG. 54, the embodiment includes a stabilizer 702 that is provided with a plurality of sections or flaps. A primary flap extends from the third housing tray when the pushrod is moved forward. A second flap pivots from the bottom of the primary flap, and a third flap pivots outwardly from the top of the secondary flap. Depending upon the geometry of the wall or outlet, the primary, second, or third flaps can be deployed. To be sure, these embodiments are not limited to incorporation with pushrod assemblies and can be utilized in chassis that do not include the pushrod assemblies.

In FIG. 55, the embodiment includes a dual flap stabilizer 800 embodiment where a first stabilizer flap 802 pivots from an underside of a chassis (case or body for a laptop) 804, or second housing tray as illustrated. As second stabilizer flap pivots 806 from a first stabilizer flap 802 to extend an overall length of the stabilizer 800.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases in "one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its nonitalicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," an and the are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A device, comprising:
  a chassis for a computer, the chassis having a sidewall extending perpendicularly from the chassis, the chassis being configured to enclose computer components of the computer, the computer components comprising an energy storage device, the chassis comprising an electrical connector that extends from the sidewall;
  a stabilizer that extends from the chassis, wherein the stabilizer is configured to supportingly contact the chassis against a wall, and wherein the stabilizer is pivotally hinged into a mating relationship with a lower surface of the chassis when in a stored configuration; and
  a circuit mounted on the chassis that charges the energy storage device when the electrical connector is coupled with a power source.

2. The device according to claim 1, wherein the electrical connector comprises a universal serial bus (USB) connector or a micro universal serial bus (USB) connector.

3. The device according to claim 1, wherein the sidewall defines an aperture, further wherein the electrical connector is disposed behind the sidewall when in the stored configuration and the electrical connector extends at least partially from the sidewall, through the aperture when in a deployed configuration.

4. The device according to claim 1, wherein prongs of the electrical connector are aligned flat relative to the sidewall when the electrical connector is in the stored configuration.

5. A device, comprising:
  a chassis for a computer, the chassis enclosing computer components of the computer that comprise an energy storage device;
  a second housing tray comprising an electrical connector for electrically coupling a power source, the electrical connector capable of being placed in either a deployed configuration or a stored configuration, the electrical connector being electrically coupled with the energy storage device; and
  a third housing tray that comprises a stabilizer that supports the chassis against a support surface.

6. The device according to claim 5, wherein the electrical connector translates from the deployed configuration to the stored configuration using a pushrod assembly.

7. The device according to claim 5, wherein when the second housing tray and the third housing tray hingedly move away from one another, the electrical connector is disposed in the deployed configuration; and when the second housing tray and the third housing tray hingedly move towards one another, the electrical connector is disposed in the stored configuration.

8. The device according to claim 7, wherein the electrical connector translates along a horizontal axis when moving between the deployed and stored configurations and the third housing tray pivots away from the second housing tray.

9. The device according to claim 5, wherein the third housing tray is pivotally connected to the second housing tray and supports a weight of the computer and the chassis by contacting the support surface.

10. The device according to claim 9, wherein the stabilizer rotates when extended from the third housing tray such that a mating surface of the stabilizer rests flat against the support surface.

11. The device according to claim 10, wherein the stabilizer includes an internal stabilizer flap that extends from the stabilizer.

12. The device according to claim 5, wherein the second housing tray comprises a pair of upper guides and the third housing tray comprises a pair of lower guides, each of the pair of upper guides comprising a wheel and each of the pair of lower guides comprising a wheel, wherein a first wheel of the pair of upper guides is connected to a first wheel of the pair of lower guides with a first armature, further wherein a second wheel of the pair of upper guides is connected to a second wheel of the pair of lower guides with a second armature.

13. The device according to claim 12, further comprising a hinge coupling the second housing tray with the third housing tray.

14. The device according to claim 13, wherein the first and second wheels of the pair of lower guides are confined such that they can rotate but not translate along the pair of lower guides.

15. The device according to claim 14, wherein the first and second wheels of the pair of upper guides can rotate and translate along the pair of upper guides allowing the electrical connector to slidingly translate between the deployed and stored configurations.

16. A device, comprising:
  a chassis for a computer, the chassis having a sidewall extending perpendicularly from the chassis, the chassis being configured to enclose computer components of the computer, the computer components comprising an energy storage device;
  a second housing tray comprising:
    an electrical connector;
    a circuit mounted on the chassis that charges the energy storage device when the electrical connector is coupled with a power source; and
    a universal serial bus (USB) connector for electrically coupling the circuit with a USB outlet, the USB connector capable of being placed in either a deployed configuration or a stored configuration based on pivoting movement of a third housing tray relative to the second housing tray; and
  the third housing tray that comprises a stabilizer, the stabilizer contacting a support surface to support a weight of the chassis and the computer.

* * * * *